US009684889B2

(12) United States Patent
Hicks et al.

(10) Patent No.: US 9,684,889 B2
(45) Date of Patent: Jun. 20, 2017

(54) SYSTEM AND METHOD FOR PROVIDING CERTIFICATION-RELATED AND OTHER SERVICES

(75) Inventors: Mack Hicks, San Francisco, CA (US); Regina Seiler, Oakland, CA (US); Guy Tallent, Jersey City, NJ (US); Kristin Kupres, New York, NY (US); Allen Freudenstein, Jersey City, NJ (US)

(73) Assignee: Identrust, Inc., San Francisco, CA (US)

( * ) Notice: Subject to any disclaimer, the term of this patent is extended or adjusted under 35 U.S.C. 154(b) by 232 days.

(21) Appl. No.: 10/441,979

(22) Filed: May 20, 2003

(65) Prior Publication Data

US 2004/0111379 A1 Jun. 10, 2004

Related U.S. Application Data

(63) Continuation of application No. 09/502,450, filed on Feb. 11, 2000, now abandoned.
(Continued)

(51) Int. Cl.
*G06Q 20/00* (2012.01)
*G06Q 20/02* (2012.01)
*G06Q 20/38* (2012.01)

(52) U.S. Cl.
CPC .......... *G06Q 20/02* (2013.01); *G06Q 20/00* (2013.01); *G06Q 20/3821* (2013.01); *G06Q 20/3829* (2013.01); *G06Q 20/38215* (2013.01)

(58) Field of Classification Search
USPC .................................................. 705/64, 50
See application file for complete search history.

(56) References Cited

U.S. PATENT DOCUMENTS

| 4,304,990 A | 12/1981 | Atalla |
| 5,048,085 A | 9/1991 | Abraham et al. |

(Continued)

FOREIGN PATENT DOCUMENTS

| EP | 0 784 282 A2 | 7/1997 |
| WO | WO 96/31965 A1 | 10/1996 |

(Continued)

OTHER PUBLICATIONS

U.S. Appl. No. 60/118,379.*
(Continued)

*Primary Examiner* — John Hayes
*Assistant Examiner* — John M Winter
(74) *Attorney, Agent, or Firm* — Eric L. Sophir; Dentons US LLP

(57) ABSTRACT

A system for warranting the identity of a party over an electronic network. The system comprises a root entity and a plurality of additional entities. Each additional entity is admitted to the system after agreeing to abide by a plurality of operating rules promulgated by the root entity. The additional entities may comprise level-one participants and level-two participants. Certificate authorities maintained by level-one participants issue digital certificates to their customers. The digital certificates bind the customers to their public keys. System customers are also provided with a warranty request formatter which is adapted to formulate a request for a warranty as to the veracity of information contained in a digital certificate. The warranty request formatter is also adapted to transmit the request for the warranty to the customer's level-one participant. The level-one participants maintain an intelligent messaging gateway which is adapted to receive messages from their customers and to transmit messages to appropriate system entities. Warranty offers are issued by the participant that issued the (Continued)

digital certificate identified in the warranty request. The participants are required to maintain collateral with a collateral custodian.

5 Claims, 25 Drawing Sheets

Related U.S. Application Data

(60) Provisional application No. 60/119,892, filed on Feb. 12, 1999, provisional application No. 60/119,894, filed on Feb. 12, 1999, provisional application No. 60/119,895, filed on Feb. 12, 1999, provisional application No. 60/119,898, filed on Feb. 12, 1999, provisional application No. 60/119,958, filed on Feb. 12, 1999.

(56) References Cited

U.S. PATENT DOCUMENTS

| | | | |
|---|---|---|---|
| 5,191,193 A | 3/1993 | Le Roux | |
| 5,353,350 A | 10/1994 | Unsworth et al. | |
| 5,389,738 A | 2/1995 | Piosenka et al. | |
| 5,406,630 A | 4/1995 | Piosenka et al. | |
| 5,448,045 A | 9/1995 | Clark | |
| 5,453,601 A | 9/1995 | Rosen | |
| 5,511,121 A | 4/1996 | Yacobi | |
| 5,557,518 A | 9/1996 | Rosen | |
| 5,604,801 A | 2/1997 | Dolan et al. | |
| 5,615,269 A | 3/1997 | Micali | |
| 5,623,637 A | 4/1997 | Jones et al. | |
| 5,638,446 A | 6/1997 | Rubin | |
| 5,659,616 A | 8/1997 | Sudia | |
| 5,668,878 A | 9/1997 | Brands | |
| 5,671,279 A | 9/1997 | Elgamal | |
| 5,677,955 A | 10/1997 | Doggett et al. | |
| 5,680,455 A | 10/1997 | Linsker et al. | |
| 5,689,565 A | 11/1997 | Spies et al. | |
| 5,694,471 A | 12/1997 | Chen et al. | |
| 5,703,949 A * | 12/1997 | Rosen | 705/65 |
| 5,706,427 A | 1/1998 | Tabuki | |
| 5,717,989 A | 2/1998 | Tozzoli et al. | |
| 5,721,781 A | 2/1998 | Deo et al. | |
| 5,745,571 A | 4/1998 | Zuk | |
| 5,745,574 A | 4/1998 | Muftic | |
| 5,754,772 A | 5/1998 | Leaf | |
| 5,784,612 A | 7/1998 | Crane et al. | |
| 5,790,677 A | 8/1998 | Fox et al. | |
| 5,809,144 A | 9/1998 | Sirbu et al. | |
| 5,815,657 A | 9/1998 | Williams et al. | |
| 5,841,866 A | 11/1998 | Bruwer et al. | |
| 5,842,211 A | 11/1998 | Horodan et al. | |
| 5,845,260 A | 12/1998 | Nakano et al. | |
| 5,847,374 A | 12/1998 | Menconi | |
| 5,850,442 A | 12/1998 | Muftic | |
| 5,861,662 A | 1/1999 | Candelore | |
| 5,870,473 A | 2/1999 | Boesch et al. | |
| 5,889,863 A | 3/1999 | Weber et al. | |
| 5,892,900 A | 4/1999 | Ginter et al. | |
| 5,903,882 A * | 5/1999 | Asay et al. | 705/44 |
| 5,909,492 A | 6/1999 | Payne et al. | |
| 5,913,210 A | 6/1999 | Call | |
| 5,920,629 A | 7/1999 | Rosen | |
| 5,920,847 A | 7/1999 | Kolling et al. | |
| 5,937,068 A | 8/1999 | Audebert | |
| 5,943,424 A | 8/1999 | Berger et al. | |
| 5,944,789 A | 8/1999 | Tzelnic et al. | |
| 5,956,404 A | 9/1999 | Schneier et al. | |
| 5,958,051 A | 9/1999 | Renaud et al. | |
| 5,970,475 A | 10/1999 | Barnes et al. | |
| 5,987,440 A | 11/1999 | O'Neil et al. | |
| 5,991,750 A | 11/1999 | Watson | |
| 6,003,007 A | 12/1999 | DiRienzo | |
| 6,003,765 A | 12/1999 | Okamoto | |
| 6,014,646 A | 1/2000 | Vallee et al. | |
| 6,029,150 A | 2/2000 | Kravitz | |
| 6,035,402 A | 3/2000 | Vaeth et al. | |
| 6,038,551 A | 3/2000 | Barlow et al. | |
| 6,039,248 A | 3/2000 | Park | |
| 6,044,350 A | 3/2000 | Weiant, Jr. et al. | |
| 6,044,462 A | 3/2000 | Zubeldia et al. | |
| 6,052,785 A | 4/2000 | Lin et al. | |
| 6,067,621 A | 5/2000 | Yu et al. | |
| 6,072,870 A | 6/2000 | Nguyen et al. | |
| 6,081,790 A | 6/2000 | Rosen | |
| 6,085,168 A | 7/2000 | Mori et al. | |
| 6,085,321 A | 7/2000 | Gibbs et al. | |
| 6,092,196 A | 7/2000 | Reiche | |
| 6,092,201 A | 7/2000 | Turnbull et al. | |
| 6,105,012 A | 8/2000 | Chang et al. | |
| 6,115,642 A | 9/2000 | Brown et al. | |
| 6,125,349 A | 9/2000 | Maher | |
| 6,134,327 A | 10/2000 | Van Oorschot et al. | |
| 6,134,550 A | 10/2000 | Van Oorschot et al. | |
| 6,138,107 A | 10/2000 | Elgamal | |
| 6,141,679 A | 10/2000 | Schaefer et al. | |
| 6,154,844 A | 11/2000 | Touboul et al. | |
| 6,157,721 A | 12/2000 | Shear et al. | |
| 6,157,917 A | 12/2000 | Barber | |
| 6,157,920 A | 12/2000 | Jakobsson et al. | |
| 6,157,927 A | 12/2000 | Schaefer et al. | |
| 6,170,058 B1 | 1/2001 | Kausik | |
| 6,175,921 B1 | 1/2001 | Rosen | |
| 6,182,052 B1 | 1/2001 | Fulton | |
| 6,185,683 B1 | 2/2001 | Ginter et al. | |
| 6,209,091 B1 | 3/2001 | Sudia et al. | |
| 6,223,291 B1 | 4/2001 | Puhl et al. | |
| 6,233,339 B1 | 5/2001 | Kawano et al. | |
| 6,236,972 B1 | 5/2001 | Shkedy | |
| 6,272,675 B1 | 8/2001 | Schrab et al. | |
| 6,285,991 B1 | 9/2001 | Powar | |
| 6,292,569 B1 | 9/2001 | Shear et al. | |
| 6,301,658 B1 | 10/2001 | Koehler | |
| 6,304,658 B1 | 10/2001 | Kocher et al. | |
| 6,314,517 B1 | 11/2001 | Moses et al. | |
| 6,324,525 B1 | 11/2001 | Kramer et al. | |
| 6,327,578 B1 | 12/2001 | Linehan | |
| 6,330,551 B1 * | 12/2001 | Burchetta et al. | 705/80 |
| 6,341,353 B1 | 1/2002 | Herman | |
| 6,353,812 B2 | 3/2002 | Frankel | |
| 6,356,878 B1 | 3/2002 | Walker et al. | |
| 6,363,365 B1 | 3/2002 | Kou | |
| 6,363,479 B1 | 3/2002 | Godfrey et al. | |
| 6,370,249 B1 | 4/2002 | Van Oorschot | |
| 6,373,950 B1 | 4/2002 | Rowney | |
| 6,385,651 B2 | 5/2002 | Dancs et al. | |
| 6,449,598 B1 | 9/2002 | Green et al. | |
| 6,477,513 B1 | 11/2002 | Walker | |
| 6,490,358 B1 | 12/2002 | Geer, Jr. et al. | |
| 6,490,367 B1 | 12/2002 | Carlsson et al. | |
| 6,496,858 B1 | 12/2002 | Frailong et al. | |
| 6,510,513 B1 | 1/2003 | Danieli | |
| 6,510,518 B1 | 1/2003 | Jaffe et al. | |
| 6,523,027 B1 | 2/2003 | Underwood | |
| RE38,070 E | 4/2003 | Spies et al. | |
| 6,560,581 B1 | 5/2003 | Fox et al. | |
| 6,598,027 B1 | 7/2003 | Breen, Jr. et al. | |
| 6,601,233 B1 | 7/2003 | Underwood | |
| 6,601,759 B2 | 8/2003 | Fife et al. | |
| 6,609,128 B1 | 8/2003 | Underwood | |
| 6,633,878 B1 | 10/2003 | Underwood | |
| 6,643,701 B1 | 11/2003 | Aziz et al. | |
| 6,658,568 B1 | 12/2003 | Ginter et al. | |
| 6,675,153 B1 | 1/2004 | Cook et al. | |
| 6,704,873 B1 | 3/2004 | Underwood | |
| 6,711,679 B1 | 3/2004 | Guski et al. | |
| 6,715,080 B1 | 3/2004 | Starkovich et al. | |
| 6,718,470 B1 | 4/2004 | Adams et al. | |
| 6,718,535 B1 | 4/2004 | Underwood | |
| 6,763,459 B1 | 7/2004 | Corella | |
| 6,766,454 B1 | 7/2004 | Riggins | |
| 6,853,988 B1 | 2/2005 | Dickenson et al. | |
| 6,865,674 B1 | 3/2005 | Mancini et al. | |

(56) References Cited

U.S. PATENT DOCUMENTS

| | | | |
|---|---|---|---|
| 6,889,325 | B1 | 5/2005 | Sipman et al. |
| 6,973,571 | B2 | 12/2005 | Lee et al. |
| 7,000,105 | B2 | 2/2006 | Tallent, Jr. et al. |
| 7,072,870 | B2 | 7/2006 | Tallent, Jr. et al. |
| 7,076,784 | B1 | 7/2006 | Russell et al. |
| 7,080,251 | B2 | 7/2006 | Fujishiro et al. |
| 7,080,409 | B2 | 7/2006 | Eigeles |
| 7,100,195 | B1 | 8/2006 | Underwood |
| 7,130,998 | B2 | 10/2006 | Balfanz et al. |
| 7,165,178 | B2 | 1/2007 | Gien et al. |
| 7,167,985 | B2 | 1/2007 | Ahmed |
| 7,177,839 | B1* | 2/2007 | Claxton et al. ............... 705/44 |
| 7,200,573 | B2 | 4/2007 | Miller et al. |
| 7,206,805 | B1 | 4/2007 | McLaughlin, Jr. |
| RE40,444 | E * | 7/2008 | Linehan |
| 7,424,616 | B1 | 9/2008 | Brandenburg et al. |
| 2001/0011255 | A1* | 8/2001 | Asay et al. ................ 705/76 |
| 2001/0020228 | A1 | 9/2001 | Cantu et al. |
| 2001/0034724 | A1 | 10/2001 | Thieme |
| 2002/0029194 | A1 | 3/2002 | Lewis et al. |
| 2002/0029200 | A1 | 3/2002 | Dulin et al. |
| 2002/0029337 | A1 | 3/2002 | Sudia |
| 2002/0029350 | A1 | 3/2002 | Cooper et al. |
| 2002/0046188 | A1 | 4/2002 | Burges et al. |
| 2002/0059143 | A1 | 5/2002 | Frankel |
| 2002/0062438 | A1 | 5/2002 | Asay |
| 2002/0065695 | A1 | 5/2002 | Francoeur et al. |
| 2002/0095579 | A1 | 7/2002 | Yoshiura et al. |
| 2002/0112156 | A1 | 8/2002 | Gien et al. |
| 2002/0124172 | A1 | 9/2002 | Manahan |
| 2002/0128940 | A1 | 9/2002 | Orrin et al. |
| 2002/0129248 | A1 | 9/2002 | Wheeler et al. |
| 2004/0111379 | A1 | 6/2004 | Hicks et al. |
| 2004/0187031 | A1 | 9/2004 | Liddle |
| 2005/0114666 | A1 | 5/2005 | Sudia |
| 2005/0132229 | A1 | 6/2005 | Zhang et al. |
| 2006/0004670 | A1 | 1/2006 | McKenny et al. |
| 2007/0073621 | A1 | 3/2007 | Dulin et al. |
| 2008/0010665 | A1 | 1/2008 | Hinton et al. |

FOREIGN PATENT DOCUMENTS

| | | |
|---|---|---|
| WO | WO 98/26386 A1 | 6/1998 |
| WO | WO 99/22291 | 5/1999 |
| WO | WO 00/45564 | 5/2000 |
| WO | WO 00/45564 | 8/2000 |
| WO | WO 00/67143 | 11/2000 |
| WO | WO 01/18717 | 3/2001 |
| WO | WO 01/18717 A1 | 3/2001 |
| WO | 98/26385 A3 | 4/2010 |

OTHER PUBLICATIONS

Menezes et al, "Handbook of Applied Cryptography", Section 13.4.2 and 13.4.*

"Baltimore Announces Support for Identrus, the Global Trust Organization," Business Wire, New York: Apr. 12, 1999, p. 1; Proquest #40459204, 3pgs.

Brown-Humes, Christopher et al., "Banks join forces to provide guarantees on internet trading", Financial Times, London (UK): Apr. 12, 1999, p. 20; Proquest #40448447, 3pgs.

"Entrust Technologies Supports Newly Formed Identrus Organization," Business Editors, Business Wire, New York: Apr. 12, 1999, p. 1; Proquest #40463049, 3pgs.

Hallerman, David, "Will banks become E-commerce authorities?", Bank Technology News, New York: Jun. 1999. vol. 12. Iss. 6; p. 1; Proquest #42664468, 8pgs.

"Identrus Begins Pilot, Bits Opens Doors to Lab," Corporate EFT Report, Potomac, MD: Jul. 21, 1999, vol. 19, Iss. 14; p. 1; Proquest #43335701, 2pgs.

Kutler, Jeffrey, "ABA's Certificate Venture Aims to Give Banks the Lead in Secure Net Payments", American Banker, New York, N.Y.: May 14, 1999. vol. 164, Iss. 92; p. 1; Proquest #41354786, 3pgs.

Pamatatau, Richard, "CA anticipates a secure e-commerce infrastructure", Dominion, Wellington, New Zealand, Jul. 26, 1999, p. IT.8, Proquest #43762280, 3pgs.

Soloman, Howard; "Canadian banks vault into e-com identity service," Computing Canada, Willowdale, Ontario, Canada: Jun. 4, 1999, v25i22p. 23; Proquest #42244579, 3pgs.

"ValiCert Selected as Validation Technology for Identrus' Global Business-to-Business E-Commerce Pilot", PR Newswire, New York, NY: Jul. 12, 1999. p. 1; Proquest #43079343, 3pgs.

ABA School of Bank Card Management, http://www.aba.com/aba/ConferencesandEducation/SCH_BC99.asp.

"Acceptance of Signature Guarantees From Eligible Guarantor Institutions", 56 Fed. Reg. 18380, (Apr. 22, 1991).

"Acceptance of Signature Guarantees From Eligible Guarantor Institutions", 56 Fed. Reg. 46748, (Sep. 16, 1991) (to be codified at 17 CFR pt. 240).

Aiken, Peter et al., Microsoft Computer Dictionary, Microsft Press, 5th Edition, p. 290.

Aslam, Taimur, Protocols for e-commerce: including related article on BlueMoney commerce model, Dr. Dobb's Journal, Dec. 1998.

Banking Bulletin from Christopher M. Cross, Deputy Comptroller for Compliance, Comptroller of the Currency Administrator of National Banks, to national Banks Registered as a Transfer Agent, District Deputy Comptrollers, Department and Division Heads, and all Examining Personnel, Re: Adoption of New Transfer Agent (Feb. 12, 1992).

Biddle, C. Bradford, "Comment, Misplaced Priorities: The Utah Digital Signature Act and Liability Allocation in a Public Key Infrastructure", San Diego Law Review 33, 1143, 1996.

Breedon, Richard C., Chairman, U.S. Securities and Exchange Commission, Letter to the Honorable Jake Gam, Senate Banking, Housing, and Urban Affairs Committee (Mar. 6, 1990).

Brown, Mark R., "Special Edition Using Netscape 2" 1995. 2nd Edition, p. 287,288, 876-879.

Guttman, Egon, Professor of Law, The American University, Washington College of Law, letter to Jonathan G. Katz, Esq., Secretary to the Securities and Exchange Commission, Re: Securities Exchange Act Release No. 34-29663 Notice of Proposed Rule Making, new Rule 17 Ad-15 File No. 57-27-91 (Oct. 28, 1991).

Hallam-Baker, Phillip M., Micro Payment Transfer Protocol (MPTP), Ver. 0.1, W3C Working Draft, at http://www.w3.org/pub/WWW/TR/WD-mptp-951122 (Nov. 22, 1995).

Jueneman, Robert R., of GTE laboratories, "E-mail to Hal Finney, re: Nonrepudiation and CA liabilities", Oct. 19, 1995, 15:31 EDT) (ftp://ftp.tis.com/pub/pem-dev/archive).

Jueneman, Robert R., of GTE laboratories, "E-mail to Mike Roe and Warwick Ford, re: User Key Material Proposal", Sep. 8, 1994, 5:49 EDT) (ftp://ftp.tis.com/pub/pem-dev/archive).

Jueneman, Robert R., of GTE laboratories, "E-mail to Peter Willimas, Verisign, re: Certificate hierarchies and SEPP/STT concepts, part 2", Oct. 13,1995, 17:49 EDT) (ftp://ftp.tis.com/pub/pem-dev/archive).

Jueneman, Robert R., of GTE laboratories, "E-mail to Phill Hallam, W3C, re: Nonrepudiation and CA Liabilities", Oct. 16, 1995, 15:54 EDT) (ftp://ftp.tis.com/pub/pem-dev/archive).

Kaner, Cem, The Insecurity of the Digital Signature, at http://www.badsoftware.com/digsig.htm (Sep. 1997).

Linehan, Mark & Gene Tsidik, Internet Keyed Payments Protocol (iKP), at http://www.zurichibm.com/Technolo.../ecommerce/draft-tsudik-ikp-00.txt (Jul. 1995).

Marketing Brochure, Securities Transfer Agent Medalfion Program (1991).

Merrill, Charles R., "An Attorney's Roadmap to the Digital Signature Guideline", in 1318 Lecture Notes in Computer Science 291, 291-297 (Rafael Hirschfield ed. 1997).

Mitchell, C.J. et al., Contemporary Cryptology: The science of Information Integrity pp. 325-378 (Simmons ed., IEEE Press, 1992).

Pfitzmann, Birgit, "Digital Signatures Schemes", 1100 Lecture Notes in Computer Science (Goss et al. eds. 1996).

Schapiro, Mary L., "Clarifying Elimination of Stock Certificates", Wall Street Journal, Jan. 17, 1991.

(56) References Cited

OTHER PUBLICATIONS

SET: Secure Electronic Transaction Specification, May 31, 1997, Version 1, pp. 1-619.
Patent Cooperation Treaty, "PCT International Search Report", issued for PCT/US00/24661, mailed Jan. 25, 2001.
Patent Cooperation Treaty, "PCT International Search Report", issued for PCT/US00/24607, mailed Jan. 9, 2001.
Patent Cooperation Treaty, "PCT International Search Report", issued for PCT/US02/12947, mailed Jun. 21, 2002.
Patent Cooperation Treaty, "PCT International Search Report", issued for PCT/US01/25389, mailed Nov. 23, 2001.
Patent Cooperation Treaty, "PCT International Search Report", issued for PCT/US01/28275, mailed Dec. 31, 2001.
Patent Cooperation Treaty, "PCT International Search Report", issued for PCT/US01/28277, mailed Dec. 14, 2001.
Patent Cooperation Treaty, "PCT International Search Report", issued for PCT/US01/28278, mailed Dec. 3, 2001.
Patent Cooperation Treaty, "PCT International Search Report", issued for PCT/US00/24662, mailed Jan. 23, 2001.
Patent Cooperation Treaty, "PCT International Search Report", issued for PCT/US00/24663, mailed Dec. 29, 2000.
Patent Cooperation Treaty, "PCT International Search Report", issued for PCT/US01/25388, mailed Nov. 19, 2001.
Patent Cooperation Treaty, "PCT International Search Report", issued for PCT/US00/03552, mailed Jun. 13, 2000.
Patent Cooperation Treaty, "PCT International Search Report", issued for PCT/US00/03550, mailed May 2, 2000.
Patent Cooperation Treaty, "PCT International Search Report", issued for PCT/US00/24606, mailed Jan. 17, 2001.
Patent Cooperation Treaty, "PCT International Search Report", issued for PCT/US00/24608, mailed Dec. 8, 2000.
Patent Cooperation Treaty, "PCT International Search Report", issued for PCT/US09/00357, mailed Mar. 24, 2009.
European Patent Office, Supplementary European Search Report for EP 00961672, Munich Germany, Jun. 12, 2009.
Sugiyama, "Investigation in the USA on Authentication Business in Financial Institution", The Center for Financial Industry Information Systems (FISC), No. 205, pp. 50-62, Sep. 1, 1998.
Japanese Patent Office, Office Action issued in Patent Application JP 2001-526778, on Feb. 10, 2010.
ABA School of Bank Card Management http://www.aba.com/aba/ConferencesandEducation/SCH_BC99.asp.
C. Bradford Biddle, Comment, *Misplaced Priorities: The Utah Digital Signature Act and Liability Allocation in a Public Key Infrastructure*, 33 San Diego Law Review 1143 (1996).
Charles R. Merrill, *An Attorney's Roadmap to the Digital Signature Guideline*, in *1318 Lecture Notes in Computer Science* 291, 291-297 (Rafael Hirschfeld ed. 1997).
Phillip M. Hallam-Baker, Micro Payment Transfer Protocol (MPTP) Ver. 0.1, W3C Working Draft, at http://www.w3.org/pub/WWW/TR/WD-mptp-951122 (Nov. 22, 1995).
Mark Linehan & Gene Tsidik, Internet Keyed Payments Protocol (iKP), at http://www.zurichibm.com/Technolo.../ecommerce/draft-tsudik-ikp-00.txt (Jul. 1995).
C.J. Mitchell et al., *Contemporary Cryptology: The Science of Information Integrity* 325-378 (Simmons ed., IEEE Press 1992).
MasterCard Int'l Inc. Operations Manual §§ 5.11-5.14 (Nov. 1993).
Birgit Pfitzmann, *Digital Signatures Schemes*, 1100 *Lecture Notes in Computer Science* (Goss et al. eds. 1996).
E-mail from Robert R. Jueneman, GTE Laboratories, to Phill Hallam, W3C, re: Nonrepudiation and CA Liabilities (Oct. 16, 1995 15:54 EDT)(ftp://ftp.tis.com/pub/pem-dev/archive).
E-mail from Robert R. Jueneman, GTE Laboratories, to Peter Williams, Verisign, re: Certificate hierarchies and SEPP/STT concepts, part 2 (Oct. 13, 1995 17:49 EDT)(ftp://ftp.tis.com/pub/pem-dev/archive).
E-mail from Robert R. Jueneman, GTE Laboratories, to Mike Roe and Warwick Ford, re: User Key Material Proposal (Sep. 8, 1994 5:49 EDT)(ftp://ftp.tis.com/pub/pem-dev/archive).
E-mail from Robert R. Jueneman, GTE Laboratories, to Hal Finney, re: Nonrepudiation and CA liabilities (Oct. 19, 1995 15:31 EDT)(ftp://ftp.tis.com/pub/pem-dev/archive).
Banking Bulletin from Stephen M. Cross, Deputy Comptroller for Compliance, Comptroller of the Currency Administrator of National Banks, to National Banks Registered as a Transfer Agent, District Deputy Comptrollers, Department and Division Heads, and all Examining Personnel, Re: Adoption of New Transfer Agent (Feb. 12, 1992).
Marketing Brochure, Securities Transfer Agent Medallion Program with attached blank stamp agreements (1991).
STAMP Initiative Receives Support from SEC, STA Newsletter (The Securities Transfer Association, Inc.), Jun. 30, 1990, at 1, 4.
Acceptance Of Signature Guarantees From Eligible Guarantor Institutions, 56 Fed. Reg. 18380 (Apr. 22, 1991).
Mary L. Shapiro, Clarifying Elimination of Stock Certificates, Wall St. J., Jan. 17, 1991.
Letter from Richard C. Breeden, Chairman, United States Securities and Exchange Commission, to The Honorable Jake Garn, Senate Banking, Housing, and Urban Affairs Committee (Mar. 6, 1990).
Acceptance Of Signature Guarantees From Eligible Guarantor Institutions, 56 Fed. Reg. 46748 (Sep. 16, 1991)(to be codified at 17 C.F.R. pt. 240).
Letter from Egon Guttman, Professor of Law, The American University, Washington College of Law, to Jonathan G. Katz, Esq., Secretary to the Securities and Exchange Commission, Re: Securities Exchange Act Release No. 34-29663 Notice of Proposed Rule Making, New Rule 17Ad-15 File No. 57-27-91 (Oct. 28, 1991).

* cited by examiner

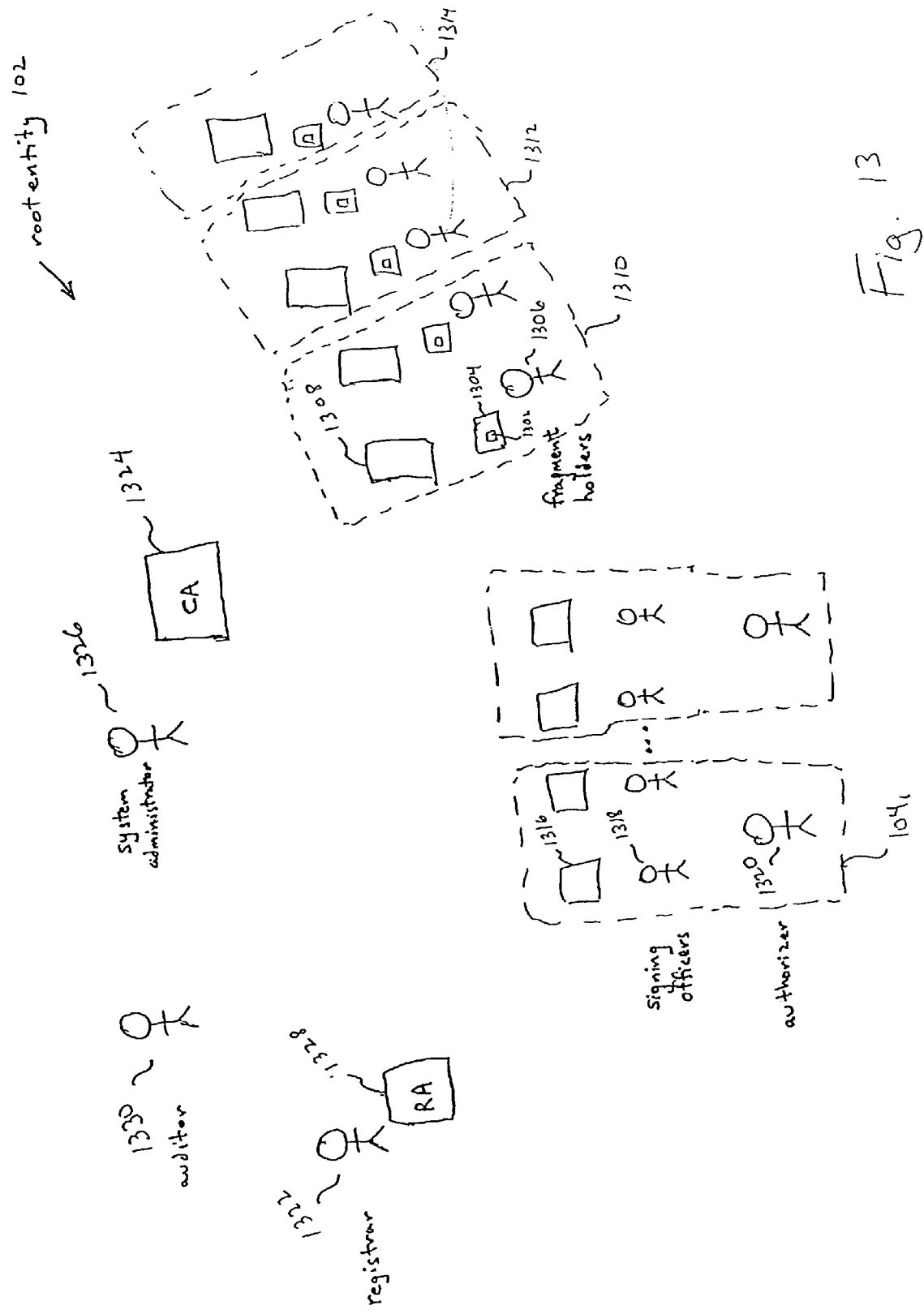

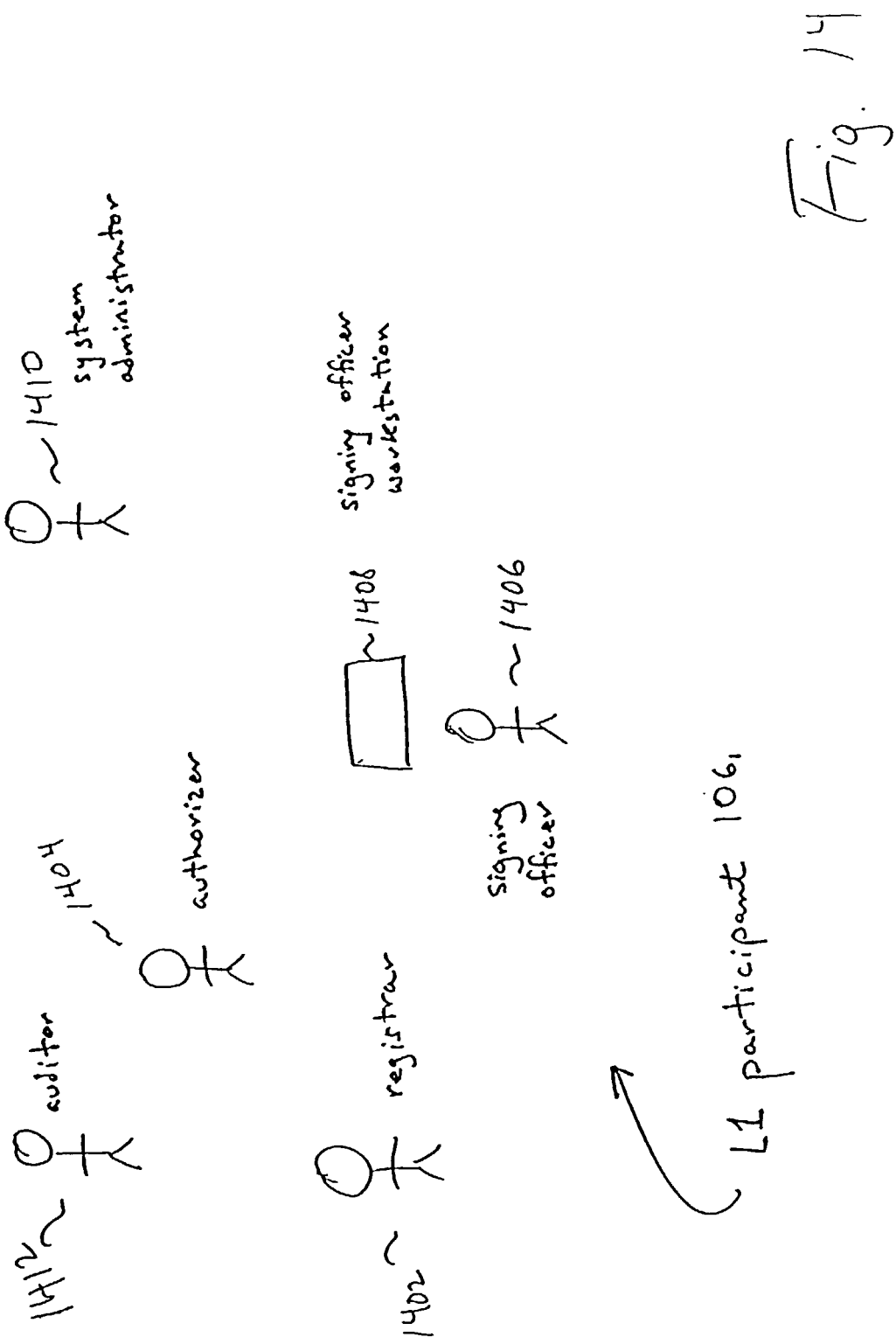

SYSTEM AND METHOD FOR PROVIDING CERTIFICATION-RELATED AND OTHER SERVICES

This patent application is a continuation of U.S. patent application Ser. No. 09/502,450 filed Feb. 11, 2000, now abandoned, which patent application claims priority from provisional patent applications 60/119,892, 60/119,894, 60/119,895, 60/119,898, and 60/119,958, each of which, along with said parent patent application is hereby incorporated by reference in its entirety into the present patent application. These five provisional applications were each filed on Feb. 12, 1999 and entitled: System and Process for Certification in Electronic Commerce. It is believed that no new matter has-been was added to the disclosure of this the parent patent application beyond that disclosed in the above-referenced five provisional patent applications.

BACKGROUND OF THE INVENTION

The data security market (including hardware) is anticipated to expand to $13.1 billion in sales by the year 2000, up from $6.9 billion in 1997. In addition, the Gartner Group estimates that the market for digital certificates totaled about $100 million in 1998 and will continue to show 100 percent growth in the near term. Soundview Financial recently predicted the certificate market will hit $1 billion in 2001.

SUMMARY OF THE INVENTION

Disclosed is a highly secure system for identifying parties over electronic networks, including the Internet. In the disclosed system, member institutions create an entity, referred to hereafter as the root entity, to establish a global, interoperable network of financial institutions which operate as certification authorities. As such, each participating financial institution (each, a "participant") issues digital certificates to customers and corporations and their employees, based on a set of uniform system rules and business practices. The root entity provides the infrastructure within which the system participants provide these services, including establishing technological and procedural systems to support system activities, developing and maintaining rules and regulations governing participation in the system, providing ongoing monitoring and data processing functions to limit the risks to system members and their customers, and establishing a dispute resolution mechanism for issues arising out of use of the system.

The technological, procedural, and legal frameworks established by the root entity and its members permit those members to provide more meaningful and better controlled identity certification services than have previously been available. By doing so, the system encourages the adoption of trusted business-to-business electronic commerce.

The root entity is intended to be a commercially viable, for-profit business that facilitates domestic and international business-to-business electronic commerce by creating a framework for the provision of certification authority services by its participants. Participants use the system to manage the risks involved in acting as certification authorities issuing digital certificates to parties who can then use those certificates to affix digital signatures to messages sent through electronic communications systems, including the Internet. The system is a "closed" system, in which only parties that have agreed to abide by the system's rules and regulations are allowed to participate. The system and its members operate in accordance with a set of operating rules (the "operating rules").

The system is comprised of regulated financial institutions coming together to take the basic technology provided by public key cryptography and public key infrastructure (PKI), and combine it with adherence to a common set of operating rules to facilitate electronic commerce. While the system provides the infrastructure for participating organizations, the service leverages the participants' existing customer base, and the financial institution entity as a trusted financial intermediary. The system is a multi-vendor system, and allows participants to customize the management of identity risk when dealing with individuals over an electronic medium with applications that best meet each particular participant's customer needs.

Participants may join the system either directly, as "Level One Participants" (L1 participants), or indirectly, as "Level Two Participants" (L2 participants). L1 participants may issue certificates either directly to subscribing customers or to L2 participants. L2 participants may issue certificates only directly to subscribing customers. In other respects, the two types of participants operate within the system in the same manner.

The system may be used to facilitate business-to-business e-commerce. The service provided by the system fits well with the needs of mid-size to large institutions for both secure transactions and communications with other businesses.

The disclosed system comprises the following key elements:

1. Risk Management

The system provides an infrastructure for managing risk. The following six, root entity-level key risk areas are analyzed and appropriate controls established within each:
   a. Operational
   b. Reputation
   c. Regulatory
   d. Strategic
   e. Credit
   f. Liquidity/Financial To further assist with risk mitigation, a "closed" system, as indicated above, is utilized—meaning that both sides of any transaction, are contractually bound to the same set of system rules and operating procedures. From a participant standpoint, the ability to track and monitor outstanding warranties is another feature which also provides the ability to manage risk.

2. Global root certificate authority

The root entity's responsibilities include delivery of the following:
   a. root technology.
   b. signing keys of all participating financial institutions, which in turn issue certificates to end-users or sign the keys of issuing corporations.
   c. establish the infrastructure to facilitate emergence of e-commerce applications, not the applications themselves.

3. Technologically interoperable organization

The system provides a platform for various technologies to "interoperate" with each other.
   a. Acting through their participating financial institution, business customers are able to recognize and validate certificates of other business customers.
   b. New vendors approach "interoperability" from both a sponsoring and a participating institution standpoint. Technical interoperability is structured in this way to ensure that compliance with technology specifications is equivalent to achieving actual operational interoperability.
  c. System interoperability extends beyond technology, to the operating rules, system procedures, and issuance practices of all participants within the system hierarchy.
  d. Warranty certificates are used to interact with multiple trading partners, across multiple business applications, in multiple jurisdictions.
4. High trust solution The trust feature, and benefit from it, is addressed by the system in a number of ways:
  a. The system leverages the traditional bank role in identifying customers for purposes of facilitating commerce, and operating as service providers in a regulated environment subject to significant oversight and regulation.
  b. The network is dedicated to maintaining high minimum standards.
  c. A digital certificate is only as trustworthy as the certifying authority that issued it. The accuracy and validity of a digital certificate is key to a recipient's reliance on a digital signature. By issuing such a digital certificate, the certifying authority certifies the identity of the person sending a message signed with the certificate.
  d. Through establishment and compliance with system rules, a PKI is developed that ensures the integrity of the certifying authority's operations.
5. Value-added/unique services offered As indicated, the system provides numerous security and technical benefits for all institutions involved. Additionally, in several key areas, the system is unique from other current or proposed systems.
  a. Validation check Unlike existing certification systems, the system requires a party to obtain affirmative confirmation of the validity of an identity. The system also provides the means to obtain that confirmation and a warranty thereon on a real-time or near real-time basis through an on-line status check. Thus, while the system and its participants maintain certificate revocation lists ("CRLs") like other systems for control purposes, the system primarily relies on checks of certificates with known "good status" rather than the more customary check of certificates that are known to be bad.
  b. Warranty/Assurance (aggregate limits on exposure to identity warranties)

One of the principle functions of the system is to provide warranties and assurances to participants in the network to limit exposure as a result of warranty issuance. Warranty in the system is defined as a warranty of certificate content and validity of certificate at time of issuance. To ensure the viability of these warranties, the system design imposes aggregate limits on the exposure that any issuing participant may incur through explicit warranties granted with respect to identity certificates issued by that institution. Because each warranty is bounded by the agreements among the parties, both in terms of financial risk and duration, it is possible for each L1 participant and the root entity to monitor the participant's compliance with this limit on a real-time basis.
    (1) The root entity monitors the cap of all issuing participants on a daily basis. In addition, the system monitors the cap on a real time basis.
    (2) The transactions may be captured on a real-time basis, and reported oil a periodic basis (to be determined) to the root entity.
    (3) The root entity can impose sanctions on participants for violation of warranty cap rules.
    (4) The system comprises a mechanism by which to increase or decrease warranty cap.
  c. Required collateral posting To help ensure liquidity for payment of potential warranty assurance claims, collateral is required of all institutions issuing this assurance. The collateral is based on a combination of two criteria:
    (1) Credit Based Collateral An individual participant is required to post a specific amount of collateral in accordance with each participant's specific credit rating. Credit rating is checked on a periodic basis, or whenever revised by a rating firm. (It may take the form of a continuous monitoring of credit rating, leading to changes in collateral happening in concert with changing credit ratings).
    (2) Performance Based Collateral This collateral requirement is designed to lower the requirements for participants that have fewer unresolved claims per warranties outstanding. Calculation methodology is based on prior claims and loss history. The required amount is analyzed periodically.

This methodology has been developed to ensure that the legal "preference" issues are adequately addressed. Note that there is no collateral posting requirement in the system based specifically on claims outstanding.
  d. Hardware-based certificates System participants employ only hardware-based certificates. Relying solely on hardware based certificates differentiates the system from other CA vendors, which all provide software to enable certificate issuance. This point of differentiation strengthens the PKI and reduces operational risk. End-users have smart-card based certificates that employ standard smart-card technology, thus enforcing the same principles of vendor interoperability that the system applies to certificate authority vendors.

Secondary relationships may develop between participants and vendors to assist in the implementation of various applications. However, participants are required to demonstrate that non-system software and hardware is Year 2000 compliant.
  e. Shuffled fragmented root key The ability to provide for shuffled and fragmented root keys is another security feature specific to the system.

BRIEF DESCRIPTION OF THE DRAWINGS

The above summary of the invention will be better understood when taken in conjunction with the following detailed description and accompanying drawings, in which:

FIG. 13 illustrates aspects of the root entity of the present system; and

FIG. 14 illustrates aspects of a participant of the present system.

DETAILED DESCRIPTION OF THE PREFERRED EMBODIMENTS

I. Enterprise Structure

Figure 1:
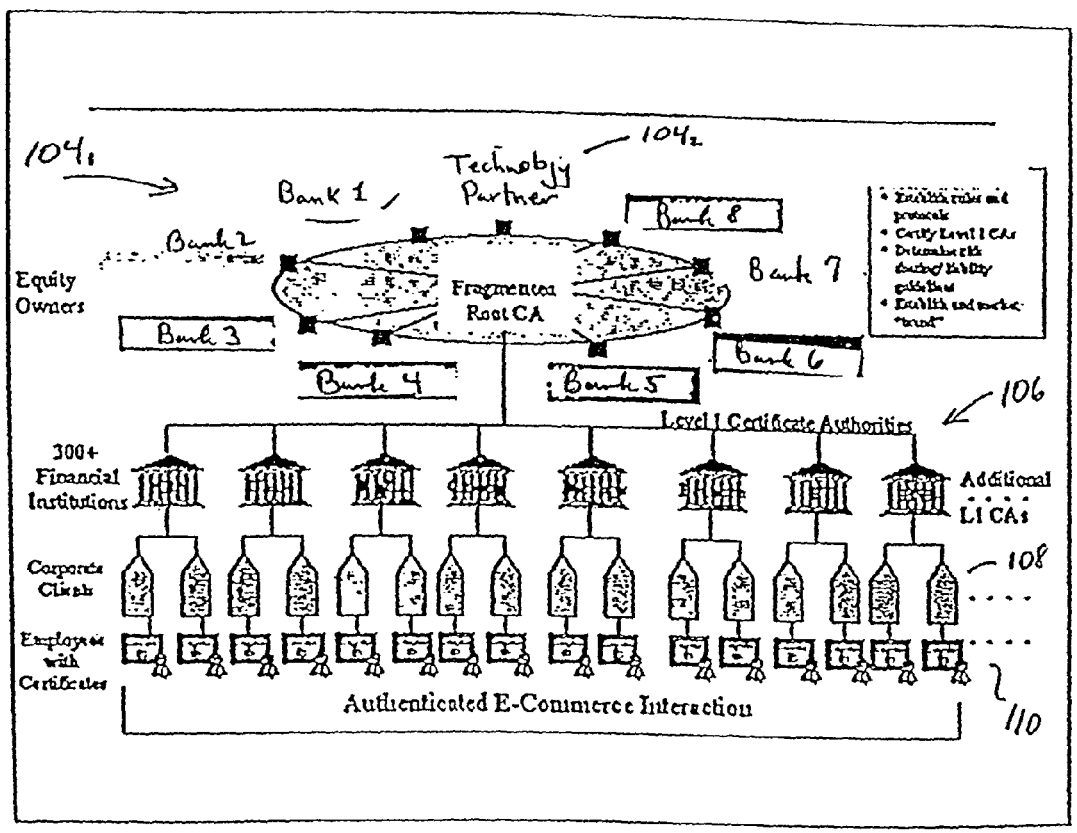
FIG. 1 is a high level graphic depiction of the system structure.

FIG. 1 is a high level graphic depiction of the system structure. The system comprises a root entity 102 that is initially formed as a global joint venture of eight founding member banks $104_1$ and a technology partner $104_2$. Equity membership is then expanded among regulated financial institutions to achieve a diversity of ownership from all major regions of the globe as well as from other financial industry sectors.

The system further comprises a plurality of L1 participants $106_1$, a plurality of corporate clients 108, and a plurality of employees 110 of corporate clients 108. Also part of the system, although not shown in FIG. 1, are a plurality of L2 participants $106_2$. L2 participants $106_2$ also typically have a plurality of corporate clients 108 which each typically have a plurality of employees 110.

A. Role of Root Entity 102

To facilitate operations of participants 106, root entity 102 creates an infrastructure within which participants 106 provide system services. Specifically, root entity 102 engages in the following functions:

1. Acting as a policy authority, establishing a standardized system and process, operational standards, and risk management requirements.
2. Acting as the root certification authority for the system to provide certification for participants 106, enabling them to certify the identities of their corporate customers.
3. Imposing auditing requirements for monitoring adherence to a set of uniform system rules, contracts, and business practices.
4. Performing a repository function, maintaining a database of the L1 participant certificates and their status, to permit root entity 102 to confirm the validity of a certificate at the request of a participant 106.
5. Performing a monitoring function, measuring each participant 106's aggregate warranty exposure.
6. Acting in an overseer role, monitoring compliance with collateral requirements and the payment of collateral upon a participant 106's default.
7. Assisting with branding and marketing for the system.
8. Establishing a platform for initial efforts.
9. Providing root key technology.
10. Providing technology for initial implementation and testing of the root key.

B. Role of Participants 106

1. In general

While root entity 102 is a for-profit entity, significant revenue opportunities also exist at the individual participant level. By offering add-on electronic services, or by "electronifying" existing customer services, participants 106 compete with each other to attract incremental revenue. Participants 106 also have the right to independently determine products, bundles, and services offered, and fees charged to customers. Root entity 102 does not address the fees that participants 106 charge their customers, other than establishing a processing fee for each validation to be paid by one participant to another; there is no interchange fee. This structure enhances the market for participant developed electronic commerce applications, and provides for the transformation of traditional bank products for electronic use. All L1 participants 106, are required to act as an issuing participant.

Participants 106 providing the services described above engage in the following activities:

1. Acting as a certification authority, verifying the identity of their customers and issuing digital certificates to those customers.
2. Acting as repository for the digital certificates they issue.
3. Acting as reliance manager for the digital certificates they issue.
4. Responding to requests for confirmation of the validity of digital certificates, and for explicit warranties of confirmations.
5. In the case of an L1 participant $106_1$, acting as a certification authority to an L2 participant $106_2$ and providing, as agent, reliance manager services to customers on behalf of the L2 participant $106_2$.
6. Acting as agent of their customers 108, to obtain confirmation of validity of digital certificates issued by other participants 106, and collect payments from and exercise rights against participants 106 when payments are due as a result of a breached warranty.
7. Provide other related services agreed to by participant 106 and its customer 108.

C. Role of L2 Participants $106_2$

Initially, all L2 participants $106_2$ are also required to be financial institutions. Specific eligibility requirements are included within the operating rules described below. The role of an L2 participant $106_2$ is to issue certificates to its customers 108 and act as principal on warranties issued. L1 participants $106_1$, provide the outsourced reliance manager function to their L2 participants $106_2$.

D. Criteria for Participation in the System

The criteria for participation are dependent upon the entity's role as an L1 participant 106, L2 participant $106_2$, corporation (customer 108), or user (employee 110). In all cases, however, the criteria are designed to:

1. Protect the system and its members from the legal, operational, credit and reputational risks that may arise from the failure of a member to meet its obligations with respect to certificate and warranty issuance and usage.
2. Ensure that the institution is operationally competent to carry out its obligations within the system
3. Ensure that the system complies with all applicable laws E. Termination of Membership Participants 106 may be terminated only for specific reasons related to preserving system integrity and favorable risk posture. Procedures provide participants 106 with notice and opportunity to cure deficiencies. However, participants 106 may be suspended on an immediate and a summary basis to preserve system integrity. L2 Participants $106_2$ may be suspended or terminated either by an L1 participant 106, at request of root entity 102, or by root entity 102 directly (as backstop). Participants 106 may also elect to suspend or terminate membership in the system. Terminated participants 106 are required to take all necessary steps to terminate system-supported services, and to immediately inform their customers 108. Root entity 102 must also be able to invalidate (almost immediately) the subsequent validation of any certificates issued by suspended or terminated participants 106. (The above provisions apply equally to suspended participants 106.)

II. Operational Concepts

A. Operating Model Overview

Figure 2:
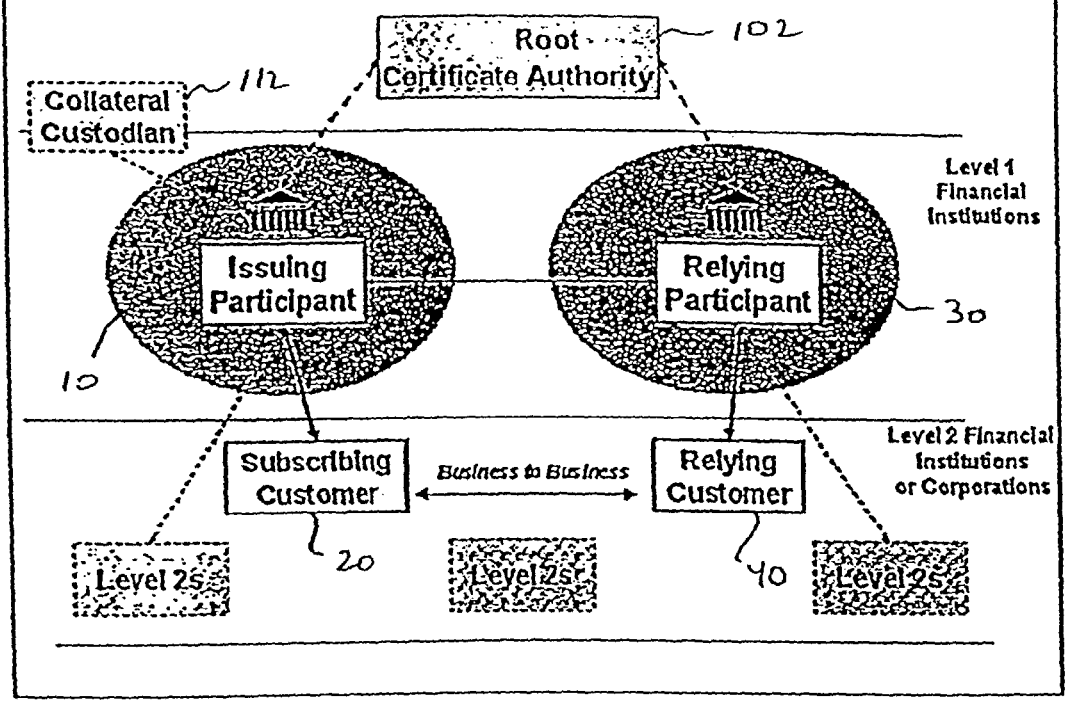
FIG. 2 is a block diagram illustrating the relationship between the parties in the system operating model.

The system is based on an operating model with five primary parties: root entity 102, an issuing participant 10, a subscribing customer 20, a relying participant 30, and a relying customer 40. The relationship between these parties is illustrated in FIG. 2. Also shown in FIG. 2 is a collateral custodian 112.

Each component depicted in FIG. 2 is certified by root entity 102 and possesses its own certificate, which in turn is validated through a trusted hierarchy. Certificates are issued to L1 participants $106_1$, which then issue their certificates to L2 participants $106_2$ or customers 108. The relationships, as depicted in FIG. 2, are: subscribing customer 20 is a customer of issuing participant 10, and relying customer 40 is a customer of relying participant 30. As described in more detail below, each customer 108 interacts with the system through its respective participant 106. In a typical transaction, a seller asks its financial institution (L1 participant) to validate the credentials of a buyer. The seller's financial institution contacts the buyer's financial institution, which in turn attests to the identity of its customer, a buyer. Conversely, if the buyer wishes to check a seller's certificate, the process takes place the same way, with each party relying on a digital certificate and digital signature by first consulting its own financial institution. In addition, as part of the process, the financial institution may offer an identity warranty service for either party, as described in more detail below. In this model, issuing participant 10 is the primary obligor on warranties, while relying participant 30 acts as an agent. Each L1 participant 106 maintains a collateral account with a collateral custodian which is distinct and separate from issuing participant 10, and which will support the warranty issuance capability.

B. Operational Flows

Figure 3:
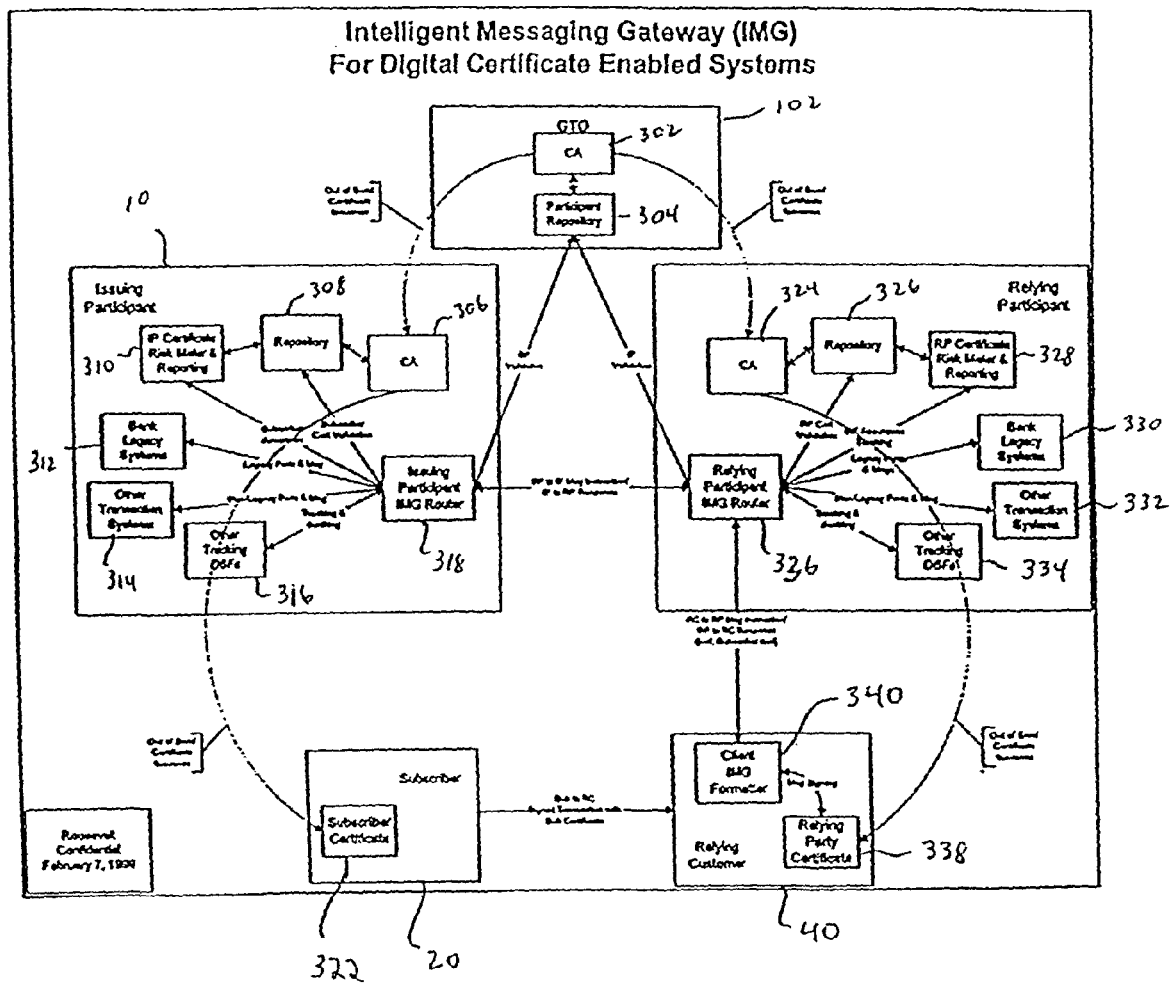
FIGS. 3-7 are a series of conceptual diagrams that illustrate the flow of data through the system for initialization, validation, and warranty processes.

FIGS. 3-7 are a series of conceptual diagrams that illustrate the flow of data through the system for initialization, validation, and warranty processes. FIG. 3 is described in this section. FIGS. 4-7 are described below.

As shown in FIG. 3, each entity in the operating model of FIG. 2 comprises elements that facilitate the business processes described below. In particular, root entity 102 comprises a certificate authority 302 and a participant repository 304. Certificate authority 302 issues digital certificates to L1 participants $106_1$ as described in more detail below.

Issuing participant 10 comprises a certificate authority 306 that is connected to a repository 308. Certificate authority 306 issues digital certificates to customers of issuing participant 10, as described in more detail below. Repository 308 is further connected to an IP certificate risk check and reporting module 310. Issuing participant 10 further comprises bank legacy systems 312, other transaction systems 314, and other tracking DBFs 316. Elements 308-316 are all connected to an intelligent messaging gateway (IMG) router 318 through which flows all messages to and from issuing participant 10 relating to the provision of system services.

Subscribing customer 20 has a digital certificate 322 that it receives from issuing participant 10. Subscribing customer 20 also has the necessary equipment to communicate with relying customer 40.

Relying participant 30 comprises a certificate authority 324 that is connected to a repository 326. Certificate authority 324 issues digital certificates to customers of relying participant 30, as described in more detail below. Repository 326 is further connected to an IP certificate risk meter and reporting module 328. Relying participant 30 further comprises bank legacy systems 330, other transaction systems 332, and other tracking DBFs 334. Elements 326-334 are all connected to an IMG router 336 through which flows all messages to and from relying participant 30 relating to the provision of system services.

Relying customer 40 has a digital certificate 338 and a client IMG formatter 340. Messages from relying customer 40 requesting a system service are formatted by IMG formatter 340 and transmitted to IMG router 336.

C. Proposed Business Process

The operating model is useful in understanding the structure of the system. To better understand the system at work, closer examination of the processes on the front and back-end is required. There are a number of discrete steps that occur within the normal operation of the system.

1. Initialization of L1 participants $106_1$

Figure 4:
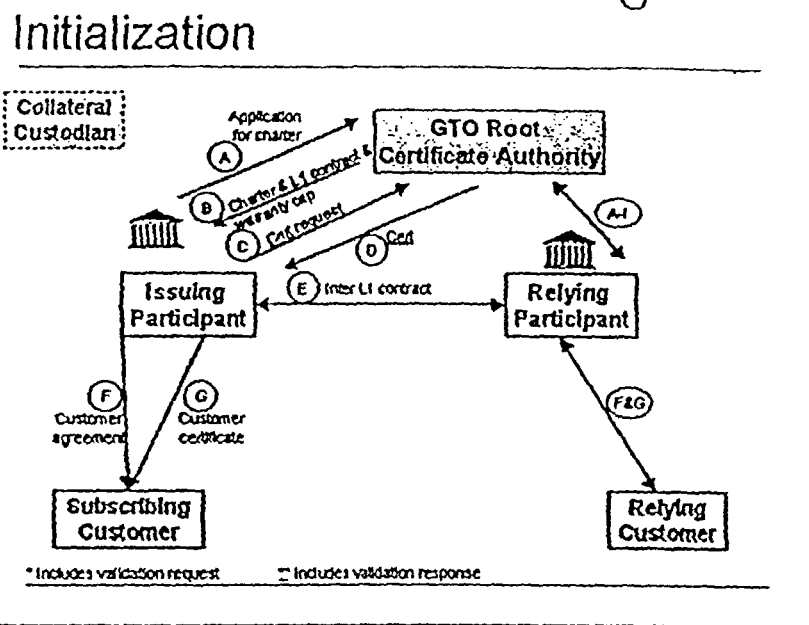

Initialization of L1 participants $106_1$ is described in connection with FIG. 4. As shown in FIG. 4, in step A, a prospective L1 participant $106_1$ applies for admission to the system. In step B, the applicant receives and signs a participation agreement and agrees to be bound by the operating rules. The prospective L1 participant must agree to act as an issuing participant 10 in order to also act as a relying participant 30. Also in step B, root entity 102 sets a maximum warranty cap for the applicant and a collateral amount that the applicant is required to post. The specific amount of collateral that a participant must post per warranty certificate issued varies from participant to participant based on established criteria—and as discussed below.

Root entity 102 also orients the L1 participant $106_1$ and helps establish an implementation schedule. The new L1 participant $106_1$ establishes internal certificate authority operation with appropriate testing and sign-off by root entity 102. The new L1 participant $106_1$ also opens a collateral account with collateral custodian 112 and deposits funds as required by root entity 102. Collateral custodian 112 notifies root entity 102 when such funds are transferred by the new L1 participant $106_1$ to collateral custodian 112. Collateral custodian 112 provides monthly reports to root entity 102 for each collateral account established at collateral custodian 112.

In step C, the L1 participant $106_1$ requests a digital certificate from root entity 102. In step D, root entity 102 issues the requested digital certificate to the L1 participant $106_1$. In step E, issuing participant 10 and relying participant 30 execute and exchange an inter L1 contract.

2. Issuance of Certificates

L1 participants $106_1$ issue two kinds of certificates—warranty certificates and utility certificates. The utility certificate is merely a technical necessity to facilitate the issuance and usage of the warranty certificate. (The utility certificates are discussed in more detail in the operating rules. The discussion below deals with usage of warranty certificates.)

Figure 5:
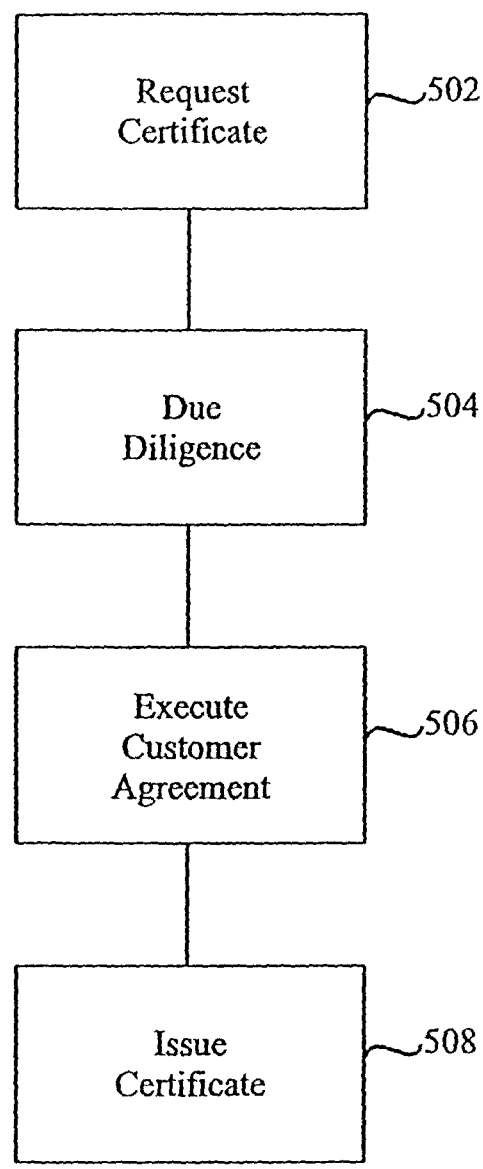

The warranty certificate is needed to obtain the validation and warranty assurance services discussed below. Warranty certificate issuance is described in connection with FIG. 5. As shown in FIG. 5, in step 502, subscribing customer 20 requests a certificate from issuing participant 10. In step 504, issuing participant 10 does an appropriate due diligence to ensure that "know your customer" requirements have been met. In addition, a request for a certificate must be authenticated and approved before certificate issuance. In step 506, subscribing customer 20 receives and signs a customer agreement with issuing participant 10 (see also step F in FIG. 4). In step 508, the issuing participant 10 issues the certificate to subscribing customer 20 (see also step G in FIG. 4). Analogous steps are performed to issue a digital certificate to relying customer 40.

3. Requesting an Identification Validation (Warranty Assurance with Zero Value)

Identification validation is described in connection with FIG. 6. It should be noted that all of the following interactions are associated with the warranty certificate and signed transactions.

Figure 6:
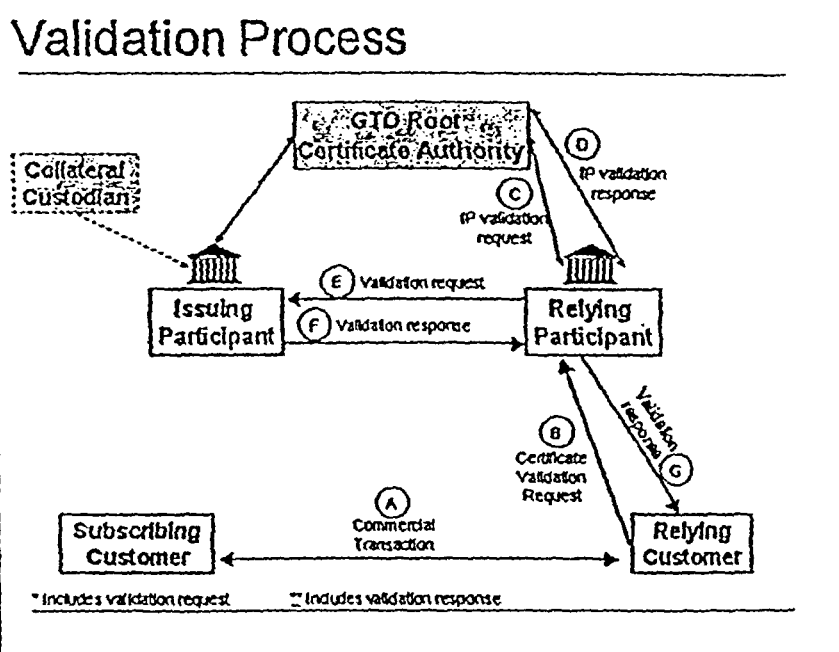

As shown in FIG. 6, in step A, subscribing customer 20 initiates a transaction with relying customer 40. In step B, relying customer 40 requests an identification validation from relying participant 30.

In step C, relying participant 30 checks with root entity 102 as to the validity of issuing participant 10's certificate. In step D, relying participant 30 receives a response to this check from root entity 102. In step E, relying participant 30 checks with issuing participant 10 as to the validity of subscribing customer 20's certificate. In step F, relying participant 30 receives a response to this check from issuing participant 10. In step G, relying participant 30 forwards the results of these checks to relying customer 40.

4. Requesting an Identification Validation with Warranty

Identification validation with warranty is described in connection with FIG. 7. As shown in FIG. 7, in step 702, subscribing customer 20 initiates a transaction with relying customer 40 (see also A in FIG. 7E). In step 704, relying customer 40 requests an identification validation with warranty from relying participant 30 (see also B in FIG. 7E). The request includes the estimated damages to relying customer 40 if subscribing customer 20 is misidentified and a specified period for which relying customer 40 wants the warranty to be valid.

Figure 7A:
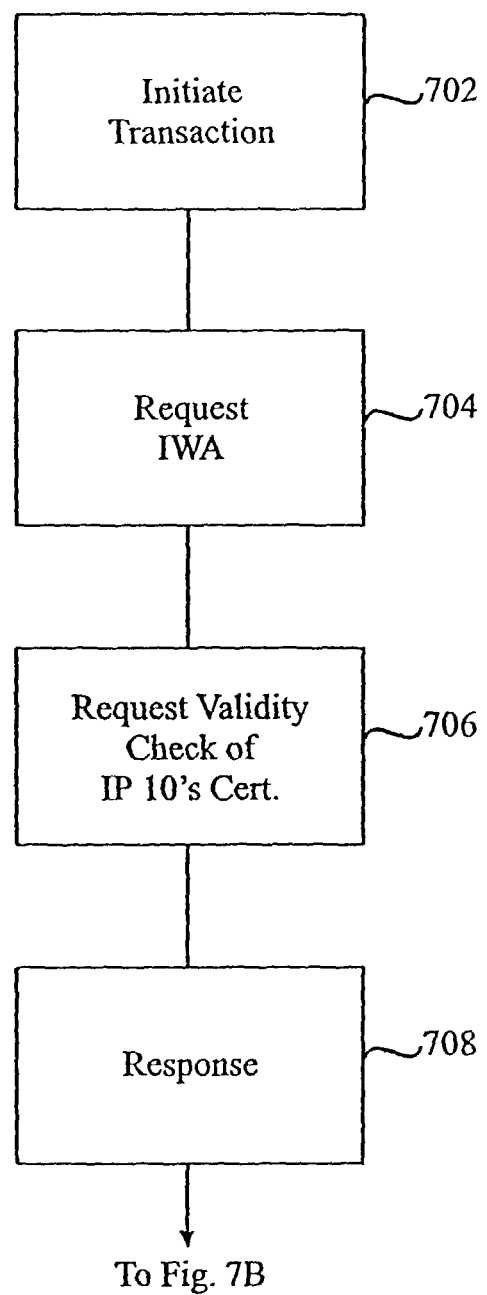
Figure 7B:
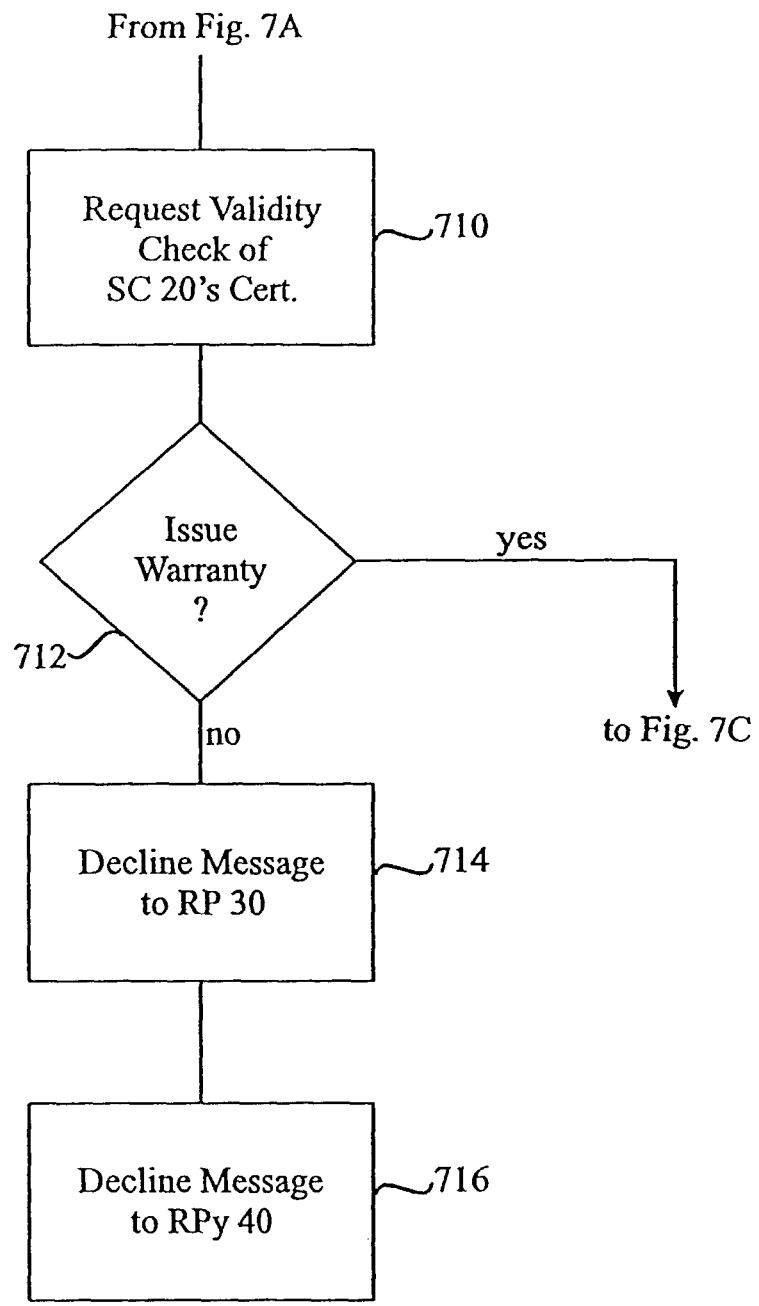
Figure 7C:
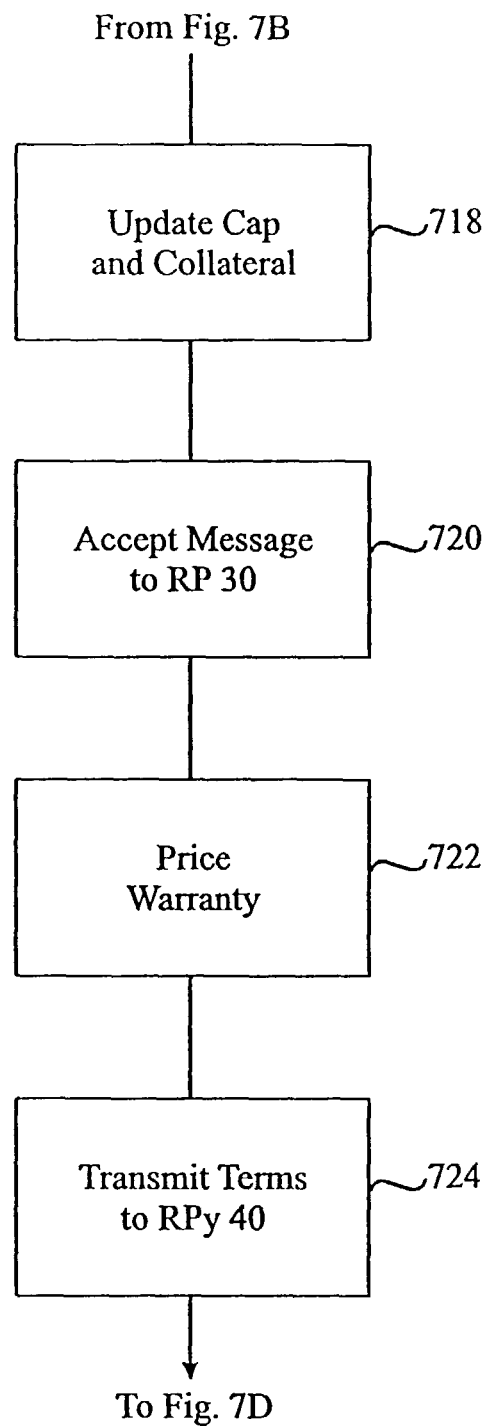
Figure 7D:
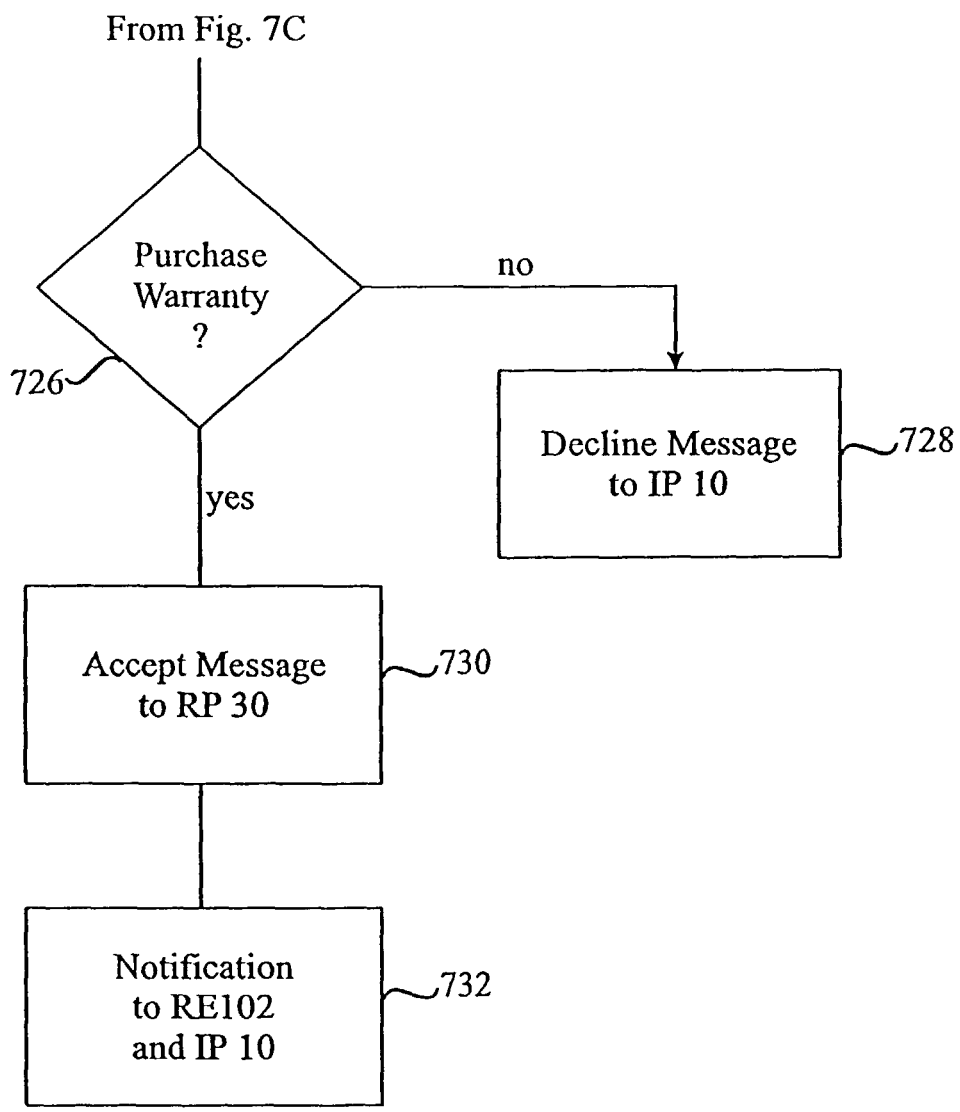
Figure 7E:
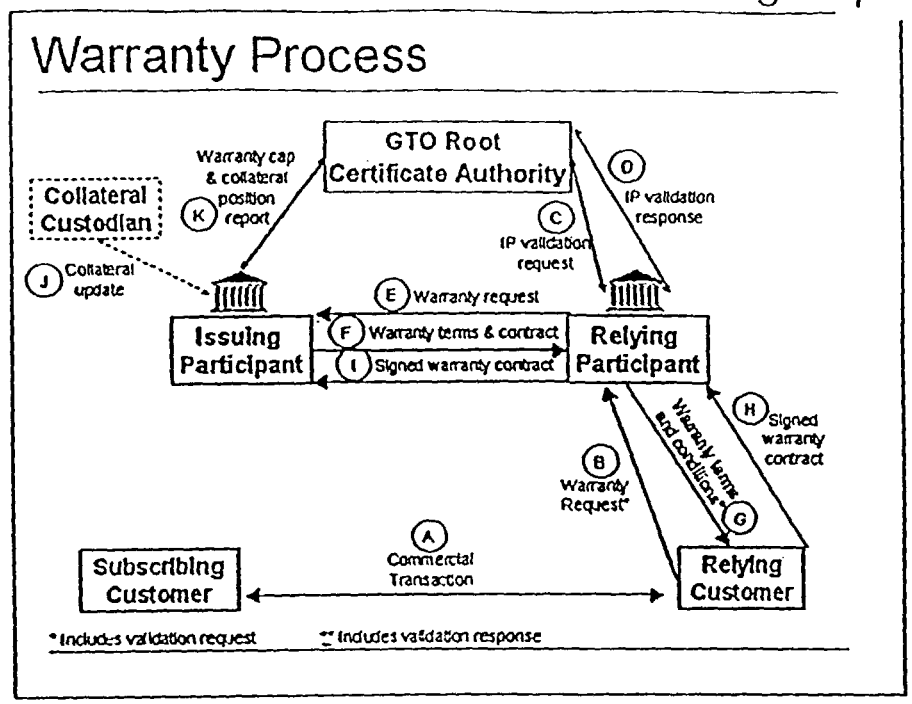

In step 706, relying participant 30 checks with root entity 102 as to the validity of issuing participant 10's certificate (see also C in FIG. 7E). In step 708, relying participant 30 receives a response to this check from root entity 102 (see also D in FIG. 7E). In step 710, relying participant 30 checks with issuing participant 10 as to the validity of subscribing customer 20's certificate and conveys the warranty request to issuing participant 10 (see also E in FIG. 7E). In step 712, issuing participant 10 checks the validity of subscribing customer 10's certificate and determines whether it will issue a warranty as requested and the cost for such a warranty. Issuing participant 10 may issue the warranty only if the warranty amount would not place the aggregate amount of warranties outstanding of issuing participant 10 over its warranty cap.

If issuing participant 10 declines to issue a warranty, then in step 714, it transmits a message to that effect to relying participant 30. In step 716, relying participant 30 forwards this message to relying customer 40, and this scenario ends. Otherwise, if issuing participant 10 agrees to issue a warranty, then the scenario continues with step 718, in which issuing participant 10 updates its total outstanding issuance against its cap to reflect the new activity, and within required time frames, updates collateral with respect to the formula outlined above (see also J in FIG. 7E). At the end of the day, or as required, issuing participant 10 exports current status of its warranty cap to root entity 102's Warranty Cap and Collateral Manager (WCCM) which reflects all warranty certificates issuing participant 10 issued that day.

As noted, issuing participant 10 is subject to a warranty issuance limit in total. In addition, however, issuing participants 10 may also choose to establish limits on a per-subscriber basis. This, however, is not a system requirement.

If issuing participant 10 decides to issue the warranty, then, in step 720, issuing participant 10 transmits its acceptance of the warranty request to relying participant 30. This message includes warranty terms and a contract (see F in FIG. 7E). In step 722, relying participant 30 prices the warranty. In step 724, relying participant 30 transmits the terms of the warranty to relying customer 40 (see also G in FIG. 7E). In step 726, relying customer 40 decides whether to purchase the warranty at the price and terms communicated. If relying customer 40 elects to decline the warranty, then in step 728, relying customer 40 declines the warranty and notifies issuing participant 10.

Otherwise, if relying customer 40 elects to accept the warranty, the scenario continues as follows: In step 730, relying customer 40 returns an acceptance of the terms of the warranty to relying participant 30 (liability remains with issuing participant 10). The acceptance includes the signed warranty contract (see H in FIG. 7E). In step 732, relying participant 30 notifies root entity 102 and issuing participant 10, and bills relying customer 40's account for the total fees associated with the warranty (in some cases, subscribing customer 20 is responsible for charges and the billing structure is different). The notification to issuing participant 10 includes the signed warranty contract (see I in FIG. 7E).

Relying participant 30 need not check with root entity 102 as to whether issuing participant 10 is within its limits before the transaction is completed. The reports required by the system inform root entity 102 (independently of issuing participant notification). Those banks over their limits are sanctioned as indicated in this document and the operating rules. In addition controls in the system monitor the limits.

In relation to warranties, if the window is thirty minutes or less between offer and acceptance, a follow-up validation of certificate status (for either issuing participant 10 or subscribing customer 20) is not required. Individual participants 106 may put into place more stringent requirements.

At the end of the day, root entity 102's warranty cap and collateral manager (WCCM) reflects all warranty transactions each issuing participant has issued that period, and issues a revised aggregate position to the participant 106 and root entity 102. The additional collateral is posted and transferred to the collateral account trustee. The WCCM does an end of period assessment to determine new level of collateral based on market changes.

To ensure that the system can accurately bill for these validation and warranty services, a system accounting mechanism for tracking must be in place. Only one issued warranty is allowed per transaction (for duration of that warranty). Only one bid can be issued (outstanding) per transaction at a time. This must be acted against before another bid is placed. The amount of the outstanding bid must be "reserved" against the warranty limit. Relying participant 30 can refuse to request a validation or Identity Warranty Assurance (IWA) from issuing participant 10 if legally prohibited from doing so (e.g. to comply with OFAC).

If one bank is both an Issuing and Relying Participant in a particular transaction, there is:
  No processing fee between banks
  No validation fee to root entity 102
  Still the application of warranty cap and collateral limits
    (from a warranty assurance standpoint)

5. Claims Processing Business Process

While the system provides for a claim review process to avoid disputes, if standards are adhered to, initiation of claims should be a relatively infrequent occurrence. However, in the event a transaction goes awry as a result of misidentified parties, the system is prepared to handle these situations, should they arise. It is also worth noting that these steps take place outside the normal range of activities, and are not a part of the standard operating flow.

Figure 8A:
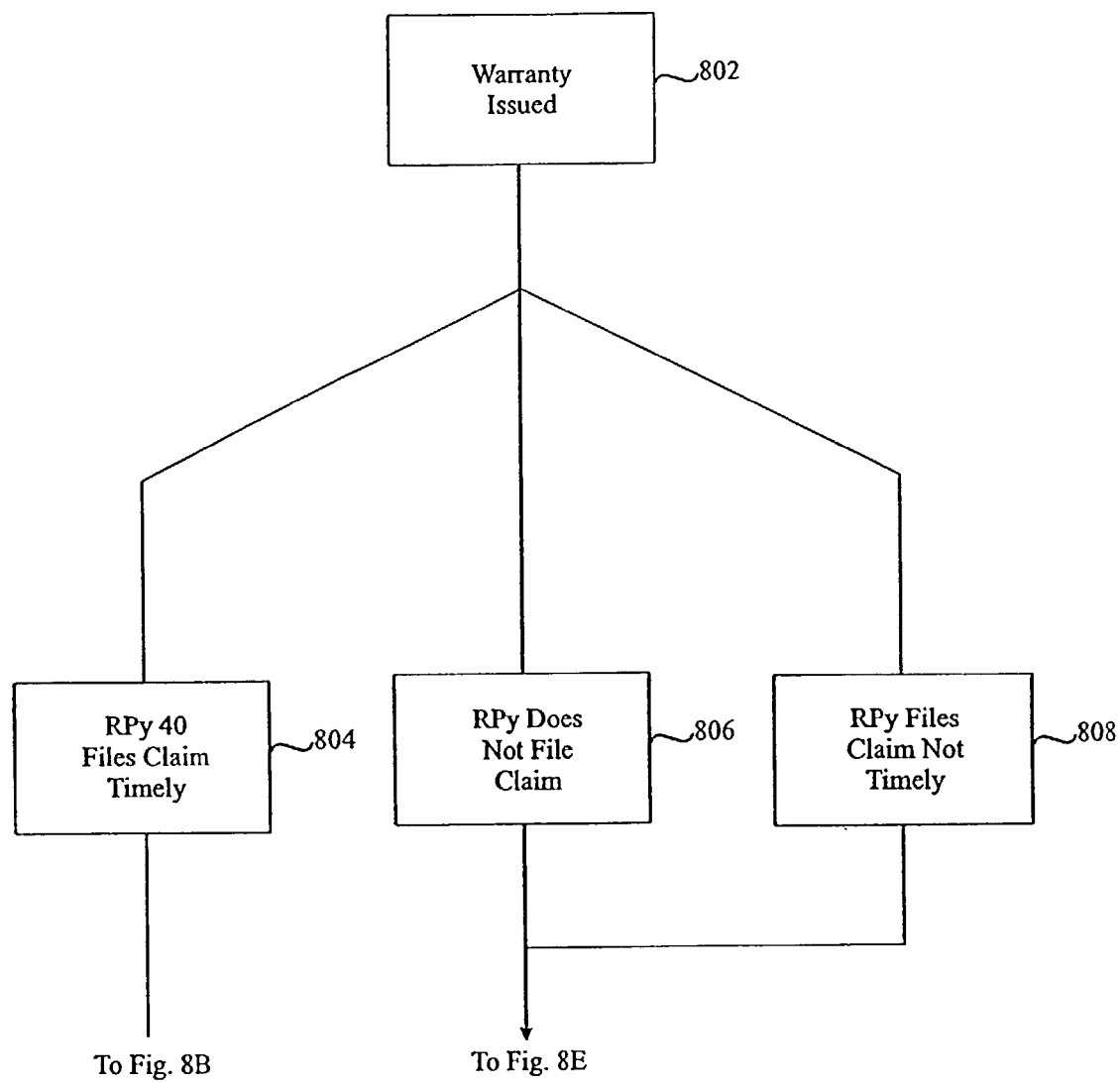
FIG. 8 illustrates aspects of the dispute resolution process of the present system.
Figure 8B:
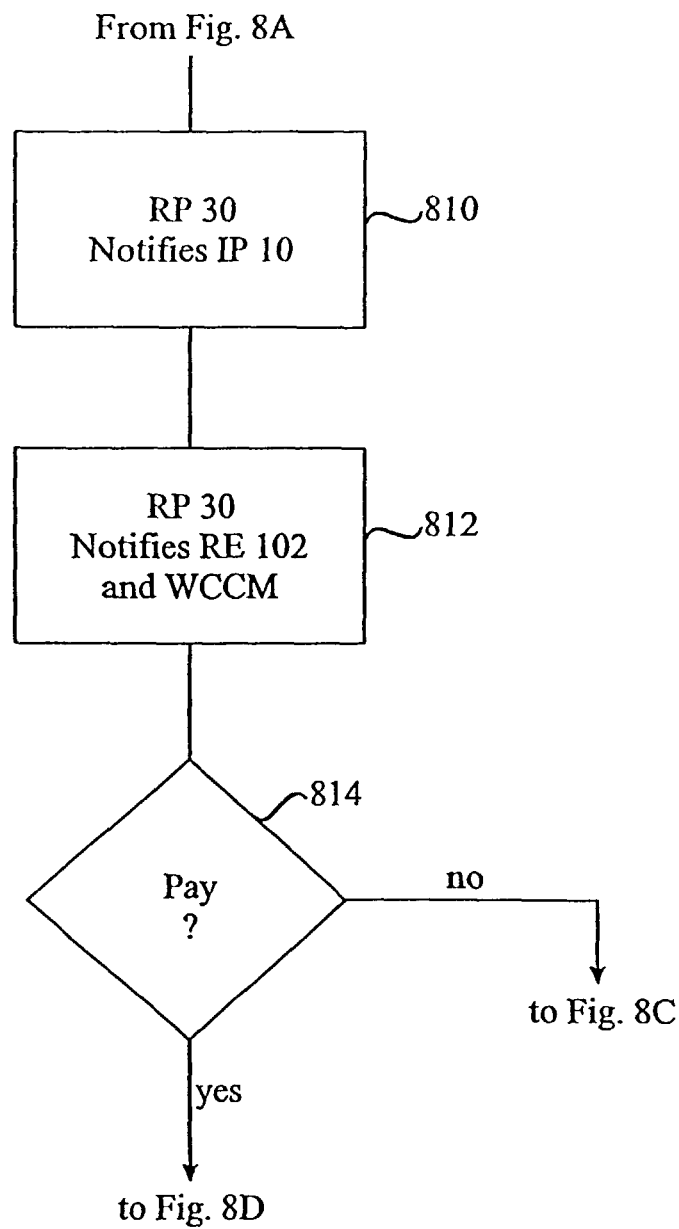
Figure 8C:
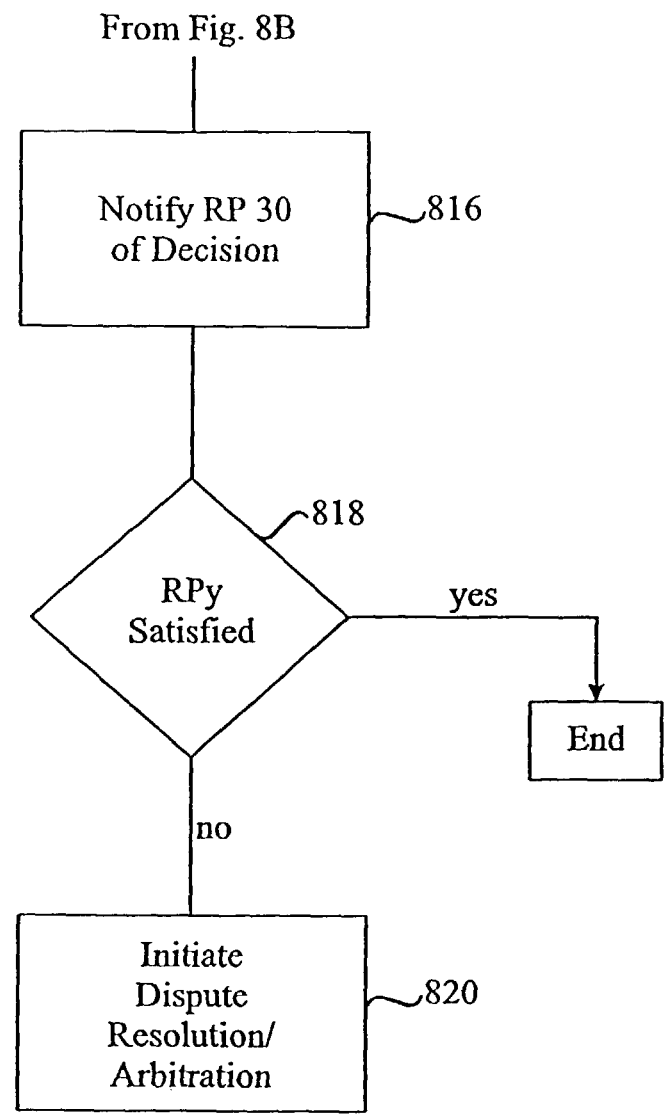
Figure 8D:
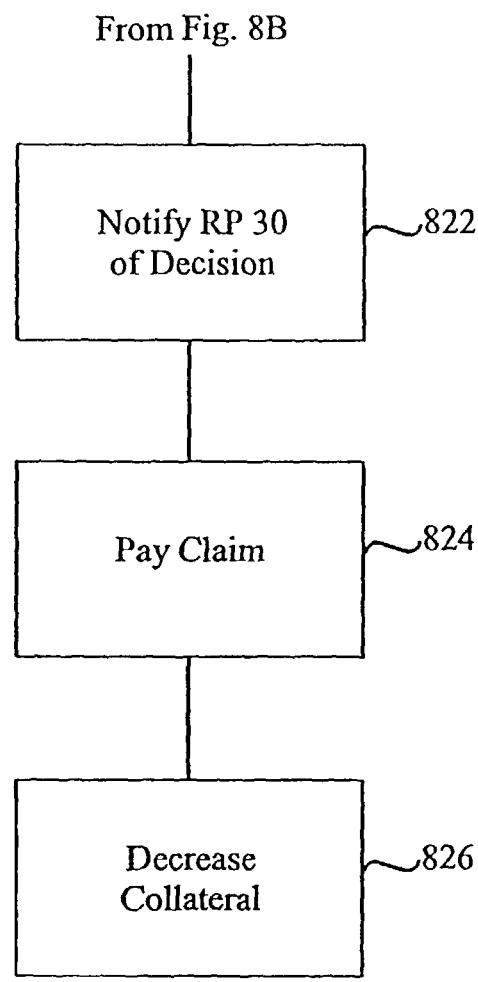
Figure 8E:
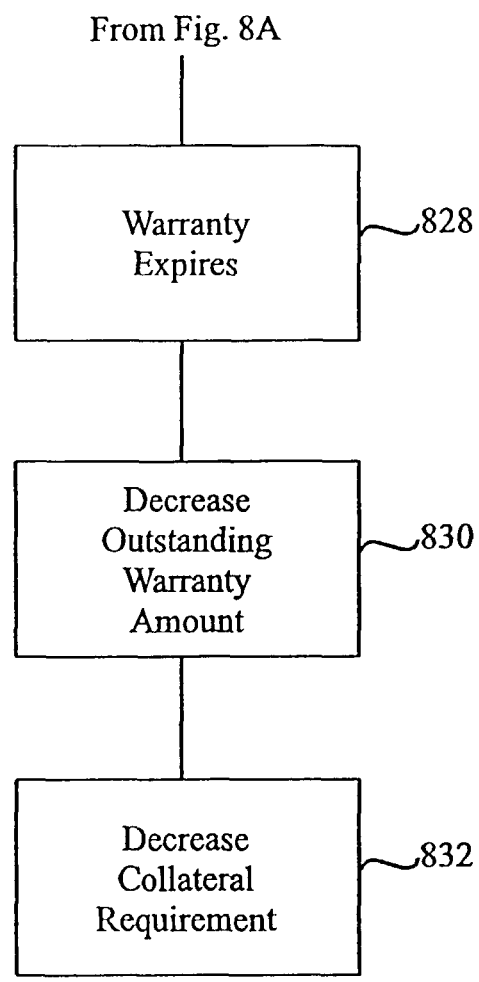
Figure 8F:
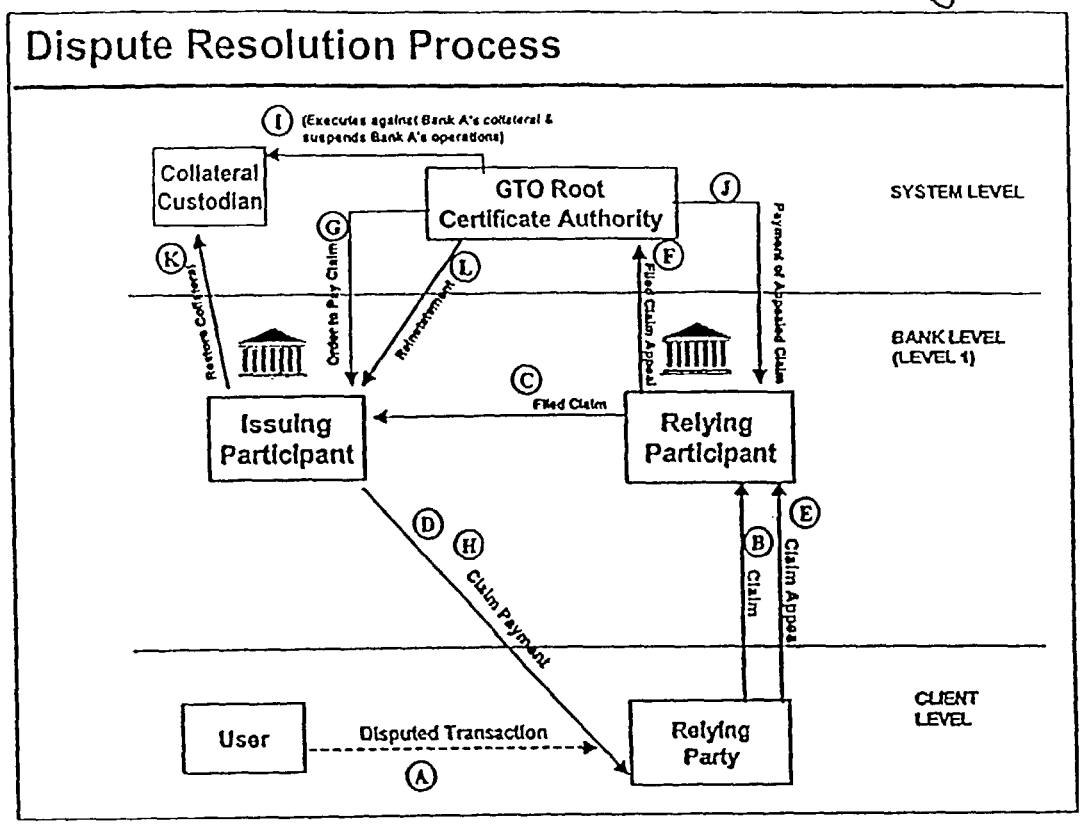

The claims processing business process is described in connection with FIG. 8. As shown in FIG. 8, after a warranty is issued to a relying customer 40 (step 802), one of the following occurs:

Relying customer 40 files a claim within the warranty expiration date (step 804, see also B in FIG. 8F);

Relying customer 40 does not file a claim within the applicable time period and the warranty expires (step 806); or Relying customer 40 files a claim after the applicable time period and the warranty expires (step 808).

If, as depicted in step 804, relying customer 40 files a claim within the warranty time limit (along with associated supporting evidence) with relying participant 30, then the system proceeds to step 810 where relying participant 30 notifies the corresponding issuing participant 10 of a filed claim and provides supporting evidence per the contractual obligations with the issuing participant 10 and relying customer 40 (see also C in FIG. 8F).

In step 812, relying participant 30 notifies both root entity 102, and issuing participant 10's WCCM of the filed claim and the amount of claim. In step 814, issuing participant 10 determines whether it will pay. Root entity 102 sets conditions under which claims against warranties shall be paid. The intent is to make sure there is a gold standard for business. Each warranty issuer is provided the latitude to evaluate and dispose of claims using its own procedures. However, minimum standard criteria are established under which claims would be paid.

If issuing participant 10 decides not to pay the claim, the system branches to step 816 where issuing participant 10 informs relying participant 30 of its decision.

In decision step 818, if relying customer 40 is dissatisfied with issuing participant 10's decision, then the system branches to step 820 where relying customer 40 may initiate dispute resolution/arbitration proceedings (see also E in FIG. 8F). In that event, the collateral is only "released" after the outcome of the dispute resolution process.

It should be noted that, relying participant 30 may provide a provisional credit/credit enhancement to relying customer 40 in its discretion; if so, relying participant 30 pays relying customer 40 before issuing participant 10 agrees to cover the claim and subrogation allows relying participant 30 to file claim with issuing participant 10, subject to contracts specifying this right. If relying participant 30 provides a credit enhancement to relying customer 40, relying participant 30 is not be required to post collateral as a result.

If (in step 814) issuing participant 10 decides to pay the warranty claim, then the system branches to step 822 where issuing participant 10 informs relying participant 30 of its decision. In step 824, issuing participant 10 pays the claim to relying participant 30 (see also D in FIG. 8F). In step 826, the WCCM monitors the fact that issuing participant 10 has paid the claim, decreases the amount of collateral by amount paid, and also by amount required.

If, as depicted in step 806, a claim is not filed within the warranty expiration date, then the system proceeds to step 828 where the warranty expires. In step 830, issuing participant 10's outstanding warranty amount is decreased by the expired warranty amount. In step 832, at the end of the day, root entity 102's WCCM decreases the collateral requirement to reflect expiration of warranties.

If, as depicted in step 808, a claim is filed after warranty expiration, then the process is the same as if a claim was not filed except that the full value of the outstanding warranty is now reflected back in the WCCM.

6. Collateral Management

As mentioned above, each L1 participant $106_1$ must post collateral in accordance with the criteria established by root entity 102 to be eligible to issue warranty certificates. The following are a number of guidelines regarding collateral posting:

1. Root entity 102 is agent for collateral and can direct the collateral trustee to pay relying customer 40.
2. If an issuing participant 10 fails, root entity 102 does not pay valid IWA claims exceeding available collateral.
3. If an issuing participant 10 fails, competing claims are paid on a "first-come, first-served" basis.
4. If an issuing participant 10 fails, and collateral is not readily accessible, root entity 102 does not advance funds.
5. If a participant 106 is terminated, it must post 100% of anticipated claims, based on historical experience for the warranties outstanding.
6. Root entity 102 determines required collateral of each participant 106 daily; collateral amounts are assigned "haircuts," emulating the CHIPS model.
7. Root entity 102 receives frequent reports from participants 106 on IWAs approved and IWA claims filed to determine collateral required.

Figure 9:
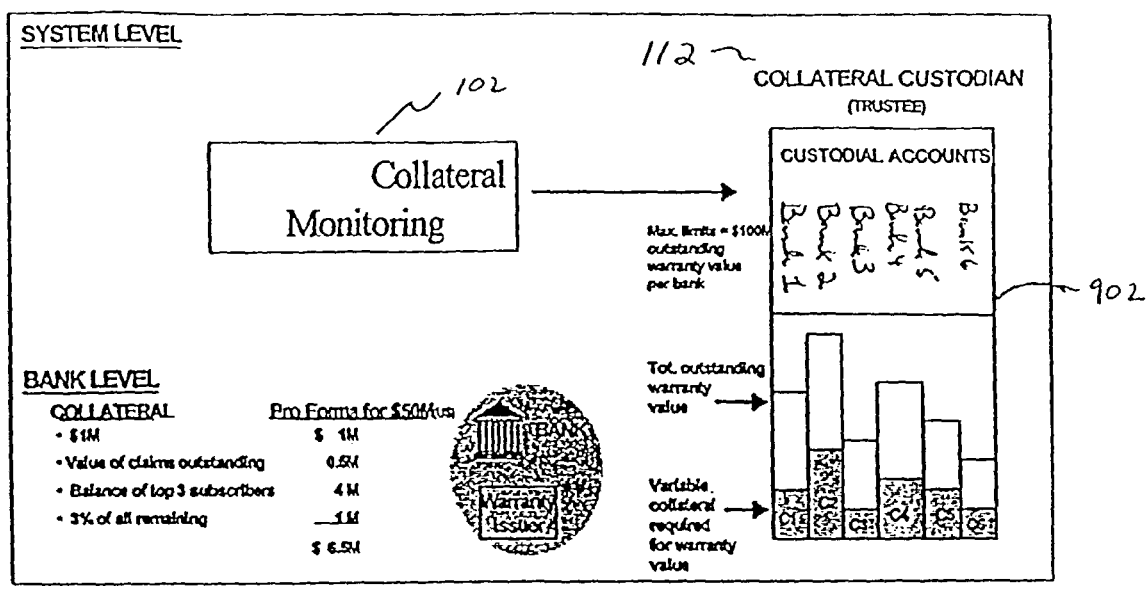
FIG. 9 illustrates aspects of the collateral management system of the present system.

The collateral management system is further described in connection with FIG. 9. As shown in FIG. 9, the collateral management system comprises a collateral custodian or trustee 112 which maintains custodial accounts 902 for a plurality of participants 106 and whose activities are monitored by root entity 102. The sizes of the custodial accounts are indicated by the grey areas labeled C1-6 in FIG. 9. As FIG. 9 further demonstrates, the collateral requirement is typically less than the total value of outstanding warranties that have been issued by a participant 106, but the percentage is variable, rather than fixed.

Also shown in FIG. 9 is an embodiment for calculating the collateral requirement for a particular participant. For purposes of the illustrated embodiment, it is assumed that the total outstanding warranty values for a particular participant 106 is $50M. The collateral requirement for the participant 106 is then calculated as follows in the illustrated embodiment:

Requirement $1M

+value of outstanding claims made by system customers

+the total amount of outstanding warranties issued by participant 106 to its top three customers +3% of the total amount of outstanding warranties issued by participant 106

Thus, assuming for purposes of the illustrated embodiment that the value of claims outstanding against the participant 106 by system customers is $0.5M, the total amount of outstanding warranties issued by participant 106 to its top three customers is $4M, and 3% of the total amount of outstanding warranties issued by participant 106 is $1M, then the total collateral requirement for the participant 106 in the illustrated embodiment would be $6.5M.

7. End-User Experience

Figure 10:
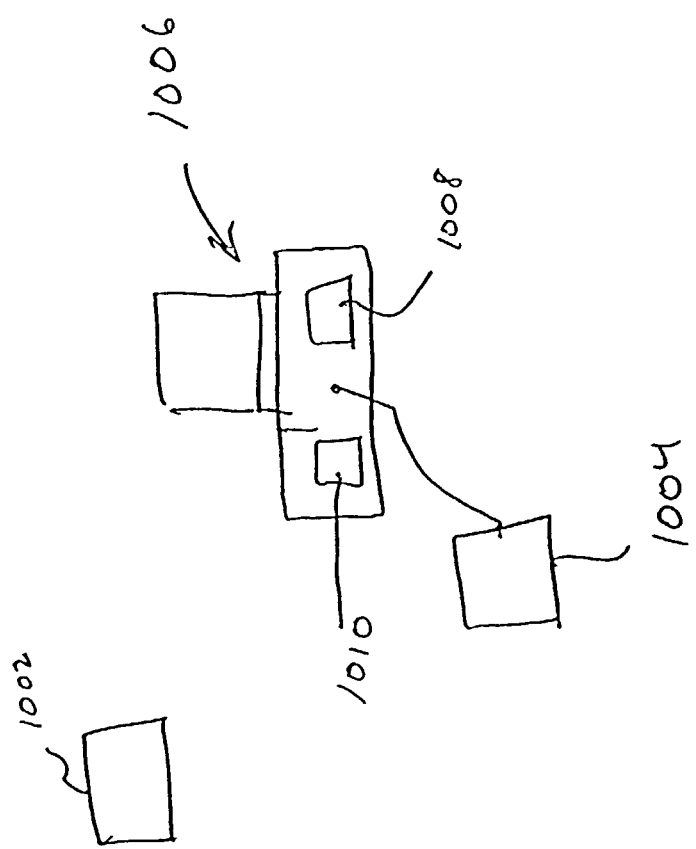
FIGS. 10-12 illustrate aspects of user interaction with the present system.

The end user is usually an employee 110 of a corporation 108 that has signed a contract with a participant 106 to use the system service. The components available to employee 110 for use with the system are shown in FIG. 10. As shown in FIG. 10, employee 110 is given a certificate on a smart card 1002 by employer 108 or participant 106. Employee 110 also has a smart card reader 1004 attached to his PC 1006 which has installed any necessary software 1008 to use smart card reader 1004. Employee 110 must also load system-enabled application software 1010 on to his desktop 1006 or access it through a browser to a server (not shown). The location of application software 1010 should be transparent to employee 110.

Depending on whether the end user is acting as a subscribing customer 20 or a relying customer 40, interaction with the system will vary. End user interaction is also a function of the application and relying customer 40's requirements. Therefore, this narrative serves as an example of how an end user interacts with a system application and the types of messages and procedures the end user follows.

Figure 11A:
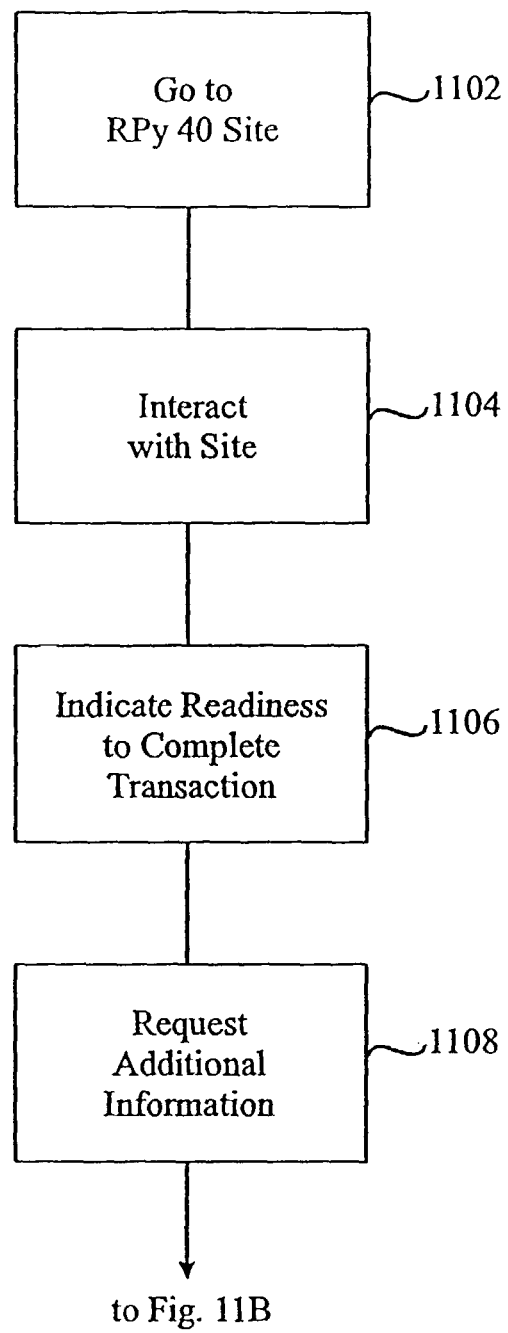
Figure 11B:
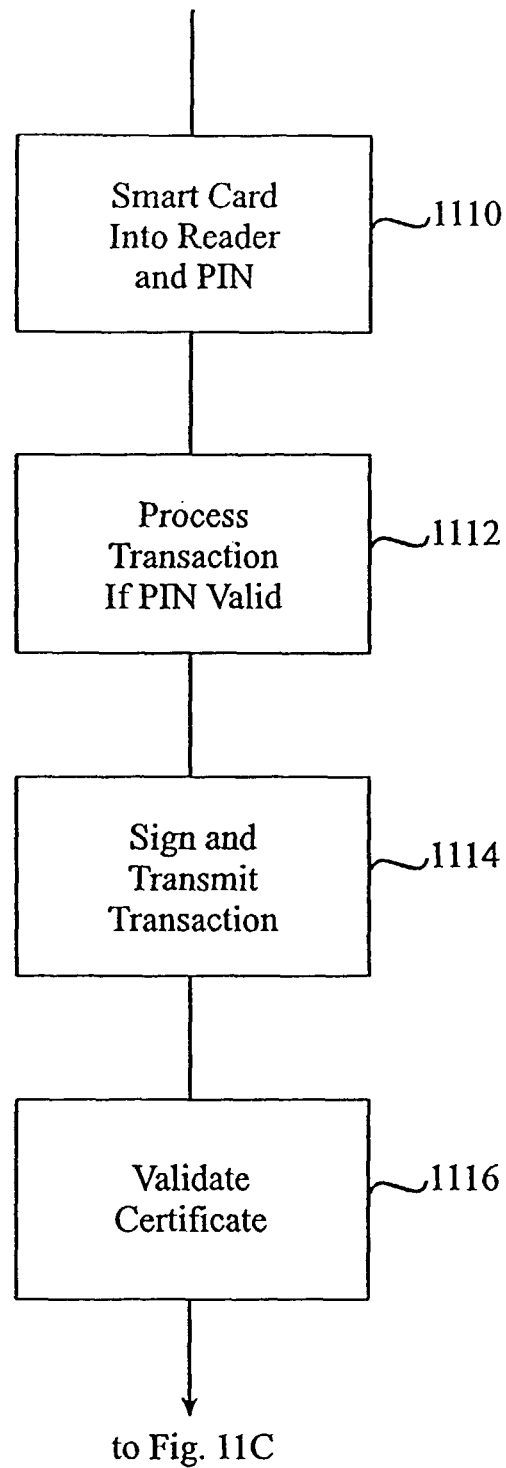
Figure 11C:
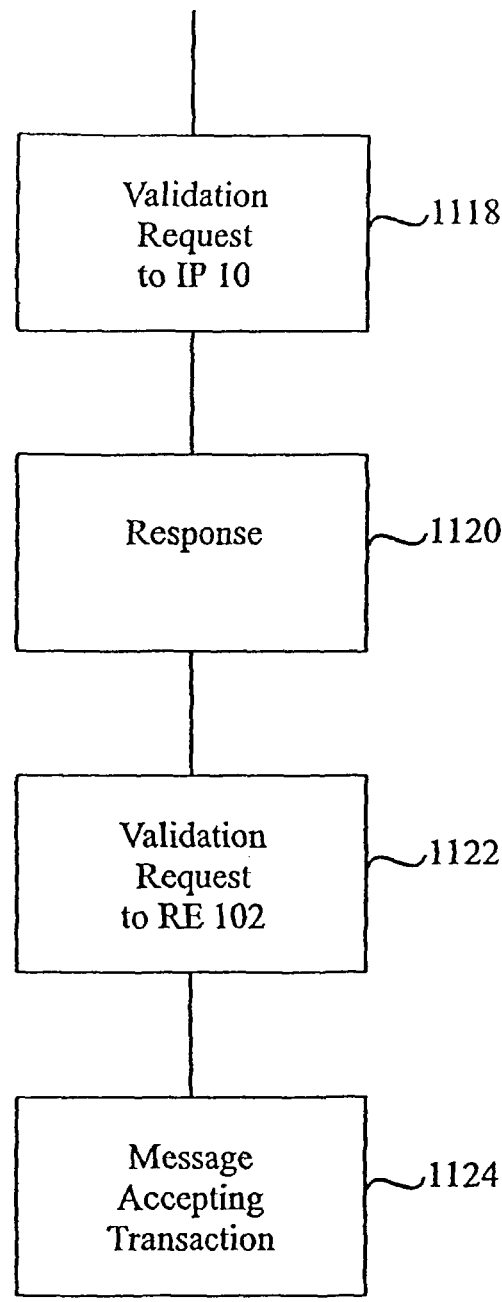

An illustrative example of a system interaction is now described in connection with FIG. 11. For purposes of this example, assume that the end user is a purchasing manager of an entity desiring to purchase office supplies (an employee 110 of a subscribing customer 108) and relying customer 40 is an entity that sells office supplies (referred to as the "seller"). In step 1102, employee 110 starts up his web browser and goes to the site of relying customer 40. In step 1104, employee 110 interacts with the web site, selecting, for example, the supplies he needs. He could also conduct other transactions such as submitting an RFP, placing an order, negotiating a contract, etc. When employee 110 is ready to complete the transaction, he indicates this to the system (step 1106). For example, employee 110 may click on a button to indicate that he is ready to submit his order and purchase the supplies. In step 1108, the seller's system may ask employee 110 for other information needed to complete the order, such as ship-to address. In step 1110, employee 110 is then asked to insert his smart card into the reader. Employee 110 places his smart card into the reader and enters his PIN. If the PIN is valid, then in step 1112, the user sees a message saying the system is processing his transaction.

In step 1114, the employee 110's system software 1010 signs the transaction and sends it with his warranty certificate to relying party 40, in this case the seller. In step 1116, relying party 40 then validates the buyer's certificate by sending a message to relying participant 30. In step 1118, relying participant 30 sends a message to issuing participant 10 to determine if the certificate is valid, as explained above. In step 1120, issuing participant 10 sends a response back to relying participant 30 that says the buyer's certificate is valid. Issuing participant 10 also includes its own certificate in the response. In step 1122, relying participant 30 then sends a message to root entity 102 to determine if issuing participant 10's certificate is valid. If all of these responses are yes, then in step 1124, the seller sends a message back to employee 110 that his transaction has been accepted, along with any other pertinent information. The seller's system may have the capability to request an IWA programmed into its software. In this case, the warranty is requested and negotiated in the background (as described above) while the buyer waits for confirmation of his purchase order.

If problems are encountered as the transaction is conducted, appropriate error messages are displayed to employee 110. These include asking employee 110 to reenter his PIN if it was incorrect. Employee 110 is allowed three tries before he is locked out and instructed to see his business manager to re-activate the card. Note: the number of tries before a user's card is disabled may vary depending on the limits set by issuing participant 10.

Figure 12A:
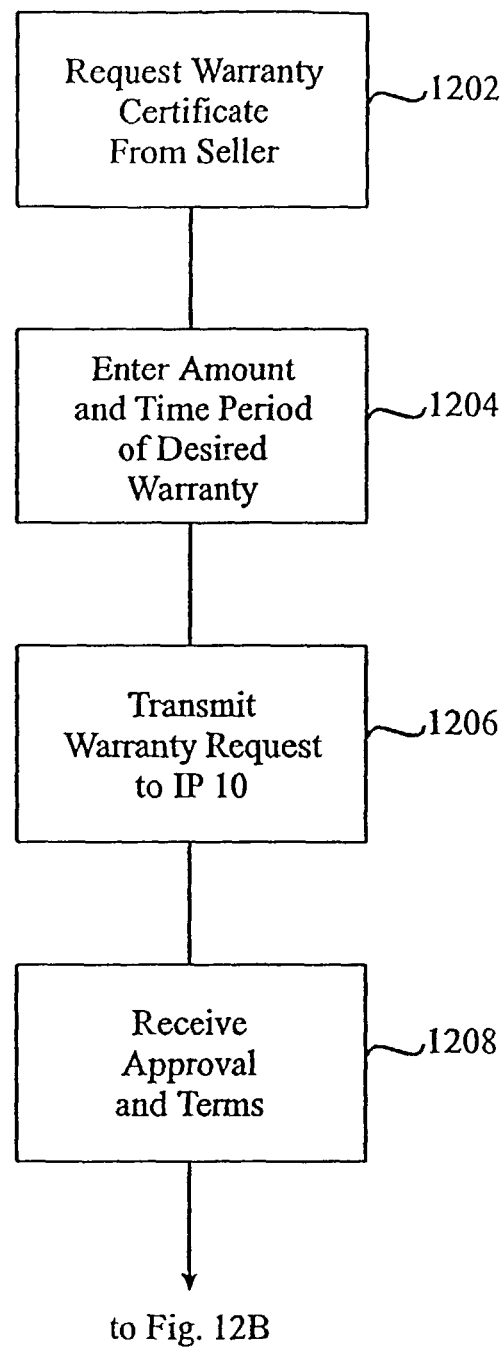
Figure 12B:
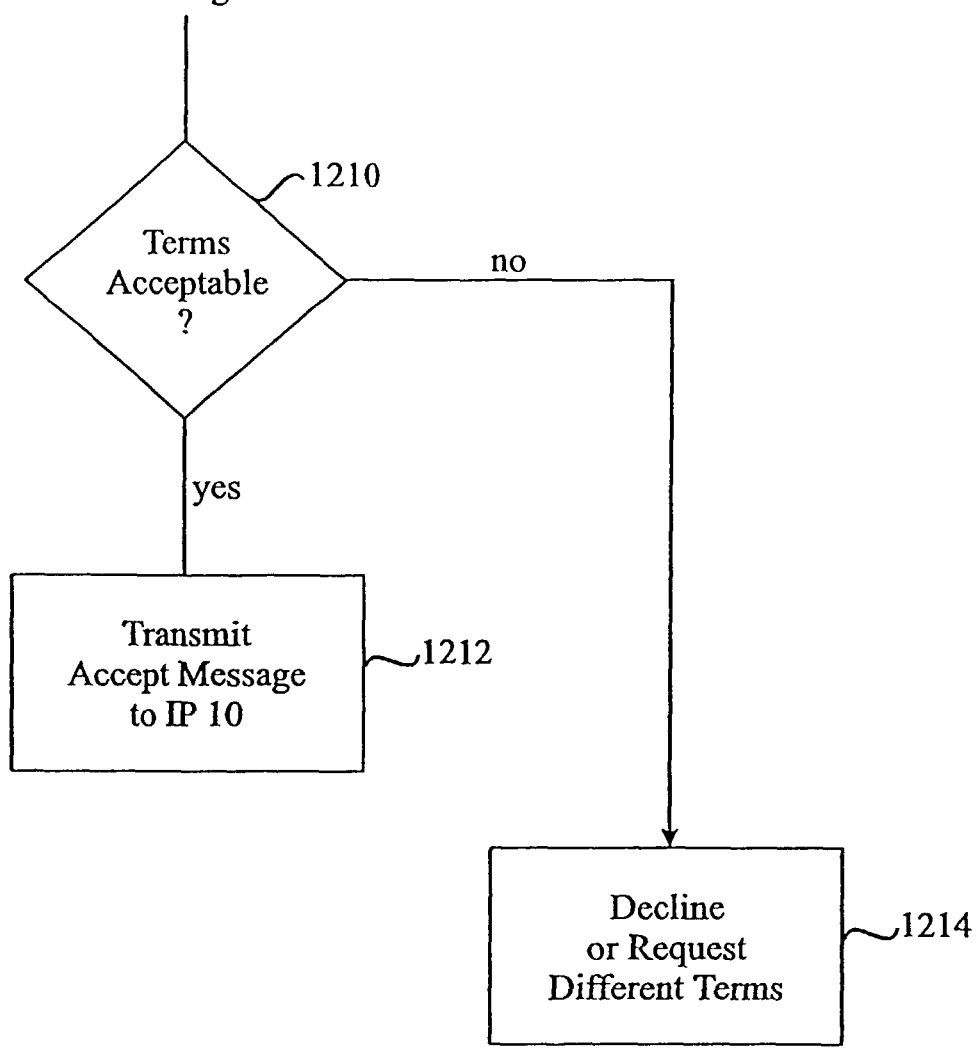

Employee 110 also has the opportunity to perform an identity verification of the seller. The steps in this process are described in connection with FIG. 12. As shown in FIG. 12, in this case, subscribing customer 10 becomes the relying party and requests the seller to send its warranty certificate (step 1202). The steps then followed are similar to those described above. However, the IWA is not negotiated in the background, but between employee 110, its participant 106, and the seller's participant 106. In step 1204, employee 110 enters the amount and time period for the warranty. In step 1206, this message is sent to issuing participant 10 which sends it to the seller's ("relying") participant 30. In step 1208, employee 110 gets a message back saying the warranty request was accepted and the fee for the IWA. In step 1210, employee 110 decides if the warranty terms are acceptable. If employee 110 agrees to pay the specified amount, the system branches to step 1212 where employee 110 sends this response through issuing participant 10 to the seller's ("relying") participant 30. If, however, employee 110 does not want to pay the charge for the IWA, the system branches to step 1214 where employee 110 sends a message back, either declining the IWA or requesting another IWA for a different date and amount. This negotiation continues until employee 110 either accepts the IWA and the associated fee or says no and ends the transaction.

All transactions are logged so that in the event of disputes or questions, employee 110, issuing participant 10, root entity 102, relying party 40, and relying participant 40 can refer to this information.

III. Roles and Responsibilities

Each entity in the operating model shown in FIG. 2 bears certain roles and responsibilities within the system. These roles and responsibilities are summarized below.

A. Root Entity 102

Root entity 102 sits atop the operating model, serving as the main "backbone" for the system. It performs the following critical functions to facilitate seamless operation of the system:

1. Operates a root level repository to provide on-line status for validity of L1 participant certificates.
2. Sets and establishes rules and standards constraining operations of all subordinate entities.
3. Identifies prospective L1 participants 106.
4. Qualifies L1 participants for admittance based on criteria established in rules.
5. Conducts due diligence on prospective L1 participants as part of chartering process.
6. Evaluates a prospective L1 participant's technology for fit with system standards prior to charter.
7. Defines limitations associated with each L1 participant's operation as a certificate authority or reliance manager (Note: when "reliance manager" is used it refers to the operations related to the issuance verification and settlement of the warranty product.).
8. Establishes warranty cap on total aggregate outstanding warranty (in the event that an L1 participant 106 acts as a reliance manager).
9. Executes L1 participation agreements.
10. Collects fees for:
    Chartering a certificate authority, reliance manager;
    Recurring annual membership fees;
    Issuing certificates to L1 participants 106 (or other customers);
    Validation transactions;
    Percentage of warranty issuance costs;

To ensure the system can accurately bill for these services, the reliance manager must have an accounting system.

11. Monitors L1 participant 106 operations for:
    Compliance with system standards;
    Warranty issuance activity.
12. Reviews independently conducted audits of subordinate activities.
13. Reserves the right to conduct its own audit of subordinate activities and to intervene in subordinates activities that are non-compliant or excessively risky.
14. Maintains system risk reserve—provides reserve in the form of LC or other guarantees to provide vehicle for managing risk resulting from system failure for which root entity 102 assumes liability.

As noted, root entity 102 is responsible for managing the root operation and maintaining the integrity of the system. The root functions are performed either centrally or distributed, depending on what the function is. The entities within root entity 102 that are responsible for performing these functions are now described in connection with FIG. 13.

As shown in FIG. 13, root entity 102 employs a private key made up of five root key fragments 1302. Each fragment 1302 is stored on its own token 1304 which is kept secured when it is not being used by a key fragment holder 1306.

Each key fragment holder 1306 is responsible for the security of his fragment 1302 and for presenting fragment 1302 to a signing device host 1308 when needed for the approval of certificate authority transactions such as issuance of certificates and CRLs. In particular, when, for example, a certificate is to be signed, key fragment holder 1306 is present to input his token into a signing device host 1308.

Suggested Level: Vice President or Equivalent

Key fragment holders 1306 and signing device hosts 1308 are located in geographically diverse locations. The distribution of key fragments 1302 provides a high level of security and protection for the root private key. As further shown in FIG. 13, two key fragment holders 1306 and signing device hosts 1308 are located in a data center 1310 in New York (one PC, one reader, and two tokens), two in a first bank data center 1312 in Frankfurt, Germany (one PC, one reader, and two tokens), and the fifth in a second bank data center 1314 in Hong Kong.

Also shown in FIG. 13 are signing officer stations 1316 that are geographically disbursed as well, with one located at each founding bank 104₁ for a total of eight signing officer stations 1316. Signing officer stations 1316 are located in a secure location at each of the founding members 104₁.

Each bank 104₁ also has two signing officers (SOs) 1318 for a total of 16 altogether. Signing officers 1318 are responsible for operating signing officer workstations 1316. Each founding bank 104₁ may, if desired, have a back-up for each SO 1318. Each SO 1318 approves the use of his/her fragment to generate the root key to sign certificates, revocations, CRL's, and SO changes based upon verification of request data and based upon a recommendation from an authorizer 1320, described below. SO 1318 does not directly sign a certificate.

Suggested Level: Vice President or Equivalent

The certificate signing process works on the basis of quorums. A quorum of SOs 1318 is needed to approve the use of a fragment 1302 before it can be "released" to the root key generation algorithm. A quorum of fragments 1302 must be approved to generate the root key to sign the certificate. Quorums are established at the time the key is generated. One reject/no vote rejects the whole request.

Authorizer 1320 is also shown in FIG. 13. The function of authorizer 1320 resides at founding banks 104₁. While this is a required function, it may not necessarily require a dedicated resource. Authorizer 1320 receives and reviews the documentation for root certificate requests, revocations, CRL's, SO maintenance, etc. This person makes the recommendation to SOs 1318 to approve or reject the requests that have been received, and is responsible for ensuring that SOs 1318 have access to documentation (e.g. meeting notes) to facilitate sound decision-making. If sufficient information is unavailable to approve the request, it must be rejected.

Suggested Level: Vice President or Higher

Also shown in FIG. 13 is a registrar 1322. Registrar 1322 is a root entity 102 employee. This person receives and reviews the documentation for CA transactions such as certificate and CRL requests, and then inputs the request into a CA 1324, initiating the signing process.

Suggested Level: Officer or Equivalent

Also shown in FIG. 13 is a system administrator 1326. System administrator 1326 is a root entity 102 employee who manages the system and its databases by doing functions such as:

a) Defining and maintaining information about issuers, SOs 1314, and registration authorities 1328
b) Performing backups
c) Changing passwords Suggested Level: Officer or Equivalent Also shown in FIG. 13 is a root CA auditor 1330. Root CA auditor 1330 is responsible for reviewing CA 1324 and SO 1318 records to ensure that the PKI has not been compromised and procedures are being followed. This review entails verifying the audit records, validating the information in the audit records, and making sure that none are missing. Root CA auditor 1330 must also examine the key pairs submitted for certification, and resulting digital signatures for authenticity before it is released for use. This individual should be within the operations area and differs from those designated within the risk management area of root entity 102.

Suggested Level: Vice President or Equivalent

The Root CA 1324 is kept in a highly secure location, with physical and virtual access controls to ensure the system cannot be intruded upon. To minimize the risk of a root key compromise, the root key is never maintained as a whole, but rather in 5 fragments. Three of these 5 fragments constitute a "quorum", or the number of fragments to be used in the mathematical formula that recalculates the root key every time it is needed for a signing operation. The quorum rules are:

a) The fragment quorum is 3 of 5.
b) An SO can be an SO on no more than 2 fragments.
c) It must be possible to sign if 4 SO's are unavailable.
d) A majority of banks (5 of 8) must approve a certificate, CRL, or administrative change request.
e) Even if SO's from 4 banks cooperated, it must still be impossible to approve a certificate. For security purposes, the SO private keys are maintained on hardware tokens that require 12 digit passwords to access the token.

B. L1 Participants 106₁

Following are the various functions performed by L1 participants 106₁:

1. Operate certificate authority and associated repository.
2. Operate a reliance manager if application to be chartered to be a reliance manager is approved by root entity 102.

3. Optionally issue warranties on veracity of information contained in certificates it issues.
4. Identify and charter L2 participants 106₂.
5. Issue certificates directly to L2 participants 106₂.
6. Administer contractual relationships between root entity 102 and participants 106 subordinate to itself (While an L1 participant 106₁ must act as an issuing participant 10, it need not necessarily act as a reliance manager).
7. Obtain 3rd party audit for compliance with system standards.
8. Report results of audit to root entity 102.
9. Take remedial action as result of root entity 102 review to maintain compliance.
10. Acquire, qualify, and deploy technical components required for L1 participant 106₁ to establish either certificate authority or reliance manager operations. Qualification will be against standards set by root entity 102
11. Respond to requests for on-line certificate validation and/or warranties from:
    subscribing customers 20 or peer L1 participants 106₁.
12. Track changes in status of its total warranty exposure. L1 is also responsible for reporting warranty status to root entity 102
13. Maintain adequate levels of collateral for warranties issued.
    responsibility for reporting collateral status to root entity 102
14. Promulgate system's minimum rules, standards, and contract terms to L2 participants 106₂. L1 participants 106₁ have the latitude to define more restrictive standards and rules provided they do not conflict with system standards.

The functions performed by L1 participant 106₁'s certificate authority level are similar to those done by the root certificate authority operated by root entity 102. However, the actual roles and responsibilities may be different from those of root entity 102, depending on how each L1 participant 106₁ chooses to implement their certificate authority, including whether or not to use fragmentation for its private key. In addition, the roles described below may vary from participant to participant. One example of the entities within an L1 participant 106₁ that are responsible for performing these functions are now described in connection with FIG. 14.

Shown in FIG. 14 is a registrar 1402 who is the person responsible for inputting the certificate request into the system. This may be done directly by a customer, by an account officer, or by a data entry person.
Suggested Level (if Done by Bank): Officer or Equivalent Also shown in FIG. 14 is an authorizer 1404. Authorizer 1404 receives from a customer 108 or an account officer the documentation for certificate requests, revocations, CRL's, SO maintenance, etc. He/she reviews the documentation and makes the recommendation to the signing officer 1406, described below, to approve or reject any of the requests that he/she has received. If he/she has does not have enough information to approve the request, it should be rejected.
Suggested Level: Vice President or Equivalent Also shown in FIG. 14 is a signing officer (SO) 1406 who is responsible for operating a signing officer workstation 1408. Based upon authorizer 1404's recommendation, and verification of the request data, SO 1406 approves the use of L1 participant 106₁'s private key to sign certificates, revocations, CRL's, and SO changes. If a bank chooses to fragment their private key, then multiple SO's and quorums are necessary. Each L1 participant 106₁ develops their own procedures to operate this capability.
Suggested Level: Vice President or Equivalent Also shown in FIG. 14 is a system administrator 1410. System administrator 1410 manages L1 participant 106₁'s system and databases by performing functions such as:
  a) Defining and maintaining information about certificates
  b) Performing backups
  c) Changing passwords
Suggested Level: Officer or Equivalent Also shown in FIG. 14 is an auditor 1412. Auditor 1412 is responsible for reviewing the certificate authority and SO records to ensure that the PKI has not been compromised and procedures are being followed. This entails verifying the audit records, validating the information in the audit records and making sure that none are missing. Auditor 1412 must also examine the key pairs and digital signatures for authenticity.
Suggested Level: Vice President or Equivalent Each Level 1 certificate authority has its own set of operational and security procedures to be followed. At a minimum, they meet the requirements specified in the system operating rules. Each Level 1 certificate authority has haves its own risk management policies and procedures. At a minimum, they meet the requirements specified in the system operating rules.

C. Customers 108

The responsibilities of system customers 108 are as follows:
1. Enter into an agreement to abide by participant 106's operating rules.
2. Store private keys associated with warranty certificates in a hardware device that complies with system specifications (smart card, HSM) and when used by individuals, to require positive authentication (e.g. PIN entry) for each transaction. [note: the requirement for per-transaction PIN entry/authorization does not apply to server based implementations.] Private keys associated with utility certificates must be stored in hardware devices compliant with system specifications; but do not require explicit authentication on each use.
3. Provide timely and accurate notice to its issuing participant 10 of information relating to ongoing validity and accuracy of its private key/public key pair and identification certificate, or any compromise or suspected compromise of the security of its computer systems or smart cards on which its private key is stored.
4. Obtain written consent from each person or entity authorized to create a digital certificate or named in a digital certificate that information about their person and authority may be transferred to other participants 106 and root entity 102 for the purpose of providing system services or otherwise carrying out the goals of the system.

IV. Risk Management
A. Risk Management System and Infrastructure

Root entity 102 is responsible for establishing a system of risk management within the system infrastructure. Management of each system entity is then responsible for ensuring the appropriate controls and structure are operating effectively. To accomplish this, all participants 106 adhere to a clearly defined set of system rules that are structured to reflect the requirements resulting from the detailed analysis of risks, and the identification of controls appropriate to mitigate those risks. Clearly defined contracts are adopted for binding all parties to these rules.

Various other elements assist with the management of risk. These include:

Contractual limiting of liability.

Establishment of minimum criteria for system participation eligibility.

Ability of root entity 102 to enforce against those participants 106 in non-compliance with their contractual requirements or the standards/procedures established.

Establishment of a risk reserve and purchase of insurance to protect the entity against system risk.

Required posting of collateral by those institutions offering the assurance feature Monitoring capabilities.

From an administrative standpoint, the risk management function reports to the CEO of root entity 102—either within the CEO function or as a standalone position. However, it must have direct accessibility to the audit committee.

Root entity 102's risk management policy is to both limit risk and to place responsibility and liability at the point where the risk arises. Therefore root entity 102's risk is limited to the technology and operations directly managed by, or on behalf of, root entity 102. An independent review is performed of the identified risks and proposed controls to assist in the quantification of risk exposure, and the impact and likelihood of loss within the system.

A detailed risk analysis is completed that addresses, in greater detail, the following defined risks and control objectives necessary for their mitigation. Specific controls relevant to each function are then developed, reflected within the appropriate standards, and implemented throughout the system.

B. Risks and Control Objectives

The following six key risks are analyzed by root entity 102 shortly after its formation and then on an ongoing basis.

1. Operational Risks
   a) Technology—security breaches or other failures arising from design weakness or misuse of technology supporting the system, which result in system interruptions, cryptographic weaknesses, hardware/application failure.
   Control Objectives:—utilization of expertise in design and implementation, adequate testing before implementation, contingency plans, establishment of security/access policies and controls, independent audits, ongoing monitoring.
   b) Processing—all failures in actions through error, design weakness, or inadequate policy and procedure implementation resulting in failure to safeguard keys, untimely or inaccurate processing of certificates/updating CRLs, inappropriate certificate usage, or unauthorized transactions.
   Control Objectives: establishment of operating policies and procedures; establishment of limits, ongoing evaluation of risks, ongoing review/monitoring, contingency plans, mechanism to monitor limits/risks related to outside service providers, ability to push down requirement for similar controls to the CA,
   c) Criminal/Illicit Acts—deliberate attempts to/breaches of the technology in processing within the system and/or the failure to detect the occurrence of fraud, resulting in compromise of keys, misuse of certificates, alteration/theft of data, assumption or forged identifications.
   Control Objectives: processing controls, limits, implementation of security, access measures, regular reviews, and ongoing monitoring for adherence.

2. Reputation Risks—negative impact on public opinion and trust by events or publicity resulting in loss of revenue and/or legal action.
   Control Objectives: ability at the root entity 102 level to promptly act to correct or address failures in operations, security, privacy requirements or compliance related to certificates/usage, enforcement against those CA's or service providers who do not perform in accordance with contract, policy terms, and obligations.

3. Regulatory/Legal Risks—requirements are not adhered to or rules are ambiguous and untested—resulting in fines, penalties, or public embarrassment.
   Control Objectives: establishment of a legal function within root entity 102, agreement requirements that CA's adhere to appropriate laws and regulations, clearly defined rights, obligations, and assumptions of liability within contractual agreements, establishment of ongoing regulatory dialogue.

4. Strategic Risks—failure of market to emerge, competitive edge ceases, expected technology does not occur, or legal and regulatory changes occur which negatively impact the system's product or ability to market.
   Control Objectives: root entity 102 tracking of market, legal, and technology events to enable prompt corrective action, contract limits on financial liability.

5. Credit Risks—failures within the CA's and sub CA's which roll up to, or impact root entity 102.
   Control Objectives: OTO approval of CA members based on certain financial criteria, root entity 102 establishment of caps for each CA, tracking of assurance transactions, claims, and settlements, requirement that CA's establish and adhere to appropriate procedures related to: adherence to limits, knowing your customer requirements, monitoring credit/financial conditions.

6. Liquidity/Financial Risks—adverse or improper business decisions or implementation, inadequately capitalized structure, or insufficient loss protection resulting in serious negative impacts on earnings or capital.
   Control Objectives: strong board, project management, and plan implementation and support of senior management within the banks, hiring appropriate expertise into root entity 102 organization, maintenance of adequate reserves and liability insurance at root entity 102 level; requirement that adequate reserves, and collateral be maintained at the CA level, and establishment of the following at root entity 102 level: financial monitoring, mechanism to address need for additional capital, contract limits on liability.

C. Auditing Requirements

Root entity 102 requires periodic external audits be performed of its own operations as well as those of its members. Member reviews are performed at the member's own expense. Root entity 102 also requires that third party technical reviews be performed periodically. All participants 106, as well as root entity 102, are also required to implement internal risk monitoring programs and routines, which specifically address the risks of their operational functions.

Root entity 102 reserves the right to request/review audit reports and to evaluate, or further test, to ensure that audit corrections have been made. Root entity 102 also reserves the right to, at its own expense, perform or cause to have performed, any additional audit work considered necessary.

V. Operating Rules

As noted, root entity 102 promulgates operating rules that specify the rights and obligations of system entities. One embodiment of such operating rules is as follows:

Operating Rules Table of Contents

CHAPTER I—GENERAL RULES

Section 1: Definitions
Section 2: Participant Eligibility
Section 3: GTO Services: General Rights and Responsibilities of Participants
Section 4: Role of GTO
Section 5: Marks
Section 6: Fees and Other Payments
Section 7: Suspension and Termination of Participation
Section 8: General Provisions

CHAPTER II—DIGITAL IDENTIFICATION SERVICE

Section 9: Description
Section 10: Digital Identification Service: Rights and Responsibilities of an Issuing Participant
Section 11: Digital Identification Service: Rights and Responsibilities of a Relying Participant
Section 12: Digital Identification Service: Rights and Responsibilities of GTO
Section 13: Digital Identification Service: Customer Agreement

CHAPTER III—UTILITY KEY SERVICE

Section 14: Description
Section 15: Utility Key Service: Rights and Responsibilities of an Issuing Participant
Section 16: Utility Key Service: Rights and Responsibilities of a Relying Participant
Section 17: Utility Key Service: Rights and Responsibilities of GTO
Section 18: Utility Key Service: Customer Agreement
Appendices

CHAPTER I—GENERAL RULES

Section 1

Definitions

For purposes of these Operating Rules, the following terms shall have the following meanings:

a. "Authenticate" means, with respect to a Subscribing Customer, to use the Subscribing Customer's Private Key, corresponding to a related Public Key of the Subscribing Customer, to create a Digital Signature on a Digital Transmission for the purpose of indicating the Subscribing Customer's identity and association with the contents of the Digital Transmission. "Authenticate" means, with respect to a Relying Customer, to use a Subscribing Customer's Public Key, corresponding to a related Private Key of the Subscribing Customer, for the purpose of confirming the Subscribing Customer's identity and association with the contents of a Digital Transmission.

b. "Authorized" means, with respect to a Digital Transmission, that (a) the Subscribing Customer placed its Digital Signature on the Digital Transmission; (b) the Subscribing Customer's Digital Signature was placed on the Digital Transmission by an entity or person authorized by the Subscribing Customer to do so; (c) the Subscribing Customer's Digital Signature was placed on the Digital Transmission by an entity or person to or with whom the Subscribing Customer provided or shared its Private Key; (d) the Subscribing Customer's Digital Signature was placed on the Digital Transmission with fraudulent intent by an entity or person acting in concert with the Subscribing Customer; or (e) the Subscribing Customer received a material benefit relative to the transaction in question as a result of the Digital Transmission on which its Digital Signature was placed.

c. "Certificate Authority" means GTO or a Participant that issues and manages Digital Certificates in the GTO System. A Certificate Authority provides the Repository Function with respect to the Digital Certificates it issues, and may also provide the Reliance Manager Function with respect to such Digital Certificates.

d. "Certificate Status/Warranty Request" is defined in Section 1(63).

e. "Certificate Status/Warranty Response" is defined in Section 1(64).

f. "Certified IW Claim" means and IW Claim for which the Issuing Participant has determined, or a determination under the Dispute Resolution process has found, that all conditions under these Operating Rules and the terms of the relevant Identity Warranty for the breach of the Identity Warranty and the payment of the IW Claim have been met, and that the Issuing Participant is liable to the Relying Customer (or the Relying Participant by operation of Section 11(10)) for the amount of the IW Claim or a portion thereof.

g. "Collateral Agent" means a financial institution selected by GTO to hold for the benefit of Relying Customers (or for the benefit of Relying Participants by operation of Section 11(10)) collateral posted by the Issuing Participant pursuant to Section 3(18).

h. "Confidential Information" means any computer hardware or software, documents, manuals, service materials or other information relating to the GTO Services or the GTO System that: (a) is owned, leased, licensed to, or otherwise subject to control by, GTO or its agents; and (b) is either provided to a Participant by GTO or is accessed by a Participant from GTO in connection with its use of the GTO System. Confidential Information also includes the results of Participant audits provided to GTO pursuant to Section 3(19) or the results of GTO audits provided to Participants pursuant to Section 4(7). However, Confidential Information does not include: (x) information generally available to the public other than by breach of these Operating Rules, a Participant Agreement or a Customer Agreement; (y) information developed independently by, or already known to, a Participant as reflected in its written records; or (z) information received by a Participant from a third party lawfully in possession thereof and itself without restriction on disclosure.

i. "Customer" means an entity that has entered into a Customer Agreement with a Participant.

j. "Customer Agreement" means an agreement complying with the applicable requirements of these Operating Rules between a Participant and a Customer governing the provision of the GTO Services to the Customer by that Participant. A Customer Agreement may be: (a) in written form signed by the Participant and the Customer; or (b) where legally enforceable, in an electronic form that meets the requirements of enforceability in all applicable jurisdictions.

k. "Digital Certificate" means a digital record issued by GTO or an Issuing Participant that identifies the entity (either GTO or the Issuing Participant) issuing the certificate, uniquely identifies a Participant or a Customer, contains that Participant's or Customer's Public Key, and states the Digital Certificate's effective period. A Digital Certificate is digitally signed with either (a) the Private Key of GTO when it issues a Digital Certificate to a Participant, (b) a Private Key of a Level One Participant when it issues a Digital Certificate to a Customer or a Level Two Participant, or (c) the Private Key of a Level Two Participant when it issues a Digital Certificate to a Customer. For purposes of the GTO System, the following types of Digital Certificates are used: Issuer Certificates, Identification Certificates and Utility Certificates.

l. "Digital Identification Service" is defined in Section 1(65).

m. "Digital Signature" means the unique digital identification of an entity that is created by the entity applying its Private Key to a Digital Transmission for the purpose of confirming the identity of that entity to the recipient of the Digital Transmission. A Digital Signature employs a Private Key, a corresponding Public Key, and a mathematical function known as a "message digest function," such that a person receiving or otherwise accessing the Digital Transmission and the signer's Public Key can assess: (a) whether the transformation of the Digital Transmission into the message digest function was created using the Private Key that corresponds to the signer's Public Key; and (b) whether the Digital Transmission has been altered since the transformation was made.

n. "Digital Transmission" means an electronic transmission in digital form sent by a Subscribing Customer to a Relying Customer which contains text, images and/or other data, and which the Subscribing Customer Authenticates with a Digital Signature.

o. "Dispute Resolution" means the process set forth in Appendix 3-20 for resolving a dispute arising from the GTO Services or these Operating Rules.

p. "Expired" means with respect to a Digital Certificate that the effective period indicated in the Digital Certificate has expired.

q. "GTO" means the Global Trust Organization, LLC, a Delaware limited liability company.

r. "GTO Services" means: (a) the Digital Identification Service; (b) the Utility Key Service; and (c) such other services offered by Level One Participants to Level Two Participants and by Participants to their Customers as specified in these Operating Rules.

s. "GTO Software" means the software provided by GTO to a Participant that the Participant uses, or provides to its Customer or Level Two Participant for use, in connection with the GTO Services.

t. "GTO System" means the computer network, communications and other systems located at GTO, the Participants and their agents and processors through which Participants and GTO communicate and offer the GTO Services.

u. "GTO System Transmission" means a Certificate Status/Warranty Request, Certificate Status/Warranty Response, IWA Response, Participant Status Request, Participant Status Response, Validity Request, or Validity Response.

v. "Identification Certificate" is defined in Section 1(66).

w. "Identity Warranty" is defined in Section 1(67).

x. "Identity Warranty Amount" or "IWA" is defined in Section 1(68).

y. "Identity Warranty Claim" or "LW Claim" is defined in Section 1(69).

z. "Issuer Certificate" means the Digital Certificate issued to a Participant that relates to the Public Key of the Participant. The Issuer Certificate is issued to a Level One Participant by GTO and to a Level Two Participant by a Level One Participant.

aa. "Issuing Participant" means, with respect to a Digital Certificate, the Participant that issued that Digital Certificate.

bb. "Issuing Participant Warranty Cap" is defined in Section 1(70).

cc. "IWA Response" is defined in Section 1(71).

dd. "IW Clam" is defined in Section 1(69).

ee. "Level One Participant" or "Li Participant" means an entity: (a) whose Issuer Certificate has been issued by GTO; (b) that is permitted under these Operating Rules to issue Digital Certificates to Subscribing Customers and L2 Participants; and (c) that meets the Level One Participant eligibility criteria of Section 2.

ff. "Level One Participant Agreement" means the written agreement between a Level One Participant and GTO governing the Level One Participant's participation in the GTO System and the GTO Services that is in the form set forth in Appendix 2-1(i)(1).

gg. "Level One Participant/Level Two Participant Agreement" means the written agreement between a Level One Participant and a Level Two Participant governing the provision of services as a Level One Participant to that Level Two Participant and that is substantially in the form set forth in Appendix 2-2(b)(v).

hh. "Level Two Participant" or "L2 Participant" means an entity: (a) whose Issuer Certificate has been issued by a Level One Participant; (b) that is permitted under these Operating Rules to issue Digital Certificates only to Subscribing Customers; and (c) that meets the Level Two Participant eligibility criteria of Section 2.

ii. "Level Two Participant Agreement" means the written agreement between a Level Two Participant and GTO governing the Level Two Participant's participation in the GTO System and the GTO Services that is in the form set forth in Appendix 2-1(b)(v)(A).

jj. "Marks" means the logos, designs, trademarks, service marks, names, or symbols relating to the GTO Services, the GTO System, or GTO, including without limitation those described in Appendix 5-7.

kk. "Operating Rules" means these Operating Rules (including the related Appendices), as amended from time to time according to the procedures set forth in Section 8(1).

ll. "Participant" means a Level One Participant or a Level Two Participant.

mm. "Participant Agreement" means a Level One Participant Agreement, a Level Two Participant Agreement, or a Level One Participant/Level Two Participant Agreement.

nn. "Participant Status Request" is defined in Section 1(72) and Section 1(75).

oo. "Participant Status Response" is defined in Section 1(73) and Section 1(76).

pp. "Private Key" means one-half of a cryptographic key pair as drawn from the class of asymmetric key cryptographic functions used in the GTO System that GTO, a Participant or a Customer may apply to electronic transmissions, messages or records for identification and communication purposes, including to place a Digital Signature on a Digital Transmission.

qq. "Private Key/Public Key Pair" means a Private Key and the related Public Key of GTO, a Participant or a Customer.

rr. "Public Key" means one-half of a cryptographic key pair as drawn from the class of asymmetric key cryptographic functions used in the GTO System that is uniquely related to the Private Key of GTO, a Participant or a Customer.

ss. "Relationship Warranty Cap" or "RWC" is defined in Section 1(74).

tt. "Reliance Manager Function" means the receiving and processing of, and responding to, Certificate Status/Warranty Requests.

uu. "Relying Customer" means a Customer that requests from a Relying Participant confirmation of the status of a Digital Certificate included in a Digital Transmission as a Valid Digital Certificate or that requests approval of an Identity Warranty in connection with a Digital Transmission.

vv. "Relying Participant" means, with respect to a Relying Customer, the Participant that provides GTO Services to that Relying Customer and that has entered into a Customer Agreement with that Relying Customer.

ww. "Repository Function" means the management of a database containing information on the status of the outstanding, Expired or Revoked Digital Certificates issued by an Issuing Participant to its Subscribing Customers and/or Level Two Participants.

xx. "Revoked" means respect to a Digital Certificate that the status of the Digital Certificate has been designated as "revoked" by the Issuing Participant or GTO.

yy. "Root Key" means the Private Key of GTO.

zz. "Smart Card" means a plastic card containing a computer chip that meets the specifications and standards set forth in Appendix 3-1 (a)/2.

aaa. "Subscribing Customer" means a Customer that obtains a Digital Certificate from an Issuing Participant for use in connection with the GTO Services.

bbb. "Suspended" means, with respect to a Level One Participant that the Participant has been suspended by GTO, or with respect to a Level Two Participant that the Participant has been suspended by its sponsoring Level One Participant or GTO, pursuant to Section 7.

ccc. "Terminated" means, with respect to a Level One Participant that the Participant has terminated its participation in the GTO System or that the Participant has been terminated by GTO, or with respect to a Level Two Participant that the Participant has terminated its participation in the GTO System or that the Participant has been terminated by its sponsoring Level One Participant or GTO, pursuant to Section 7.

ddd. "Third Party Processor" means an entity or person that provides services to a Participant, pursuant to Section 3(15), in connection with the Participant's offering of the GTO Services to its Customers and/or Level Two Participants and participation in the GTO System.

eee. "Utility Certificate" is defined in Section 1(77).

fff. "Utility Key Service" is defined in Section 1(78).

ggg. "Valid" means with respect to a Digital Certificate that (a) the Digital Certificate was issued to a Participant or a Customer in accordance with these Operating Rules, (b) the Digital Certificate has not Expired or been Revoked, (c) the Participant is not Suspended on terms that cause the Digital Certificate not to be Valid, and (d) the Participant is not Terminated.

hhh. "Validity Request" is defined in Section 1(79).

iii. "Validity Response" is defined in Section 1(80).

jjj. "Year 2000-Compliant" means to record, store, process, provide and, where appropriate, insert true and accurate dates from, into and between the 20th and 21st centuries, and the years 1999 and 2000, including leap year calculations. With respect to hardware and software provided by GTO to a Participant and with respect to a Participant, Year 2000-Compliant also means compliance with the Year 2000-related requirements of the government authority(ies) applicable to the Participant.

Digital Identification Service Definitions

For purposes of the Digital Identification Service, the following terms shall have the following meanings:

kkk. "Certificate Status/Warranty Request" means an electronic message transmitted by a Relying Participant, on behalf of a Relying Customer, to an Issuing Participant that (a) requests confirmation of the status of an Identification Certificate included in a Digital Transmission as a Valid Digital Certificate, and (b) may request an Identity Warranty for that Identification Certificate. A Certificate Status/Warranty Request shall include the information items and be in the format specified in Appendix 4-1.

lll. "Certificate Status/Warranty Response" means an electronic message transmitted by an Issuing Participant to a Relying Participant responding to the Relying Participant's Certificate Status/Warranty Request. A Certificate Status/Warranty Response shall include the information items and be in the format specified in Appendix 4-1.

mmm. "Digital Identification Service~means the GTO Service described in Chapter II of these Operating Rules.

nnn. "Identification Certificate" means a Digital Certificate issued by an Issuing Participant to a Subscribing Customer that can be used by the Subscribing Customer in connection with the Digital Identification Service. An Identification Certificate shall include the information items and be in the format specified in Appendix 1.

ooo. "Identity Warranty" means a warranty by the Issuing Participant that a Subscribing. Customer Authorized a Digital Transmission.

ppp. "Identity Warranty Amount" or "IWA" means the maximum amount (in a designated currency supported by the GTO System for Identity Warranties) of an Identity Warranty.

qqq. "Identity Warranty Claim" or "IW Claim" means a claim against an Issuing Participant brought by a Relying Participant on behalf of its Relying Customer (or on its own behalf by operation of Section 11(10)) asserting a breach of an Identity Warranty approved by the Issuing Participant and seeking payment from the Issuing Participant pursuant to Section 10(11).

rrr. "Issuing Participant Warranty Cap" means the maximum amount (in a designated currency supported by the GTO System for Issuing Participant Warranty Caps) of aggregate outstanding Identity Warranty Amounts that may be approved by an Issuing Participant for all of its Subscribing Customers.

sss. "IWA Response" means an electronic message transmitted by a Relying Participant, on behalf of a Relying Customer, to an Issuing Participant and GTO accepting or rejecting an Identity Warranty approved by the Issuing Participant. An IWA Response shall include the information items and be in the format specified in Appendix 4-1.

ttt. "Participant Status Request" means an electronic message transmitted by a Participant to GTO that requests confirmation of the status of an Issuer Certificate of another Participant. A Participant Status Request shall include the information items and be in the format specified in Appendix 4-1.

uuu. "Participant Status Response" means an electronic message transmitted by GTO to a Relying Participant and an Issuing Participant responding to a Participant Status Request. A Participant Status Response shall include the information items and be in the format specified in Appendix 4-1.

vvv. "Relationship Warranty Cap" or "RWC" means the maximum amount (in a designated currency supported by the GTO System for Relationship Warranty Caps) of aggregate outstanding Identity Warranty Amounts that may be approved by an Issuing Participant for a particular Subscribing Customer, Level Two Participant and/or a particular Identification Certificate.

Utility Key Service Definitions

For purposes of the Utility Key Service, the following terms shall have the following meanings:

www. "Participant Status Request" means an electronic message transmitted by a Participant to GTO that requests confirmation of the status of an Issuer Certificate of another Participant. A Participant Status Request shall include the information items and be in the format specified in Appendix 4-1.

xxx. "Participant Status Response" means an electronic message transmitted by GTO to a Relying Participant and an Issuing Participant responding to a Participant Status Request. A Participant Status Response shall include the information items and be in the format specified in Appendix 4-1.

yyy. "Utility Certificate" means a Digital Certificate issued by an Issuing Participant to a Subscribing Customer that can be used by a Subscribing Customer in connection with the Utility Key Service. A Utility Certificate shall include the information items and be in the format specified in Appendix 1.

zzz. "Utility Key Service" means the GTO Service described in Chapter III of these Operating Rules.

aaaa. "Validity Request" means an electronic message transmitted by a Relying Participant, on behalf of a Relying Customer, to an Issuing Participant that requests confirmation of the status of a Utility Certificate included in an electronic message as a Valid Digital Certificate. A Validity Request shall include the information items and be in the format specified in Appendix 4-1.

bbbb. "Validity Response" means an electronic message transmitted by an Issuing Participant to a Relying Participant responding to the Relying Participant's Validity Request. A Validity Response shall include the information items and be in the format specified in Appendix 4-1.

Section 2

Participant Eligibility a. Eligible Level One Participants. An entity is eligible to be a Level One Participant if:

i. either the entity, or the parent of the entity which directly or indirectly wholly-owns the entity:
 (1) (A) is engaged primarily in the business of providing financial services (such as banking, securities, or insurance underwriting), (B) is subject to substantive regulation by a government authority in its designated home country, (C) is subject to periodic examination by a government authority in its designated home country, (D) is subject to capital requirements (or an alternative equivalent measure) established by a government authority in its designated home country, and (E) reports financial information on its operations no less frequently than annually to a government authority in its designated home country;
 (2) has a ratio of Tier 1 capital to risk weighted assets of at least six (6) percent, calculated in accordance with the standards established by the Basle Committee on Banking Regulations and Supervisory Practices or its successors (or has an alternative equivalent capital ratio calculated in accordance with the standards established by a government authority in its designated home country), for the previous two fiscal years;
 (3) has Tier 1 capital, as defined by the Basle Committee on Banking Regulations and Supervisory Practices or its successors (or as defined by a government authority in its designated home country) of at least $500 million (U.S.), for the previous two fiscal years; and
 (4) has a minimum long term debt rating of "A" from Thomson Bank Watch. Inc., "Baa-i" or "Baa" from Moody's Investors Service, Inc., or "BBB+" from Standard & Poor's Ratings Services. Duff& Phelps, Inc. or Fitch Investor's Service (or an equivalent rating from an internationally recognized public rating agency as recognized in its designated home country); and a minimum short term debt rating of "TBW-3" from Thomson BankWatch, Inc., "A-2" from Standard & Poor's Ratings Services, "Prime 2" from Moody's Investors Service, Inc., "Duff 2" from Duff & Phelps, Inc., "F-2" from Fitch Investor's Service, or "MCM 2" from McCarthy, Crisanti & Maffei (or an equivalent rating from an internationally recognized public rating agency as recognized in its designated home country or an other equivalent rating recognized by GTO); and ii. the entity:
 (1) demonstrates that it possesses all necessary legal and corporate authority, including under the applicable law described in Section 3(13), to participate in the GTO System, to offer the GTO Services to its Customers, and to meet the obligations of a Level One Participant in accordance with these Operating Rules;
 (2) either is subject to "Know Your Customer" requirements of a government authority in its designated home country that at least meet the Financial Action Task Force's recommendations or complies with the minimum "Know Your Customer" requirements prescribed in Appendix 2-1 (b)(ii);
 (3) demonstrates that its Customer Agreements are binding upon and enforceable against its Customers;
 (4) if owned in whole or in part by a government or a governmental authority, waives any claim to, or protection of, sovereign immunity with respect to any claims or liabilities arising under these Operating Rules or arising from the entity's participation in the GTO System or offering of the GTO Services, including without limitation with respect to execution of Dispute Resolution or other judgments and pre-judgment attachment; and (5) executes (A) a Level One Participant Agreement in the form of Appendix 2-1(b)(v)(A), (B) a GTO Software License in the form of Appendix 2-1(b)(v) (B), (C) a GTO Security Agreement in the form of Appendix 2-1(b)(v)(C), and (D) a Verification Of Eligibility in the form of Appendix 2-1(b)(v)(D).

b. Eligible Level Two Participant. An entity is eligible to be a Level Two Participant if:

i. either the entity, or the parent of the entity which directly or indirectly wholly-owns the entity:

(1) (A) is engaged primarily in the business of providing financial services (such as banking, securities, or insurance underwriting), (B) is subject to substantive regulation by a government authority in its designated home country, (C) is subject to periodic examination by a government authority in its designated home country, (D) is subject to capital requirements (or an alternative equivalent measure) established by a government authority in its designated home country, and (E) reports financial information on its operations no less frequently than annually to a government authority in its designated home country;

(2) has a ratio of total capital to risk weighted assets of at least eight (8) percent, calculated in accordance with the standards established by the Baste Committee on Banking Regulations and Supervisory Practices or its successors (or has an alternative equivalent capital ratio calculated in accordance with the standards established by a government authority in its designated home country), for the previous two fiscal years; and (3) has a minimum long term debt rating of "A" from Thomson Bank Watch, Inc., "Baa-l" or "Baa" from Moody's Investor Services, Inc., or "BBB+" from Standard & Poor's Ratings Services, Duff & Phelps, Inc. or Fitch Investor's Service (or an equivalent rating from an internationally recognized public rating agency as recognized in its designated home country); and a minimum short term debt rating of "TB W-3" from Thomson Bank Watch, Inc., "A-2" from Standard & Poor's Ratings Services, "Prime 2" from Moody's Investors Services Inc., "Duff 2" from Duff& Phelps, Inc., "F-2" from Fitch Investor's Service, or "MCM 2" from McCarthy, Crisanti & Maffei (or an equivalent rating from an internationally recognized public rating agency as recognized in its designated home country or an other equivalent rating recognized by GTO); and ii. the entity:

(1) demonstrates that it possesses all necessary legal and corporate authority, including under the applicable law described in Section 3(13), to participate in the GTO System, to offer the GTO Services to its Customers, and to meet the obligations of a Level Two Participant under these Operating Rules;

(2) either is subject to "Know Your Customer" requirements of a government authority in its designated home country that at least meet the Financial Action Task Force's recommendations or complies with the minimum "Know Your Customer" requirements prescribed in Appendix 2-1(b)(ii);

(3) demonstrates that its Customer Agreements are binding upon and enforceable against its Customers;

(4) if owned in whole or in part by a government or a governmental authority, waives any claim to, or protection of, sovereign immunity with respect to any claims or liabilities arising under these Operating Rules or arising from the entity's participation in the GTO System or offering of the GTO Services, including without limitation with respect to execution of Dispute Resolution or other judgments and pre-judgment attachment;

(5) executes a Level One Participant/Level Two Participant Agreement in the form of Appendix 2-2(b) (v); and (6) executes a Level Two Participation Agreement in the form of Appendix 2-a GTO Software License in the form of Appendix 2-1(b)(v)(B), and a Verification Of Eligibility in the form of Appendix 2-1(b) (v)(D), if the sponsoring Level One Participant does not demonstrate to GTO's satisfaction that GTO will be able, under applicable law, to enforce its rights as a third party beneficiary of the Level One Participant Level Two Participant Agreement with respect to a Level Two Participant to the same extent that GTO would be able to if it were a party to that Level One Participant/Level Two Participant Agreement.

c. Other Entities. GTO may determine an entity comprised of owners, members or participants engaged primarily in the business of providing financial services to be eligible to be a Level One Participant or a Level Two Participant, notwithstanding that the entity does not satisfy one or more of the eligibility criteria of Section 2(1) or Section 2(2), provided GTO determines that (a) the entity's participation in the GTO System as a Participant will further the purposes of the GTO System, (b) the entity is subject to supervision, examination or regulation by a government authority in its designated home country, and (c) the entity's participation in the GTO System as a Participant will not impose material additional risk to GTO, the GTO System or one or more Participants.

d. Determination of Eligibility.

i. An entity seeking to become a Level One Participant shall provide to GTO documentation satisfactory to GTO to enable GTO to determine whether the entity satisfies the conditions of eligibility specified for Level One Participants in Section 2. GTO shall in its sole discretion determine whether any entity satisfies such conditions of eligibility. GTO may deny admission to an entity, that otherwise satisfies such eligibility criteria, on the basis of legal, reputational, operational, credit or other risk that GTO in its sole discretion determines the admission of the entity could pose to GTO, the GTO System or one or more Participants.

ii. With respect to an entity seeking to become a Level Two Participant, its sponsoring Level One Participant shall obtain documentation satisfactory to the Level One Participant to enable the Level One Participant to determine whether the entity satisfies the conditions of eligibility specified for Level Two Participants in Section 2(2). A Level One Participant may sponsor an entity as a Level Two Participant only if the entity satisfies such conditions of eligibility.

e. Change in Circumstances.

i. Should circumstances change that would affect a Level One Participant's eligibility to be a Level One Participant, the Level One Participant shall immediately notify GTO of such change.

ii. A sponsoring Level One Participant shall require its sponsored Level Two Participants to notify immediately the Level One Participant should circumstances change that would affect the Level Two Participant's eligibility to be a Level Two Participant.

Section 3

GTO Services

General Rights and Responsibilities of Participants a. Issuance of Digital Certificates to Customers.
i. A Participant may use its Private Key and the related Digital Certificate from GTO or a Level One Participant to issue Digital Certificates to its Customers. A Participant is responsible for the distribution of Digital Certificates to its Customers, and for requiring its Customers to distribute Digital Certificates, in accordance with the minimum standards set forth in Appendix 3-1(a)/i and Appendix 3-1(a)/2. A Participant also is responsible for generating for its Customers Private Key/Public Key Pairs, or for requiring its Customers to generate Private Key/Public Key Pairs, in accordance with the minimum standards set forth in Appendix 3-1(a)/I and Appendix 3-1(a)/2.
ii. A Participant shall not issue Digital Certificates to natural persons, but only to non-consumer entities, such as companies, corporations, limited liability companies, associations, government agencies, partnerships and sole proprietorships. A Customer may authorize any natural person (for example, employees) or entity (for example, subsidiaries or affiliates) to utilize on behalf of the Customer the Digital Certificate issued to the Customer, but each act or omission of such persons or entities with respect to the Digital Certificate shall for all purposes of these Operating Rules be deemed to be an act or omission of the Customer.
iii. A Participant shall use its Issuer Certificate only for the purposes set forth in the Operating Rules.
b. Safekeeping of Participant's Private Key. A Participant is responsible for the safekeeping of its Private Key. This safekeeping shall require, at a minimum, that all operational uses of the Participant's Private Key, including without limitation the generation and storage of the Private Key, occur in computer hardware devices. In addition, the Participant shall safekeep its Private Key in accordance with the minimum standards set forth in Appendix 3-1(a)/I.
c. Generation of Participant's Private Key/Public Key Pair. A Participant is responsible for the generation of its Private Key/Public Key Pair in accordance with the minimum standards set forth in Appendix 3-1(a)/i.
d. Operational Procedures; Technical Standards. A Participant is responsible for complying with the operational procedures, technical standards and other requirements set forth in Appendix 3-1 (a)/I, Appendix 3-1 (a)/2, Appendix 3-6(b) and Appendix 3-2.
e. Communications. A Participant shall use its Private Key to digitally sign each GTO System Transmission that it sends. The Participant shall include its Issuer Certificate in each GTO System Transmission.
f. Time Clock/Time Stamping.
i. A Participant shall operate a time clock as part of its computer system that records the time for purposes of the GTO Services. The time established on this time clock shall be based on a reliable time source selected by the Participant, and shall operate on the Greenwich Mean Time standard. GTO may require the Participant to select another reliable time source if there is more than a _____ second differential between the time on the Participant's time clock and the time on the GTO time clock.
ii. A Participant shall include a time stamp on each GTO System Transmission it sends. The formats and parameters for effective time stamps are set forth in Appendix 3-6(b). A Participant shall not rely upon or deem effective a GTO System Transmission that does not contain a time stamp or for which the referenced time in the time stamp is outside permitted parameters for that type of GTO System Transmission, as set forth in Appendix 3-6(b).
g. Expired or Revoked Issuer Certificates.
i. Once a Participant's Issuer Certificate has Expired or has been Revoked pursuant to Section 4(4), the Participant shall: (i) cease to use the Issuer Certificate for any purpose in connection with the GTO Services; and (ii) cause its Subscribing Customers and Level Two Participants to cease using for any purpose in connection with the GTO Services their Digital Certificates that are digitally identified with the Expired or Revoked Issuer Certificate. Upon learning that the Participant's Issuer Certificate has been or will be Revoked, the Participant shall provide as promptly as possible but in no event later than thereafter notice of such Revocation to all of its Customers and Level Two Participants.
ii. In the event GTO in its sole discretion determines to issue a replacement Issuer Certificate for the Expired or Revoked Issuer Certificate as provided in Section 4(4), the Participant shall comply with the procedures set forth in Appendix 3-6(b).
h. Availability of Participant; Response Time Periods.
i. Except where otherwise prohibited under any applicable law, a Participant shall be continuously available (twenty-four hours a day, every calendar day of the year) to respond to GTO System Transmissions. Except as otherwise prohibited under any applicable law, a Participant shall respond to a GTO System Transmission according to the time periods set forth in Appendix 3-6(b).
ii. Prior to the end of November of each calendar year, a Participant shall disclose to GTO those days or portions of days of the next calendar year during which the Participant will be prohibited under applicable law from responding to GTO System Transmissions as provided in Section 3(8)(a).
i. License Agreement. If a Participant provides any GTO Software, hardware, telecommunication equipment or other electronic devices received from GTO to a Customer, or to a Level Two Participant that has not entered into a GTO Software License with GTO pursuant to Section 2(2)(b)(vi), for use in accessing or using a GTO Service, the Participant shall enter into a written sub-license agreement with its Customer or Level Two Participant substantially in the form set forth in Appendix 3-9.
j. Confidentiality.
i. GTO Information. A Participant shall treat all Confidential Information as confidential and proprietary. A Participant shall use at least the same degree of care to protect the confidentiality of the Confidential Information as the Participant uses to protect its own similar confidential information, which degree of care shall be no less than reasonable care. Except as provided in Section 3(10)(e), a Participant shall only disclose Confidential Information to its employees, agents and contractors as necessary to offer the GTO Services to its Customers. Prior to disclosing Confidential Information to an employee, agent or contractor, such person shall be subject to applicable employment policies, agreements or contracts which require Confidential Information to be held in confidence and not to be disclosed to a third party except as permitted under Section 3(10)(e).

ii. Participant Information. GTO shall treat as confidential and proprietary all information provided to GTO by a Participant and identified to GTO as confidential. GTO shall use at least the same degree of care to protect the confidentiality of confidential Participant information as GTO uses to protect its own similar confidential information, which degree of care shall be no less than reasonable care. Except as provided in Section 3(10)(e), GTO shall only disclose confidential Participant information to its employees, agents and contractors as necessary to offer the GTO Services to the Participant. Prior to disclosing confidential Participant information to an employee, agent or contractor, such person shall be subject to applicable employment policies, agreements or contracts which require confidential Participant information to be held in confidence and not to be disclosed to a third party except as permitted under Section 3(10)(e).

iii. Customer Information. Except as provided in Section 3(10)(e), GTO or a Participant shall not use any information obtained from a Customer of either the Participant or another Participant in connection with the GTO Services for purposes other than providing the GTO Services. GTO or a Participant shall use at least the same degree of care to protect the confidentiality of such information as it uses to protect its own similar confidential information, which degree of care shall be no less than reasonable care. Except as provided in Section 3(10)(e), GTO or a Participant shall only disclose such information to its employees, agents and contractors as necessary to offer the GTO Services to the Customer. Prior to disclosing such information to an employee, agent or contractor, such person shall be subject to applicable employment policies, agreements or contracts which require such information to be held in confidence and not to be disclosed to a third party except as permitted under Section 3(10)(e).

iv. Notice of Potential Confidentiality Breach. A Participant shall provide notice to GTO as promptly as reasonably possible in the event the Participant learns of an actual or potential breach of confidentiality of Confidential Information or Customer information subject to Section 3(10)(c). GTO shall provide notice to Participant as promptly as reasonably possible in the event GTO learns of an actual or potential breach of confidentiality of Participant confidential information subject to Section 3(10)(b) or Customer information subject to Section 3(10)(c).

v. Exception. The prohibitions of this Section 3(10) shall not apply to any disclosure of information if that disclosure: (i) is necessary to provide any aspect of the GTO Services; (ii) is pursuant to the investigation or resolution of an alleged error or an IW Claim; (iii) is pursuant to a Dispute Resolution; (iv) is otherwise authorized by all parties with an interest in the information; (v) is required by applicable law or regulation or is pursuant to a subpoena or order of a court or other government or regulatory authority with which the entity disclosing the information is legally obligated to comply; or (vi) is pursuant to a demand made by any government regulatory agency or authority with jurisdiction over the entity disclosing the information.

k. Status of Parties. These Operating Rules, the agreements provided for in these Operating Rules and the operation of the GTO System shall not constitute, create or in any way be interpreted as creating a joint venture, agency relationship, partnership or formal business organization of any kind between GTO and the Participants or between two or more Participants. The rights and obligations between and among the Participants, as such, and GTO shall be limited to those expressly set forth in these Operating Rules and the agreements provided for in these Operating Rules.

l. Participant Financial Information. Each Participant shall provide to GTO the information requested by GTO on a periodic basis or from time to time about the financial condition of the Participant, except to the extent prohibited from doing so under any applicable law.

m. Compliance with Applicable Law. Each Participant is responsible for offering the GTO Services to its Customers in compliance with any applicable law, regulation or other legal requirement, including without limitation applicable law governing digital signatures, certificate authorities, public key/private key or asymmetric cryptography, encryption export or import restrictions, data privacy, anti-trust or competition and confidentiality. A Participant is responsible for obtaining any required approval or consent from or providing any required notice to applicable government authorities prior to offering the GTO Services to its Customers.

n. Records. Each Participant shall maintain its records of the types specified in Appendix 3-1 (a)/i relating to the GTO Services for the time periods and in the manner specified in Appendix 3-1(a)/i.

o. Third Party Processors.
  i. With at least _____ days prior notice to GTO, a Participant may contract with one or more Third Party Processors to undertake on behalf of the Participant certain or all of the responsibilities of the Participant under these Operating Rules and to provide on behalf of the Participant the GTO Services to Customers and/or Level Two Participants. Such prior notice to GTO shall include: (i) the name, address and telephone number of the Third Party Processor; (ii) the name, address and telephone number of a contact person at the Third Party Processor and at the Participant; and (iii) such other information as required by GTO.
  ii. A Participant that enters into an arrangement with a Third Party Processor whereby the Third Party Processor performs any of the following functions, _____[list functions], shall require the Third Party Processor to execute with GTO and the Participant a Third Party Processor Agreement substantially in the form set forth at Appendix 3-15. A Participant that enters into an arrangement with a Third Party Processor that does not involve any of the functions specified in the preceding sentence shall execute a written agreement with the Third Party Processor which includes a requirement that the Third Party Processor (i) comply with these Operating Rules (as they are applicable to the Participant that has entered into the arrangement with the Third Party Processor), (ii) cooperate fully with any Dispute Resolution where its cooperation is requested by a Participant or GTO, and (iii) be bound by the decisions of any arbitral tribunal resulting from any Dispute Resolution to which the Participant that has entered into the arrangement with the Third Party Processor may be subject. This Section 3(15)(b) does not apply to any functions provided by a sponsoring Level One Participant to its sponsored Level Two Participant.

iii. Notwithstanding any arrangement with a Third Party Processor, the Participant that has entered into the arrangement with the Third Party Processor shall remain primarily responsible and liable to GTO and the other Participants for the Participant's obligations under these Operating Rules. All acts or omissions of the Third Party Processor shall for all purposes of these Operating Rules be deemed to be acts or omissions of the Participant that has entered into the arrangement with the Third Party Processor.

p. Indemnification.

i. Notwithstanding anything in these Operating Rules to the contrary, a Participant shall indemnify GTO, each other Participant, and their respective directors, officers and employees from and against any and all liability, loss, claim or expense incurred by or damages to GTO, the other Participant, or their respective directors, officers and employees and arising from: (i) the Participant's failure to comply with any applicable law, these Operating Rules or a Participant Agreement; (ii) the Participant's Customer's failure to comply with any applicable law or a Customer Agreement between that Participant and that Customer; (iii) the failure or breach of the security or integrity of the Participant's Private Key as a result of the failure of the Participant to comply with the minimum standards set forth in Section 3(1), Section 3(2), Section 3(3) or Section 3(4); (iv) the provision by the Participant of any GTO Service to any person or entity that is not a Customer or a Level Two Participant; (iv) the gross negligence or willful misconduct of the Participant, or (v) a claim of the Participant's Customer, other than an IW Claim.

ii. Notwithstanding anything in these Operating Rules to the contrary, a Level One Participant shall with respect to each Level Two Participant with which it has executed a Level One Participant/Level Two Participant Agreement indemnify GTO, each other Participant, and their respective directors, officers and employees from and against any and all liability, loss, claim or expense incurred by or damage to GTO, the other Participant or their respective directors, officers and employees and arising from: (i) the acts or omissions of such Level Two Participant in providing the GTO Services to its Customers; (ii) such Level Two Participant's participation in the GTO System; (iii) such Level Two Participant's failure to comply with its Level One Participant/Level Two Participant Agreement; or (iv) claims of the Customers of such Level Two Participant, other than an IW Claim.

q. Contingency Plans. A Participant shall maintain contingency plans in force, including adequate back-up and recovery procedures, to ensure that the Participant can continue to meet its obligations under these Operating Rules without material interruption in the event of the failure or shut down of the Participant's primary computer facilities or other operating facilities. A Participant's contingency plans shall meet the minimum requirements set forth at Appendix 3-2. A Participant shall notify GTO within _____ hours of transferring any portion of its Certificate Authority services to its back-up or recovery facilities.

r. Collateral Requirements.

i. Each Issuing Participant shall post collateral, as provided in its GTO Security Agreement, in such amount and at such times as established by GTO for the Participant from time to time in accordance with the standards set forth in Appendix 2-1(b)(v)(C), as security for the payment of Certified IW Claims against that Participant.

ii. Each Issuing Participant shall execute and deliver the GTO Security Agreement and such other documents as GTO may request from time to time in order to facilitate the posting of collateral under this Section 3(18).

iii. The collateral posted by each Participant shall be valued by GTO from time to time in accordance with Appendix 2-1(b)(v)(C).

iv. A default shall be deemed to have occurred under the GTO Security Agreement if a Participant fails to pay when due and owing all or any portion of a Certified IW Claim against the Participant.

v. Upon the occurrence and continuation of such a default, GTO shall instruct the Collateral Agent to sell or redeem collateral posted by a Participant in the order and manner and with such priority among Relying Customers, set forth in Appendix 2-1(b)(v)(C).

vi. No Customer, Participant or other entity or person shall have any claim or right in the collateral posted by a Participant under this Section 3(18), other than as provided for in the GTO Security Agreement.

vii. Except as provided in Section 4(8)(a), GTO shall have no obligation or liability to any Customer, Participant or any other entity or person in connection with GTO's responsibilities provided for in this Section 3(18). Without limiting the generality of the preceding sentence, GTO shall have no obligation to provide funds or collateral to the extent that there is insufficient collateral maintained by an Issuing Participant to satisfy all or a portion of the Identity Warranty Claims brought against the Issuing Participant, or to the extent that such collateral is not accessible for any reason.

viii. A Level Two Participant shall maintain the collateral required under this Section 3(18) through its sponsoring Level One Participant on a pass-through basis.

ix. Upon Suspension or Termination of a Participant pursuant to Section 7, the Suspended or Terminated Participant shall post such additional collateral as required by GTO in accordance with the standards set forth in Appendix 2-1 (b)(v)(C).

s. Compliance Audits.

i. Each Participant shall conduct, at the Participant's expense, an internal or external audit of its compliance with these Operating Rules. This audit shall be conducted in compliance with the minimum standards set forth in Appendix 3-6(b), and shall be conducted at least annually. The Participant shall provide the results of each such audit to GTO, at the Participant's expense. A sponsoring Level One Participant is responsible for ensuring that each of its sponsored Level Two Participants complies with the audit requirements of this Section 3(19Xa).

ii. In the event that a Participant does not provide GTO a copy of the results of its annual audit as provided in Section 3(19)(a), until such time as the results of such an audit are provided to GTO, GTO or its designated agent shall have the right to conduct at Participant's expense, at a time and frequency determined by GTO in its sole discretion, on-site audits of the Participant to determine the Participant's compliance with these Operating Rules. The Participant shall in connection with this audit provide to such auditors and inspectors designated by GTO reasonable access to the Participant's and its Third Party Processor's facilities, employees, subcontractors, books and records.

iii. The Participant shall at the Participant's expense remedy any deficiencies revealed by any audit conducted pursuant to this Section 3(19) within the time period specified in the audit results, or if no such time period is specified within a reasonable time period.

t. Dispute Resolution. Each Participant agrees to resolve in accordance with the Dispute Resolution procedures prescribed in Appendix 3-20 any dispute with another Participant, GTO, a Relying Customer or a Subscribing Customer arising from the Participant's participation in the GTO System or provision of any GTO Service, except with respect to a Customer of the Participant as otherwise provided in the Customer Agreement. The only remedy available against GTO in any such Dispute Resolution proceeding shall be monetary damages, limited to the extent provided in Section 4(8). Without limiting the generality of the preceding sentence, a Participant Suspended or Terminated by GTO cannot obtain reinstatement pursuant to a Dispute Resolution proceeding.

u. Participant As Issuing Participant and Relying Participant. Each Participant shall be both an Issuing Participant and a Relying Participant; although no Participant shall be required to enter into a Customer Agreement with any particular Subscribing Customer or any particular Relying Customer.

v. Subscribing Customer and Relying Customer Utilize Same Participant. In the event that, with respect to a Digital Transmission, the Subscribing Customer and the Relying Customer both receive GTO Services from the same Participant, that Participant shall with respect to that Digital Transmission be both the Issuing Participant (for the Subscribing Customer) and the Relying Participant (for the Relying Customer).

w. Year 2000 Compliance. All hardware and software (other than hardware and software provided by GTO) used by the Participant in connection with the GTO System or to provide GTO Services, including any hardware or software provided by the Participant to a Level Two Participant or Customer, shall be Year 2000-Compliant.

Section 4

Role of GTO a. Issuance of Digital Certificates. GTO shall issue Issuer Certificates and the GTO Software to each Level One Participant in accordance with the requirements of Appendix 3-1(a)/1 and Appendix 3-1(a)/2 for use by such Level One Participant in connection with its offering of the GTO Services to Level Two Participants and Customers and their participation in the GTO System. GTO shall act as the Certificate Authority for all Issuer Certificates issued by GTO to Level One Participants, and shall respond to Participant Status Requests received from Participants in accordance with the requirements of Appendix 4-1.

b. Safekeeping of Root Key. GTO is responsible for the safekeeping of the Root Key in accordance with the standards set forth in Appendix 4-2.

c. Operational Procedures; Technical Standards. GTO shall develop and make available to the Participants the operating procedures and technical and other standards necessary for GTO System Transmissions.

d. Expired or Revoked Issuer Certificates.
  i. Issuer Certificates shall Expire in accordance with the terms of the Issuer Certificate and the procedures prescribed in Appendix 3-6(b). Upon the request of the Participant, GTO shall in accordance with the procedures set forth in Appendix 3-1(a)/i issue a replacement Issuer Certificate to replace the Expired Issuer Certificate.
  ii. GTO may, in accordance with the procedures prescribed in Appendix 3-6(b), Revoke a Participant's Issuer Certificate in the event GTO determines in its sole discretion that: (i) the security or confidentiality of the Participant's Private Key or the Root Key has been compromised or is reasonably at risk of being compromised; (II) the Revocation is necessary to avoid an immediate and material threat to the safe and sound operation of the GTO System; or (iii) the Participant is Terminated pursuant to Section 7. GTO shall endeavor to provide notice to the Participant prior to the Revocation of its Issuer Certificate. In any event, it shall provide such notice to the Participant as promptly as reasonably possible after such Revocation. Such notice shall state the reasons for Revocation. Upon the request of the Participant, GTO shall in accordance with the procedures set forth in Appendix 3-1(a)/i issue a replacement Issuer Certificate to replace a Revoked Issuer Certificate if GTO reasonably determines that the cause(s) or reason(s) for the Revocation have been remedied or otherwise have been satisfactorily addressed.
  iii. The Expiration or Revocation of an Issuer Certificate does not negate or otherwise affect any transaction, GTO System Transmission or other communication governed by these Operating Rules containing the Issuer Certificate that occurred prior to such Expiration or Revocation.

e. Suspended; Terminated Participant. GTO may Suspend or Terminate a Participant as provided in Section 7.

f. Availability of GTO; Response Time Periods. Except where otherwise prohibited under any applicable law, GTO shall be continuously available (twenty-four hours a day, every calendar day of the year) to respond to Participant Status Requests. Except where otherwise prohibited under any applicable law, GTO shall respond to a Participant Status Request according to the time periods set forth in Appendix 4-1.

g. Compliance Audit/Examination of Records/Regulatory Examination.
  i. GTO shall conduct, at GTO's expense, an internal or external audit of its compliance with these Operating Rules. This audit shall be conducted on at least an annual basis. GTO shall provide the results of an audit to a Participant upon the Participant's request and at the Participant's expense.
  ii. In the event GTO does not conduct an audit for a particular annual period as provided in Section 4(7)(a), a Participant shall have the right to audit at its own expense GTO for that annual period. The Participant shall reimburse GTO for the costs incurred by it due to such audit.
  iii. GTO agrees that GTO, and the records maintained by it in connection with the operation of the GTO System and the provision of the GTO Services to a Participant, shall be available for examination and audit at the location at which GTO maintains such records by the governmental or regulatory agencies having jurisdiction over the Participant. GTO also agrees to provide these governmental or regulatory agencies access to the equipment employed by GTO to provide the GTO Services to the Participant, and to permit GTO employees and agents to be interviewed by such governmental or regulatory agencies in connection with such examination and audit. Each Participant subject to the jurisdiction of such governmental or regulatory agency(ies) shall reimburse GTO on a pro rata basis for the costs incurred by it due to any such examination or audit.

h. GTO Liability.

i. Except as otherwise provided in this Section 4(8), GTO shall be liable only to an Issuing Participant for (i) the Issuing Participant's liability to a Relying Customer under Section 10(11) (or the Relying Participant by operation of Section 11(10)) in the event the Issuing Participant's erroneous confirmation of the Validity of an Identification Certificate in connection with a Certificate Status/Warranty Response approving an Identity Warranty resulted solely from the failure of GTO to safekeep the Root Key as provided in Section 4(2); [(ii) insert any additional GTO liability for GTO System performance;] and (iii) any liability of or damages to a Participant arising as a result of the gross negligence or willful misconduct of GTO. In no event shall GTO be liable to a Participant for any punitive, indirect, incidental, special or consequential damages, regardless of the form of action and regardless of whether GTO was advised of the possibility of such damages. Notwithstanding anything in this Section 4(8)(a) to the contrary, GTO's liability for any act or omission or series of acts or omissions related to the same occurrence shall be limited to a maximum of $_____. Notwithstanding anything in this Section 4(8)(a) to the contrary, GTO shall not incur any liability to a Participant or any other entity or person if GTO is prevented, forbidden or delayed from performing, or omits to perform, any act or requirement, including without limitation in connection with its safekeeping of the Root Key, by reason of: (i) any provision of any present or future law or regulation or order of the United States of America, or any state thereof, or of any foreign country, or political subdivision thereof or of any court of competent jurisdiction that is applicable to a Participant or GTO; (ii) the failure of any electrical, communication or other system operated by any party other than GTO; or (iii) any act of God, emergency condition or war or other circumstance beyond the control of GTO, provided GTO exercises such diligence as the circumstances require.

ii. Except as specifically provided in Section 4(8)(a), GTO shall have no liability to any Participant, Customer or other entity or person for any loss, claim, damage or expense arising from GTO's or its or their participation in any way in the GTO System, any GTO Service, or the offering of any GTO Service to Customers, Level Two Participants or other entities or persons.

i. DISCLAIMER OF WARRANTIES. GTO DISCLAIMS ANY AND ALL WARRANTIES, BOTH EXPRESS AND IMPLIED, INCLUDING ANY IMPLIED WARRANTY OF MERCHANTABILITY, ANY WARRANTY OF FITNESS FOR A PARTICULAR PURPOSE AND ANY WARRANTY OF ACCURACY OF INFORMATION PROVIDED WITH RESPECT TO THE GTO SYSTEM, THE PRIVATE KEY/PUBLIC KEY PAIRS, THE DIGITAL CERTIFICATES, THE GTO SERVICES OR ANY OTHER SERVICE PROVIDED BY GTO TO THE PARTICIPANTS. GTO FURTHER DISCLAIMS ANY AND ALL WARRANTIES, BOTH EXPRESS AND IMPLIED, THAT THE USE OF THE GTO SERVICES WILL AFFECT IN ANY MANNER THE LEGAL RECOGNITION OR ENFORCEABILITY OF A DIGITAL TRANSMISSION.

j. Dispute Resolution. GTO agrees to resolve in accordance with the Dispute Resolution procedures prescribed in Appendix 3-20 any dispute with another Participant arising from the GTO System or the provision of any GTO Service. The only remedy available against GTO in any such Dispute Resolution proceeding shall be monetary damages, limited to the extent provided in Section 4(8). Without limiting the generality of the preceding sentence, a Participant Suspended or Terminated by GTO cannot obtain reinstatement pursuant to a Dispute Resolution proceeding. GTO's participation in a Dispute Resolution in which a Customer or any other entity or person that is not a Participant also participates or which otherwise involves a Customer or any other entity or person that is not a Participant shall not subject GTO to any obligation or liability to such Customer, entity or person.

k. Year 2000 Compliance. All hardware, GTO Software and other software used by GTO in connection with the GTO System, including any hardware. GTO Software or other software provided by GTO to a Participant, shall be Year 2000-Compliant.

Section 5

Marks a. Subject to the provisions of this Section 5, GTO grants to the Participant a non-exclusive royalty-free, personal license to use the Marks solely in connection with the offering of GTO Services to its Customers as set forth below. Except as expressly provided herein, the Participant may not transfer or sub-license its license to use the Marks to any legal or natural person.

b. The Participant acknowledges that GTO and its vendors are the sole and exclusive owners of all right, title and interest in and to the Marks. The Participant acknowledges and agrees that its use of the Marks shall be binding on, and shall inure to the benefit and be on behalf of, GTO and its heirs, legal representatives, successors and assigns. The Participant acknowledges the Marks are valid under applicable law and that the Participant's use of the Marks as set forth herein will not create in the Participant any right, title or interest in or to such Marks.

c. The Participant shall use and display the appropriate Marks when offering the GTO Services to its Customers in a manner that indicates that the offered services are GTO Services, in accordance with the guidelines set forth in Appendix 5-7. The Participant shall use the Marks so that such trademarks make a separate and distinct impression from any other trademark that may be used with or affixed to the materials bearing the Marks, as well as any associated documentation or marketing materials. Except as permitted herein, the Participant shall not adopt or use as part or all of any corporate name, trade name, trademark, service mark or certification mark, the Marks, either alone or in combination with other words, or any other mark based on the Marks, or any designation confusingly similar to the Marks, without the prior written consent of GTO. If an application for registration is or has been filed anywhere in the world by or on behalf of the Participant that relates to any mark which, in the reasonable opinion of GTO, is confusingly similar, deceptive or misleading with respect to, or dilutes in any way, any of the Marks, the Participant shall, at GTO's request, abandon all use of such mark, and any registration or application for registration thereof, and the Participant shall reimburse GTO for all costs and expenses of any opposition or related proceeding (including attorneys' fees) instigated by GTO or its authorized representative on account of such usage. The Participant shall not imply that any services offered under the Marks are exclusively offered by the Participant.

d. The Participant shall provide GTO with written notice of any infringement, potential infringement or improper use of the Marks that comes to the attention of the Participant. Only GTO shall have the right to file or register the Marks with a governmental authority; however, the Participant shall provide reasonable assistance to GTO to protect the Marks or record the interests of GTO in the Marks in any jurisdiction in which the Participant distributes materials bearing the Marks, including the review and execution of documents. Notwithstanding the foregoing, only GTO shall have the right to bring suit for infringement, dilution or unfair competition or otherwise in connection with the Marks.

e. Upon the request of GTO, the Participant shall provide GTO with a copy of all materials that the Participant uses that include any of the Marks to permit GTO to assess the level of consistency and quality of use of the Marks and to ensure that the Participant maintains the consistency and quality of the materials bearing the Marks. The Participant shall provide such materials at no cost to GTO. If at any time GTO, in its sole discretion, determines that any of the materials bearing the Marks falls to materially conform to the standards set forth in Appendix 5-7, GTO shall notify the Participant in writing and the Participant shall correct the non-conformance and provide a corrected specimen of the materials bearing the Marks to GTO for review within thirty (30) days from the written notice from GTO regarding such non-conformance.

f. The Participant agrees that it will not challenge, in a court of law or otherwise, the ownership or any other rights of GTO in and to the Marks. The Participant shall not apply or assist any third party to apply for or register the Marks or a confusingly similar designation anywhere in the world.

g. GTO grants to the Participant a non-exclusive license to sub-license the use of the Marks designated on Appendix 5-7 to Customers and/or Level Two Participants solely for the purpose of the Customer indicating that the Customer transmits or accepts Digital Transmissions Authenticated through the GTO System, and the Participant shall include in its Customer Agreement the language regarding the protection of the Marks attached hereto as Appendix 5-7.

h. All rights in the Marks not expressly granted herein are reserved to GTO.

Section 6

Fees and Other Payments a. Participants shall pay fees to GTO in connection with the GTO Services as provided for in Appendix 6-1.

b. In the event of a Participant's act or omission of the type specified in Appendix 6-1, the Participant shall pay GTO the amount specified in Appendix 6-1.

c. The fees and other amounts payable by a Participant to GTO are non-refundable in the event the Participant's participation in the GTO System is Suspended or Terminated.

Section 7

Suspension and Termination of Participation a. Participant Suspension.
i. GTO may Suspend a Participant in accordance with Section 7(1) where GTO reasonably determines (i) to address one of the situations described in Section 7(1)(b) more promptly than is permitted for Termination (see Section 7(2)(c)), or (ii) to utilize a remedy or sanction other than Termination (for example, to address one of the situations described in Section 7(1)(b) that is capable of being cured).
ii. GTO may, in accordance with the procedures prescribed in Appendix 3-6(b), Suspend a Participant for a period of time not to exceed one hundred and twenty (120) days if GTO reasonably determines that: (i) the Participant does not comply with a material requirement of these Operating Rules or an agreement provided for in these Operating Rules, including without limitation the requirement to maintain appropriate collateral as required in Section 3(18); (ii) the financial condition of the Participant has become materially impaired such that there is a reasonable likelihood that it will not be able to meet its obligations to GTO, other Participants or Relying Customers under these Operating Rules; (iii) the Suspension is necessary to avoid an immediate and material threat to the safe and sound operation of the GTO System; or (iv) GTO is precluded for any reason from operating, or otherwise determines to discontinue provision of, the GTO System.
iii. GTO may during the period of the Participant's Suspension: (i) prohibit the Suspended Participant from issuing Digital Certificates to its Customers or Level Two Participants; (ii) prohibit the Suspended Participant from approving Identity Warranties for its Subscribing Customers; (iii) prohibit the Suspended Participant from requesting Identity Warranties from other Issuing Participants on behalf of its Relying Customers; (iv) reduce the Suspended Participant's Issuing Participant Warranty Cap; (v) increase the Suspended Participant's collateral requirements; (vi) require the Suspended Participant to cease using its Issuer Certificate for any purpose in connection with the GTO Services; (vii) require the Suspended Participant to provide notice to its Subscribing Customers and/or Level Two Participants of the Suspension and to include in such notice the informational items specified by GTO; (viii) require the Suspended Participant to cause certain or all of its Customers or Level Two Participants to cease using for any purpose in connection with the GTO Services their Digital Certificates that are digitally identified with the Suspended Participant's Issuer Certificate; (ix) pay such amount as specified in Appendix 6-1; and/or (x) require the Suspended Participant to take such other action or refrain from taking such other action as GTO reasonably determines to be appropriate. GTO shall take only those actions that GTO reasonably determines are appropriate to mitigate, remedy or otherwise address the cause(s) or reason(s) for the Participant's Suspension.
iv. GTO shall endeavor to provide written notice to the Participant prior to its Suspension, and shall include in such notice a summary of the cause(s) or reason(s) for the Suspension. In any event, it shall provide such notice to the Participant as promptly as reasonably possible after such Suspension. GTO shall within seven (7) days of the Suspension provide the Suspended Participant the opportunity to petition GTO in accordance with procedures set forth in Appendix 3-6(b) for termination of the Suspension or modification of the conditions of the Suspension.

v. The status of a Participant as Suspended under this Section 7(1) does not negate or otherwise affect any transaction, GTO System Transmission or other communication governed by these Operating Rules and made by the Participant prior to, during or after its Suspension.

b. Participant Termination.

i. A Participant may at any time voluntarily terminate its participation in the GTO System or a GTO Service. A Participant shall provide GTO at least _____ days prior written notice of such termination.

ii. GTO may, in accordance with the procedures prescribed in Appendix 3-6(b), Terminate a Participant's Participant Agreement, its participation in the GTO System and the GTO Services if (i) GTO has previously Suspended the Participant and GTO reasonably determines that any of the cause(s) or reason(s) for the Participant's Suspension have not been remedied or otherwise satisfactorily addressed during the Suspension (ii) the Participant failed to disclose pertinent information or willfully misrepresented information in its application to become a Participant; (iii) the Participant no longer qualifies as an eligible entity, as set forth in Section 2; (iv) the Participant fails to, or refuses to, pay any fees or make any other payments arising under these Operating Rules; or (v) GTO is precluded for any reason from opera~g, or otherwise determines to discontinue provision of, the GTO System.

iii. GTO shall provide the Participant at least thirty (30) days prior written notice of GTO's intention to Terminate the Participant, and shall include in such notice a summary of the reasons for such Termination. During such thirty (30) day period, the Participant may petition GTO in accordance with procedures set forth in Appendix 3-6(b). Upon a decision by GTO to Terminate the Participant, GTO shall provide notice of the Termination to the Participant stating the reasons for and the effective date of the Termination.

iv. A sponsoring Level One Participant may Terminate a sponsored Level Two Participant in the event the Level Two Participant meets any of the criteria for Suspension prescribed in Section 7(1)(b) or for Termination prescribed in Section 7(2)(b). GTO may direct a sponsoring Level One Participant to Terminate a sponsored Level Two Participant if GTO determines in its sole discretion that the Level Two Participant meets any of the criteria for Suspension prescribed in Section 7(1)(b) or for Termination prescribed in Section 7(2)(b), In the event the sponsoring Level One Participant fails to Terminate such sponsored Level Two Participant, GTO may (i) itself Terminate the Level Two Participant in accordance with the procedures prescribed in Appendix 3-6(b), and/or (ii) Suspend or Terminate the Level One Participant.

v. Upon Termination, (i) GTO or the Sponsoring Level One Participant, as the case may be, shall Revoke the Terminated Participant's Issuer Certificate; (ii) the Terminated Participant shall immediately inform its Customers that they shall immediately cease to use for any purpose in connection with the GTO Services their Digital Certificates that are digitally identified with the Terminated Participant's Issuer Certificate and the Terminated Participant shall immediately Revoke all such Digital Certificates; (iii) the Terminated Participant shall obtain from its Customers and destroy as promptly as possible all Smart Cards and GTO Software; (iv) the Terminated Participant shall provide a certification to GTO that it has Revoked all such Digital Certificates, and obtained and destroyed all such Smart Cards and GTO Software; and (v) the Terminated Participant shall immediately cease to use any of the Marks for any purpose.

vi. These Operating Rules shall continue to govern any action or communication, message, GTO System Transmission or other electronic transmission of the Terminated Participant that occurred or was transmitted prior to the Termination. Without limiting the generality of the preceding sentence, Termination does not negate or otherwise affect any transaction or communication, message, GTO System Transmission or other electronic transmission transmitted to or from the Terminated Participant prior to the Termination, including without limitation a Digital Certificate Authenticated by the Terminated Participant prior to its Termination or the Terminated Participant's obligations under these Operating Rules with respect to any approved Identity Warranty included in any Certificate Status/Warranty Response transmitted by the Terminated Participant prior to its Termination. In addition, Sections _____, and _____ shall survive Termination, and shall be binding on the Terminated Participant and GTO.

Section 8

General Provisions a. Amendment to Operating Rules. The Operating Rules may be amended from time to time by a majority vote of the GTO Board of Managers (or successor GTO governing body). Amendments to these Operating Rules shall be published no less than sixty (60) days prior to their stated effective date, unless GTO determines in its sole discretion that conditions necessitate that an amendment become effective more promptly.

b. No Third Party Beneficiaries. These Operating Rules are intended to benefit only the Participants and GTO, and no right shall be granted to any other person, including without limitation any Customer, by virtue of these Operating Rules.

c. Scope; Interpretation of Operating Rules.

i. These Operating Rules set forth the rights and responsibilities of GTO and the Participants that offer the GTO Services to their Customers. These Operating Rules do not apply to any product or service, including any digital certificate or other electronic commerce-related product or service, other than the GTO Services.

ii. In the event of any conflict or inconsistency between Sections 1 through 18 and an Appendix to these Operating Rules, Sections 1 through 18 shall control. In the event of any conflict or inconsistency between two Appendices to these Operating Rules, the later dated provision shall control, In the event of any conflict or inconsistency between these Operating Rules and a Participant Agreement or any other agreement provided for in these Operating Rules, these Operating Rules shall control.

d. Notice Procedures.
 i. Any notice to GTO required under these Operating Rules shall be provided:
  (1) in writing by facsimile or overnight courier to:

_____
  _____
  _____; or
  (2) by electronic message Authenticated through the GTO System.
 ii. Any notice to a Participant required under these Operating Rules shall be provided: (i) in writing by facsimile or overnight courier to the address of the Participant specified in the Participant Agreement; or (ii) by electronic message Authenticated through the GTO System. If a Level Two Participant has not entered into a Participant Agreement pursuant to Section 2(2)(b)(vi), the sponsoring Level One Participant shall notify GTO of the address to be used by GTO for notice to the Level Two Participant, and notice by GTO by email or in writing by facsimile or overnight courier to that address shall constitute notice to that Level Two Participant.
 iii. Either GTO or a Participant (or a sponsoring Level One Participant for its sponsored Level Two Participant) may from time to time change the address or facsimile number for notification purposes, by giving the other prior notice of the new address or facsimile number and the date upon which it will become effective.
 e. Governing Law. These Operating Rules and the Participant Agreements shall be governed and construed in accordance with the law of the state of New York of the United States of America, without regard to conflicts of law.
 f. Severability. Any provision of these Operating Rules that shall be prohibited or unenforceable in any jurisdiction shall, as to such jurisdiction only, be ineffective only to the extent of such prohibition or unenforceability, without invalidating the remaining provisions of these Operating Rules. To the extent permitted by applicable law, GTO and each Participant hereby waives any provision of law that renders any provision of these Operating Rules prohibited or unenforceable.
 g. Waiver. Failure by either GTO or a Participant to exercise or enforce any right under these Operating Rules will not constitute or be deemed a waiver by GTO or that Participant of any of its rights under these Operating Rules. The failure of GTO or a Participant to insist upon strict performance of any term or provision of these Operating Rules shall not be deemed a waiver of any subsequent breach of or nonperformance under these Operating Rules.
 h. Translations of Operating Rules. In the event that these Operating Rules are translated into a language other than English, the English language version of these Operating Rules shall govern.
 i. References. Unless otherwise indicated, any references to a section or an Appendix in these Operating Rules shall be to a section or Appendix of these Operating Rules.

CHAPTER II—DIGITAL IDENTIFICATION SERVICE

Section 9

Description a. The Digital Identification Service provides a Relying Customer with a method of assessing the identity of a Subscribing Customer that transmits a Digital Transmission to the Relying Customer over a computer network, such as the Internet. Issuing Participants issue Identification Certificates to their Subscribing Customers. The Subscribing Customer uses the Identification Certificate and its related Private Key to Authenticate a Digital Transmission. The Relying Customer receiving that Digital Transmission requests its Relying Participant to confirm the status of the Identification Certificate included in that Digital Transmission as a Valid Digital Certificate. The Digital Identification Service also permits the Relying Customer to request an Identity Warranty from the Issuing Participant. The Relying Customer that declines to request an Identity Warranty does so by requesting an Identity Warranty Amount equal to zero. The Relying Participant seeks confirmation of the status of the Identification Certificate and approval of an Identity Warranty (if requested by the Relying Customer) on behalf of the Relying Customer by submitting a Certificate Status/Warranty Request to the Issuing Participant.

b. The Issuing Participant responds to the Relying Participant's Certificate Status/Warranty Request by transmitting a Certificate Status/Warranty Response to the Relying Participant. If the Issuing Participant has approved an Identity Warranty in the Certificate Status/Warranty Response, the Relying Participant then indicates, on behalf of the Relying Customer, the Relying Customer's agreement to the Identity Warranty Amount and the other terms of the Identity Warranty by transmitting to the Issuing Participant and to GTO an IWA Response. Where the Issuing Participant has approved and the Relying Customer has accepted the Identity Warranty Amount, the Issuing Participant will be deemed to have breached its warranty and be obligated to pay the Relying Customer, up to the Identity Warranty Amount, in the event the Subscribing Customer did not in fact Authorize the Digital Transmission and the Relying Customer incurs certain types of losses (specified in Section 10(11)) as a result.

c. Upon receipt of a Certificate Status/Warranty Request from a Relying Participant, the Issuing Participant transmits a Participant Status Request to GTO to request confirmation of the Validity of the Relying Participant's Issuer Certificate. GTO responds to the Issuing Participant's Participant Status Request by transmitting a Participant Status Response to the Issuing Participant and to the Relying Participant. Upon receipt of a Certificate Status/Warranty Response from the Issuing Participant the Relying Participant transmits a Participant Status Request to GTO to request confirmation of the Validity of the Issuing Participant's Issuer Certificate. GTO responds to the Relying Participant's Participant Status Request by transmitting a Participant Status Response to the Relying Participant and to the Issuing Participant.

Section 10

Digital Identification Service

Rights and Responsibilities of an Issuing Participant a. Issuing Participants may issue Identification Certificates and GTO Software in accordance with the requirements of Appendix 3-1(a)/i and Appendix 3-6(b) to their Subscribing Customers for use in connection with the Digital Identification Service. An Issuing Participant shall act as the Certificate Authority in accordance with the requirements of Appendix 3-1(a)/2 for Identification Certificates issued by the Issuing Participant to its Subscribing Customers.

b. An Issuing Participant shall only provide Identification Certificates and GTO Software to those Subscribing Customers that have entered into Customer Agreements with the Issuing Participant. An Issuing Participant shall not use the GTO System to issue Identification Certificates, other than in connection with the Digital Identification Service.

c. An Issuing Participant shall only issue an Identification Certificate including the Public Key of a Subscribing Customer if: (a) the Private Key length and other key characteristics meet the requirements set forth in Appendix 3-1(a)/i; and (b) the Private Key/Public Key Pair of the Subscribing Customer was generated by the Issuing Participant or the Subscribing Customer using the computer software, hardware and other technology specified in Appendix 3-1(a)/i.

d. For each Identification Certificate that an Issuing Participant issues to its Subscribing Customers, the Issuing Participant shall in accordance with the minimum standards set forth in Appendix 2-1(b)(ii): (a) confirm the identity of the Subscribing Customer; (b) confirm the validity of any Subscribing Customer information to be placed in the Identification Certificate; (c) confirm the identity of the individuals and entities that will use the Private Key/Public Key Pair and Identification Certificate on behalf of the Subscribing Customer; and (d) confirm the authority of the individuals and entities authorized to use the Identification Certificate on behalf of the Subscribing Customer.

e. An Issuing Participant shall establish for each Subscribing Customer, or for each Identification Certificate it issues to each Subscribing Customer, a Relationship Warranty Cap, and shall monitor the outstanding Identity Warranty Amounts approved by the Issuing Participant on behalf of each Subscribing Customer or Identification Certificate to ensure that the aggregate Identity Warranty Amounts do not exceed the Relationship Warranty Cap for such Subscribing Customer or Identification Certificate. An Issuing Participant may change the Relationship Warranty Cap for a Subscribing Customer from time to time.

f. Upon receipt of a Certificate Status/Warranty Request from a Relying Participant, the Issuing Participant shall transmit to GTO a Participant Status Request with regard to the Relying Participant according to the timeframes and procedures set forth in Appendix 4-1.

g. If the Issuing Participant has received a Participant Status Response from GTO confirming the Validity of the Issuer Certificate of the Relying Participant, the Issuing Participant shall respond to the Certificate Status/Warranty Request from the Relying Participant by transmitting a Certificate Status/Warranty Response to the Relying Participant within the timeframes and according to the procedures set forth in Appendix 4-1. An Issuing Participant shall transmit a Certificate Status/Warranty Response only in response to a Certificate Status/Warranty Request received from a Relying Participant with a Valid Issuer Certificate. An Issuing Participant shall not transmit a Certificate Status/Warranty Response in response to a Certificate Status/Warranty Request received from any entity or person that is not a Relying Participant with a Valid Issuer Certificate, or in response to a communication, message or electronic transmission that is not a Certificate Status/Warranty Request.

h. In a Certificate Status/Warranty Response, an Issuing Participant shall: (a) confirm the status of the indicated Identification Certificate as a Valid Digital Certificate; or (b) deny the status of such Identification Certificate as a Valid Digital Certificate. In addition, if in the Certificate Status/Warranty Request an Identity Warranty has been requested, the Issuing Participant also shall in the Certificate Status/Warranty Response: (x) approve the requested Identity Warranty by indicating the approved Identity Warranty Amount, the approved effective period for the Identity Warranty not exceeding _____ months, the time period within which the Relying Customer must accept the Identity Warranty via transmission by the Relying Participant of an IWA Response which shall not be less than fifteen (15) minutes nor more than and such other information as required in Appendix 4-1; or (y) deny the requested Identity Warranty. An Issuing Participant that denies a requested Identity Warranty may in the Certificate Status/Warranty Response offer an alternative Identity Warranty than that requested by the Relying Customer (for example, with a different Identity Warranty Amount than that requested by the Relying Customer). The Issuing Participant also shall provide in the Certificate Status/Warranty Response such other information as required in Appendix 4-1.

i. An Issuing Participant shall deny that an Identification Certificate is a Valid Digital Certificate if upon application of its procedures complying with Appendix 3-6(b) it determines the Identification Certificate not to be Valid. An Issuing Participant shall deny the Validity of any Identification Certificate that has Expired or has been Revoked, or if required to do so under the terms of any applicable Suspension. An Issuing Participant shall transmit a reason for the denial in accordance with the codes provided in Appendix 4-1.

j. An Issuing Participant may deny a requested Identity Warranty for any bona fide reason. An Issuing Participant shall not approve a requested Identity Warranty if: (a) the Identity Warranty Amount would cause the Issuing Participant to exceed its Issuing Participant Warranty Cap; or (b) the Identity Warranty Amount would cause the Subscribing Customer to exceed the Relationship Warranty Cap established by the Issuing Participant for that Subscribing Customer. An Issuing Participant shall transmit a reason for the denial in accordance with the codes provided in Appendix 4-1. An Issuing Participant acknowledges and agrees that, in the event that, notwithstanding the requirements of this Section 10(10), it approves an Identity Warranty Amount that would cause it to exceed its Issuing Participant Warranty Cap, GTO may (but shall not be required to) (x) in the Participant Status Response responding to the Participant Status Request related to that Identity Warranty disapprove that Identity Warranty, and (y) Suspend or Terminate the Issuing Participant.

k. In the event the Issuing Participant has with respect to a Digital Transmission confirmed the status of the Identification Certificate as a Valid Digital Certificate and approved the requested Identity Warranty and the Relying Participant has transmitted a timely IWA Response as provided in Section 11(7) indicating the Relying Customer's acceptance of the approved Identity Warranty, but the Subscribing Customer did not Authorize the Digital Transmission, the Issuing Participant shall be deemed to have breached its Identity Warranty and shall accordingly be liable to the Relying Customer for its direct damages up to the Identity Warranty Amount that (a) resulted from the fact that the Subscribing Customer did not Authorize the Digital Transmission, and (b) were incurred by the Relying Customer during the effective period of the Identity Warranty (that is, subsequent to the transmission of the IWA Response or other start time specified in the Certificate Status/Warranty Response and prior to the expiration of the Identity Warranty specified in the Certificate Status/Warranty Response); provided the Relying Customer submits timely notification of its IW Claim, including the related supporting documentation as prescribed in Section 11(8). In no event shall the Issuing Participant be liable to the Relying Customer for any punitive, indirect, incidental, special or consequential damages, regardless of the form of action and regardless of whether the Issuing Participant was advised of the possibility of such damages. In addition, the Issuing Participant shall not be liable to a Relying Customer for any loss or damage incurred by the Relying Customer as a result of its failure to take reasonable steps to mitigate such loss or damage.

l. Within _____ days of the receipt of an IW Claim including the supporting documentation provided for in Section 11(8) from a Relying Participant on behalf of its Relying Customer for payment from the Issuing Participant pursuant to Section 10(11), the Issuing Participant shall advise the Relying Participant in writing of the Issuing Participant's good faith determination whether to honor the IW Claim. If the Issuing Participant has determined to honor the IW Claim in whole or in part, it shall pay the Relying Customer by transmitting funds to the Relying Participant within days of the Relying Participant's receipt of the Issuing Participant's determination. If the Issuing Participant has determined to deny the IW Claim in whole or in part, it also shall provide to the Relying Participant in writing the reason(s) for such denial.

m. In the event the Issuing Participant has approved in a Certificate Status/Warranty Response an Identity Warranty as provided in Section 10(8) and the Relying Customer has accepted such Identity Warranty via the Relying Participant's transmission of an IWA Response as provided in Section 11(7), the Issuing Participant shall be deemed to have entered into an Identity Warranty agreement with the Relying Customer in accordance with the applicable provisions of these Operating Rules and the terms of the Identity Warranty specified in the Certificate Status/Warranty Response and the IWA Response.

Section 11

Digital Identification Service

Rights and Responsibilities of a Relying Participant a. A Relying Participant shall receive requests from its Relying Customers: (a) for confirmation of the status of an Identification Certificate included in a Digital Transmission as a Valid Digital Certificate, and (b) for approval of an Identity Warranty in connection with a Digital Transmission.

b. Upon receipt from a Relying Customer of a request for confirmation of the status of an Identification Certificate, the Relying Participant shall confirm the Validity of the Relying Customer's Digital Certificate in accordance with the procedures set forth in Appendix 3-1(a)/2.

c. The Relying Participant shall transmit a Certificate Status/Warranty Request to the Issuing Participant according to the timeframes and procedures set forth in Appendix 4-1 unless (a) the Relying Customer's Digital Certificate is not Valid, (b) the Relying Customer did not submit its request within the shorter of the time period specified in the Subscribing Customer's Digital Transmission or _____ calendar days from the Relying Customer's receipt of the Digital Transmission from the Subscribing Customer, or (c) the Relying Participant is prohibited under applicable law from transmitting the Certificate Status/Warranty Request. In the event the Relying Participant fails to transmit a Certificate Status/Warranty Request pursuant to this Section 11(3), the Relying Participant shall notify the Relying Customer in accordance with the timeframes, procedures and formats set forth in Appendix 4-1.

d. Upon receipt of a Certificate Status/Warranty Response from an Issuing Participant, the Relying Participant shall transmit to GTO a Participant Status Request with regard to the Issuing Participant according to the timeframes, procedures and formats set forth in Appendix 4-1.

e. The Relying Participant may transmit to the Relying Customer confirmation of the status of an Identification Certificate as a Valid Digital Certificate only if the Relying Participant has received a Certificate Status/Warranty Response from the Issuing Participant confirming the Validity of the Identification Certificate and a Participant Status Response confirming the Validity of the Issuing Participant's Issuer Certificate. The transmission of this confirmation shall be in accordance with the timeframes, procedures and formats set forth in Appendix 4-1.

f. The Relying Participant may only transmit to the Relying Customer confirmation of the approval of an Identity Warranty if the Relying Participant has received a Certificate Status/Warranty Response and a Participant Status Response approving the Identity Warranty. Along with this approval, the Relying Participant shall transmit to the Relying Customer the following information as provided in the Certificate Status/Warranty Response: (a) the approved Identity Warranty Amount; (b) the expiration date of the Identity Warranty; (c) the identity of the Issuing Participant approving the Identity Warranty; (d) the time period by when the Relying Customer must accept or reject the Identity Warranty; (e) the fee that would be charged the Relying Customer for the issuance of the Identity Warranty, unless otherwise specified to the Relying Customer; and (f) any other limitation on the Identity Warranty prescribed in the Certificate Status/Warranty Response. The transmission of this confirmation shall be in accordance with the timeframes, procedures and formats set forth in Appendix 4-1.

g. The Relying Participant shall obtain from its Relying Customer either an acceptance or a rejection of the Identity Warranty approved by the Issuing Participant in the Certificate Status/Warranty Response within the time period specified by the Relying Participant. If the Relying Customer does not respond within the applicable time period, the Relying Customer shall be deemed to have rejected the Identity Warranty. The Relying Participant shall convey the Relying Customer's acceptance or rejection of the Identity Warranty by transmitting an IWA Response to GTO and to the Issuing Participant within the lesser of _____ or the time period specified by the Issuing Participant in the Certificate Status/Warranty Response and according to the procedures and formats set forth in Appendix 4-1.

h. Provided the Relying Customer has notified the Relying Participant of the Relying Customer's IW Claim against the Issuing Participant within the effective period of the Identity Warranty provided for in Section 10(8) and has provided the Relying Participant complete documentation supporting the IW Claim as specified in Appendix 11-8 within—days of such notice, the Relying Participant shall within _____ days of its receipt of such supporting documentation transmit to the Issuing Participant the Relying Customer's IW Claim including the supporting documentation. By the end of each day, the Relying Participant shall transmit to OTO a report describing any IW Claims transmitted by the Relying Participant to an Issuing Participant during that day, which shall include the name of the Issuing Participant against which the IW Claim was filed, the name of the Relying Customer filing the IW Claim, the amount of the IW Claim and such other information as prescribed in Appendix 11-8. The transmission of this report shall be in accordance with the timeframes, procedures and formats set forth in Appendix 4-1.

i. Upon receipt of a response from the Issuing Participant to an IW Claim as provided in Section 10(12), the Relying Participant shall within days provide to the Relying Customer the Issuing Participant's response, including any accompanying documentation received by the Relying Participant from the Issuing Participant. To the extent the Relying Participant has not previously credited or otherwise paid the Relying Customer for the amount of the IW Claim, the Relying Participant shall credit or otherwise remit any payment received from the Issuing Participant to the Relying Customer in accordance with the Relying Participant's usual business procedures. By the end of each day, the Relying Participant shall transmit to GTO a report describing any IW Claims previously transmitted by the Relying Participant to an Issuing Participant that were finally resolved during that day, which shall include the name of the Issuing Participant against which the IW Claim was filed, the name of the Relying Customer filing the IW Claim, a description of the final resolution and such other information as prescribed in Appendix 11-8. The transmission of this report shall be in accordance with the timeframes, procedures and formats set forth in Appendix 4-1.

j. To the extent the Relying Participant has credited or otherwise paid the Relying Customer for an IW Claim prior to receipt by the Relying Participant of payment from the Issuing Participant, the Relying Participant assumes all of the rights of the Relying Customer with respect to such payment and IW Claim, including without limitation the rights of the Relying Customer to payment by the Issuing Participant pursuant to Section 10(11) and to collateral maintained by the Issuing Participant pursuant to Section 3(18).

Section 12

Digital Identification Service

Rights and Responsibilities of GTO a. GTO shall assign an Issuing Participant Warranty Cap for each Participant. GTO shall monitor the Identity Warranty Amounts approved by the Participant for its Subscribing Customers in accordance with the procedures and timeframes prescribed in Appendix 12-1(e), but shall have no obligation to monitor Identity Warranties and Issuing Participant Warranty Caps on a real-time basis.

b. Upon receipt of a Participant Status Request from an Issuing Participant, GTO shall confirm whether the Issuer Certificate of the Relying Participant is Valid. GTO shall transmit to the Issuing Participant and the Relying Participant the Participant Status Response according to the timeframes and procedures set forth in Appendix 4-1.

c. Upon receipt of a Participant Status Request from a Relying Participant, GTO shall (a) confirm whether the Issuer Certificate of the Issuing Participant is Valid, and (b) in the event the Issuing Participant has approved in its Certificate Status/Warranty Response an Identity Warranty, GTO shall confirm whether the Identity Warranty Amount would result in the Issuing Participant exceeding its Issuing Participant Warranty Cap as such cap is monitored by GTO as provided in Section 12(1). In the event an Identity Warranty Amount approved by an Issuing Participant would cause a Participant to exceed its Issuing Participant Warranty Cap as such cap is monitored by GTO as provided in Section 12(1), GTO shall disapprove the Identity Warranty in the Participant Status Response. GTO shall transmit to the Relying Participant and the Issuing Participant the Participant Status Response according to the timeframes and procedures set forth in Appendix 4-1.

Section 13

Digital Identification Service

Customer Agreement a. General. A Subscribing Customer may use its Private Key, the related Identification Certificate and the GTO Software to place the Subscribing Customer's Digital Signature on a Digital Transmission transmitted by the Subscribing Customer to a Relying Customer. A Subscribing Customer may authorize any person or entity to utilize its Private Key, the related Identification Certificate and the GTO Software on behalf of the Subscribing Customer, and all acts or omissions of such person or entity with respect to such Private Key, the related Identification Certificate and the GTO Software shall for all purposes of these Operating Rules be deemed to be acts or omissions of the Subscribing Customer. The Relying Customer may request from its Relying Participant confirmation of the status of the Identification Certificate as a Valid Digital Certificate and approval of an Identity Warranty relating to the Digital Transmission.

b. Subscribing Customer Agreement. An Issuing Participant shall enter into an agreement for the Digital Identification Service with each Subscribing Customer that provides, at a minimum, for the following:

i. the Subscribing Customer's obligation to safekeep its Private Key(s), Smart Card(s) and the GTO Software in accordance with the minimum standards prescribed in Appendix 3-1 (a)/l;

ii. the Subscribing Customer's acknowledgment of the Issuing Participant's and/or GTO's ownership of all Identification Certificates, the GTO Software, Smart Card(s), and the Marks;

iii. the Subscribing Customer's acknowledgment of, and agreement to, the policies and procedures established by the Issuing Participant relating to the Issuing Participant's issuance, Expiration and Revocation of Identification Certificates issued to the Subscribing Customer as part of the GTO Services;

iv. the Subscribing Customer's agreement that it will not use its Private Key, Identification Certificate, Smart Card or the Digital Identification Service in connection with a Digital Transmission involving any of the following types of transactions: (i) any transaction prohibited by applicable law; or (ii) any transaction for which the Subscribing Customer is not acting either as principal or as agent for a principal that has been disclosed to the Issuing Participant;

v. the Subscribing Customer's agreement that all Digital Transmissions Authenticated with a Digital Signature created with the Subscribing Customer's. Private Key shall have the same legal effect, validity and enforceability as if the Digital Transmission had been in writing signed by the Subscribing Customer, and that the Subscribing Customer will not challenge the legal effect, validity or enforceability of the Digital Transmission solely because it is in digital rather than written form;

vi. the Subscribing Customer's responsibility for all Digital Transmissions Authenticated with a Digital Signature created with the Subscribing Customer's Private Key for which the Identification Certificate is confirmed as a Valid Digital Certificate through the Digital Identification Service, including without limitation Digital Signatures created by persons or entities authorized by the Subscribing Customer to act on behalf of the Subscribing Customer in this regard;

vii. the Subscribing Customer's agreement that its only recourse in connection with the Digital Identification Service, the GTO Services or the GTO System is to its Issuing Participant pursuant to the Customer Agreement; and that the Subscribing Customer expressly recognizes and agrees that it has no recourse in this regard to GTO or another Participant (although the Subscribing Customer acknowledges that it may have recourse or liability to the Relying Customer under applicable law);

viii. the Subscribing Customer's acknowledgment and authorization that its Issuing Participant, other Participants, GTO, and their employees and agents may within the limits of applicable law transmit and receive any data or information about, regarding or involving the Subscribing Customer among and between themselves and other third parties: (i) to provide the Digital Identification Service to the Subscribing Customer; (ii) to resolve any dispute arising from the Digital Identification Service; or (iii) pursuant to applicable law, regulation, order, subpoena or other legal requirement of a government authority;

ix. the Subscribing Customer's warranty of the accuracy of any information submitted to its Issuing Participant in connection with a request for an Identification Certificate, confirmation of the Identification Certificate as a Valid Digital Certificate and/or approval of an Identity Warranty;

x. the Subscribing Customer's obligation to provide timely and accurate notice to the Issuing Participant of information relating to (i) the ongoing Validity and/or accuracy of its Private Key/Public Key Pair(s) and/or Identification Certificate(s), or (ii) any compromise or suspected compromise of the security of its computer systems or Smart Card(s) on which the Subscribing Customer's Private Key is stored;

xi. the Subscribing Customer's obligation to use the Digital Identification Service, its Private Key/Public Key Pair(s), Smart Cards, and its Identification Certificate(s) in accordance with its Customer Agreement with its Issuing Participant and any instructions, manuals or procedures provided to the Subscribing Customer by its Issuing Participant;

xii. the Subscribing Customer's obligation to obtain written consent from each person or entity authorized to use a Digital Certificate on behalf of the Subscribing Customer or named in such a Digital Certificate that information about their identity and authority may be transferred to other Participants and GTO for the purpose of providing the GTO Services or otherwise carrying out the goals of the GTO System;

xiii. the Subscribing Customer's indemnification of the Issuing Participant for any liability incurred by the Issuing Participant resulting from the Subscribing Customer's failure to comply with the terms of the GTO Services, or from the Subscribing Customer's use of its Digital Certificates on Digital Transmissions or any other electronic messages or communications sent to persons or entities that are not Relying Customers of a Participant in the GTO System;

xiv. the Issuing Participant's grant to the Subscribing Customer of a sub-license to use the Marks designated on Appendix 5-7 solely for the purpose of indicating that the Subscribing Customer transmits Digital Transmissions Authenticated through the GTO System; and xv. the Subscribing Customer's agreement that all hardware and software (other than hardware and software provided by the Issuing Participant) used by the Subscribing Customer in connection with the GTO System or the GTO Services shall be Year 2000-Compliant.

c. Relying Customer Agreement. A Relying Participant shall enter into an agreement for the Digital Identification Service with each Relying Customer that provides, at a minimum, for the following:

i. the Relying Customer's obligation to safekeep the GTO Software in accordance with the minimum standards prescribed in Appendix 3-9 of these Operating Rules;

ii. the Relying Customer's acknowledgment of GTO's ownership of the GTO Software and the Marks;

iii. the Relying Customer's agreement to request an Identity Warranty Amount for a Digital Transmission, if it chooses to do so, that does not exceed a reasonable approximation of the anticipated direct damages which it would incur in the event the Subscribing Customer did not in fact Authorize the Digital Transmission; and to request an effective period for the Identity Warranty that is reasonable in light of the underlying transaction between the Subscribing Customer and the Relying Customer to which the Digital Signature relates;

iv. the Relying Customer's acknowledgment and agreement that any requested Identity Warranty may not be approved, may not be approved for the Identity Warranty Amount requested, or may be subject to a different effective period than requested by the Relying Customer;

v. the Relying Customer's obligation to submit a request for an Identity Warranty to its Relying Participant, if it chooses to do so, within the shorter of the time specified in the related Digital Transmission received from the Subscribing Customer or—days of receipt of such Digital Transmission;

vi. the Relying Customer's acknowledgment and agreement that, in the event the Issuing Participant has approved in a Certificate Status/Warranty Response an Identity Warranty and the Relying Customer has accepted such Identity Warranty via the Relying Participant's transmission of an IWA Response, the Relying Customer shall be deemed to have entered into an Identity Warranty agreement with the Issuing Participant in accordance with the applicable provisions of its Customer Agreement with its Relying Participant and the terms of the Identity Warranty specified in the Certificate Status/Warranty Response and the IWA Response.

vii. the Relying Customer's agreement that (i) its only recourse in connection with the Digital Identification Service is to the Issuing Participant that issued the Identification Certificate and for which the Relying Participant has transmitted to the Relying Customer confirmation of the Issuing Participant's approval of an Identity Warranty which the Relying Customer has accepted via an IWA Response transmitted by the Relying Participant to the Issuing Participant, and to the Relying Participant to and only to the extent provided for in the Relying Participant's Customer Agreement; (ii) the Issuing Participant's liability to the Relying Customer is limited to the Relying Customer's direct damages (specifically excluding punitive, indirect, incidental, special or consequential damages and damages incurred by the Relying Customer as a result of its failure to take reasonable steps to mitigate its damages) up to the approved Identity Warranty Amount and only those direct damages arising during the effective period of the Identity Warranty (that is, subsequent to the transmission of the IWA Response or other start time specified in the Certificate Status/Warranty Response and prior to the expiration of the Identity Warranty specified in the Certificate Status/Warranty Response) that resulted from the fact that the Subscribing Customer did not Authorize the Digital Transmission; (iii) the Relying Customer's sole means to file its IW Claim against the Issuing Participant is through its Relying Participant; (iv) the Relying Participant's obligation to the Relying Customer is limited to remitting to the Relying Customer any recovery the Relying Participant receives from the Issuing Participant pursuant to these Operating Rules to the extent it has not previously credited or otherwise paid the Relying Customer for such recovery, unless the Relying Participant in its Customer Agreement has assumed other obligations to the Relying Customer; and (v) the Relying Customer expressly recognizes and agrees that it has no recourse in connection with the Digital Identification Service to GTO or a Participant other than the Issuing Participant or Relying Participant, and that its recourse to the Issuing Participant and Relying Participant is limited to that expressly provided for in this Section 13(3)(g) (although the Relying Customer acknowledges that it may have recourse or liability to the Subscribing Customer under applicable law);

viii. the Relying Customer may file an IW Claim as provided in Section 13(3)(g) of these Operating Rules through its Relying Participant against an Issuing Participant that has approved an Identity Warranty only if: (i) the Relying Customer provides notice of its IW Claim to the Relying Participant within the effective period of the Identity Warranty specified in the Certificate Status/Warranty Response; (ii) the Relying Customer within—days of such notice provides to the Relying Participant (A) written documentation, if reasonably available, from the Subscribing Customer denying that it Authorized the Digital Transmission to the Relying Customer, and (B) an affidavit certified by a duly authorized person on behalf of the Relying Customer, with complete and detailed accompanying supporting documentation, certifying the amount of the Relying Customer's direct damages that resulted from the fact that the Subscribing Customer did not Authorize the Digital Transmission; and (iii) the notice and supporting documentation are in accordance with the format and information requirements prescribed in Appendix 11-8 to these Operating Rules (this provision does not affect any right or claim that a Relying Customer may have against the Subscribing Customer arising from the Digital Transmission under applicable law);

ix. the Relying Customer may not file any IW Claim as provided in Section 13(3)(g) of these Operating Rules through its Relying Participant against the Issuing Participant unless it does so in accordance with each of the requirements of Section 13(3)(h) of these Operating Rules. Without limiting the generality of the preceding sentence, the Relying Customer may not make any such claim if it fails to provide the notice or supporting documentation required under Section 13(3)(h) of these Operating Rules within the timeframe prescribed in Section 13(3)(h) of these Operating Rules, or if the Relying Customer's loss or claim resulted from: (i) the Subscribing Customer's failure to perform or meet its obligations contained in or related to the Digital Transmission for any reason other than the fact that the Subscribing Customer did not Authorize the Digital Transmission; (ii) any error in the text or other data in the Digital Transmission, regardless of the cause of the error; or (iii) a claim arising from or related to the Subscribing Customer's delayed, incomplete or unacceptable performance of its obligations as set forth in or related to the Digital Transmission;

x. the Relying Customer's agreement to resolve in accordance with the procedures prescribed in Appendix 3-20 and Appendix 11-8 of these Operating Rules any dispute with an Issuing Participant in the event the Relying Customer's IW Claim against the Issuing Participant is not resolved to its satisfaction within _____ days;

xi. the Relying Customer's acknowledgment and agreement that pursuant to a security agreement between GTO and each Issuing Participant (i) each Issuing Participant is required to provide collateral as security for the Issuing Participant's obligation to satisfy a Certified IW Claim not otherwise satisfied by the Issuing Participant, (ii) such collateral is required to be deposited in an account maintained by a commercial bank as Collateral Agent for GTO, acting for the benefit of the Relying Customer (or for the benefit of the Relying Participant to the extent the Relying Participant previously has credited or otherwise paid the Relying Customer for the IW Claim), (iii) the amount of collateral required to be deposited and the time at which such deposit is required in relation to the issuance of an Identity Warranty or the filing of an IW Claim depends upon the financial condition of the Issuing Participant and other factors, as determined by GTO, (iv) the amount realized on such collateral may be less than the amount of the Issuing Participant's liability to the Relying Customer provided for in Section 13(3)(g), and (v) in the event the amount realized on such collateral is less than the amount of such Issuing Participant's liability, the Issuing Participant shall remain solely liable for such deficiency;

xii. the Relying Customer's confirmation of the appointment of GTO as its agent under each security agreement described in Section 13(3)(k) entered into for the Relying Customer's benefit as a Relying Customer irrevocably authorizing GTO, in such capacity, to take any and all action permitted under such security agreement with respect to such collateral, including without limitation, action to effect the sale or redemption of such collateral and transfer of the proceeds thereof to the Relying Customer or the Relying Participant, for application to the obligation of the Issuing Participant to the Relying Customer provided for in Section 13(3)(g) (or for application to the obligation of the Issuing Participant to the Relying Participant to the extent the Relying Participant previously has credited or otherwise paid the Relying Customer for the IW Claim), in such order and manner and with such priority among Relying Customers, as instructed by GTO;

xiii. the Relying Customer's agreement that the obligations of GTO under or in connection with the security agreements described in Section 13(3)(k) are only those expressly set forth in those security agreements and that neither GTO nor any of its officers, employees or agents shall be liable for any action taken or omitted to be taken by it or them under or in connection with such security agreements;

xiv. the Relying Customer's irrevocable appointment of the Relying Participant as its agent (i) to file on behalf of the Relying Customer any IW Claim asserted by the Relying Customer in accordance with Section 13(3)(h), and (ii) to receive on behalf of the Relying Customer the proceeds of any collateral securing the obligation of an Issuing Participant with respect to a Certified IW Claim. Except as otherwise provided herein, any such proceeds received shall be credited or otherwise remitted to the Relying Customer in accordance with the Relying Participant's usual business procedures, except to the extent the Relying Participant previously has credited or otherwise paid the Relying Customer for the IW Claim;

xv. the Relying Customer's acknowledgment and authorization that the Relying Participant, other Participants, GTO and their employees and agents may within the limits of applicable law transmit and receive any data or information about, regarding or involving the Relying Customer among and between themselves and other third parties: (i) to provide the Digital Identification Service to the Relying Customer; (ii) to resolve any dispute arising from the Digital Identification Service; or (iii) pursuant to applicable law, regulation, order, subpoena or other legal requirement of a government authority;

xvi. the Relying Customer's warranty of the accuracy of any information submitted to its Relying Participant in connection with the Digital Identification Service;

xvii. the Relying Customer's obligation to use the Digital Identification Service in accordance with its agreement with its Relying Participant and any instructions, manuals or procedures provided to the Relying Customer by its Relying Participant;

xviii. the Relying Customer's agreement that all Digital Transmissions Authenticated with a Digital Signature created with the Subscribing Customer's Private Key shall have the same legal effect, validity and enforceability as if the Digital Transmission had been in writing signed by the Subscribing Customer, and that the Relying Customer will not challenge the legal effect, validity or enforceability of the Digital Transmission solely because it is in digital rather than written form;

xix. the Relying Participant's grant to the Relying Customer of a sub-license to use the Marks designated on Appendix 5-7 of these Operating Rules solely for the purpose of indicating that the Relying Customer receives Digital Transmissions Authenticated through the GTO System; and xx. the Relying Customer's agreement that all hardware and software (other than hardware and software provided by the Relying Participant) used by the Relying Customer in connection with the GTO System or the GTO Services shall be Year 2000-Compliant.

d. Customer Both Subscribing Customer and Relying Customer. For a Customer that is or may be both a Subscribing Customer and a Relying Customer, the Participant may include the provisions required in Section 13(2) and Section 13(3) in the same agreement.

e. Sample Customer Agreement Provisions. Sample Customer Agreement provisions are attached to these Operating Rules at Appendix 13-5. A Participant may, but is not required to, use these sample provisions. GTO makes no representation that any of these sample provisions satisfies any or all requirements of these Operating Rules or any law applicable to the Participant, or that any of these provisions would be binding on any Customer. Participant should obtain its own legal advice regarding the terms and conditions of its Customer Agreements.

CHAPTER III—UTILITY KEY SERVICE

Section 14

Description a. An Issuing Participant provides the Utility Key Service to its Subscribing Customer by issuing Utility Certificate(s) to its Subscribing Customer. A Subscribing Customer uses a Utility Certificate in connection with an electronic message transmitted to a Relying Customer.

b. The Utility Key Service provides a Relying Customer with a method of confirming the status of a Digital Certificate associated with an electronic message transmitted by the Subscribing Customer to the Relying Customer.

c. The Utility Key Service does not permit a Relying Participant to request from the Issuing Participant an Identity Warranty.

Section 15

Utility Key Service

Rights and Responsibilities of an Issuing Participant a. Issuing Participants may issue Utility Certificates and the GTO Software in accordance with the requirements of Appendix 3-1(a)/1 and 3-6(b) to their Subscribing Customers for use in connection with the Utility Key Service. An Issuing Participant shall act as the Certificate Authority in accordance with the requirements of Appendix 3-1(a)/2 for Utility Certificates issued by the Issuing Participant to its Subscribing Customers.

b. Issuing Participants shall only provide Utility Certificates and GTO Software to those Subscribing Customers that have entered into a Customer Agreement with the Issuing Participant. An Issuing Participant shall not use the GTO System to issue Utility Certificates, other than in connection with the Utility Key Service.

c. For each Utility Certificate that an Issuing Participant issues to its Subscribing Customers, the Issuing Participant shall in accordance with the minimum standards set forth in Appendix 2-1(b)(ii): (a) confirm the identity of the Customer; (b) confirm the identity of the individuals and entities that will use the Private Key/Public Key Pair and Utility Certificate on behalf of the Subscribing Customer; and (c) confirm the authority of the individuals and entities authorized to use the Utility Certificate on behalf of the Subscribing Customer, including with regard to the types and amounts of transactions to which the authorization relates.

d. Upon receipt of a Validity Request from a Relying Participant, the Issuing Participant shall transmit to GTO a Participant Status Request with regard to the Relying Participant according to the timeframes and procedures set forth in Appendix 4-1.

e. If the Issuing Participant has received a Participant Status Response from GTO confirming the Validity of the Issuer Certificate of the Relying Participant, the Issuing Participant shall respond to the Validity Request from the Relying Participant by transmitting a Validity Response to the Relying Participant within the timeframes and according to the procedures set forth in Appendix 4-1. An Issuing Participant shall transmit a Validity Response only in response to a Validity Request received from a Relying Participant with a Valid Issuer Certificate. An Issuing Participant shall not transmit a Validity Response in response to a Validity Request received from any entity or person that is not a Relying Participant with a Valid Issuer Certificate, or in response to a communication, message or electronic transmission that is not a Validity Request.

f. In a Validity Response, an Issuing Participant shall: (a) confirm the status of the indicated Utility Certificate as a Valid Digital Certificate and provide such other information as required in Appendix 4-1 or (b) deny the status of the indicated Utility Certificate as a Valid Digital Certificate and provide such other information as required in Appendix 4-1.

g. An Issuing Participant shall deny that a Utility Certificate is a Valid Digital Certificate if upon application of its procedures complying with Appendix 3-6(b) it determines the Utility Certificate not to be Valid. An Issuing Participant shall deny the Validity of any Utility Certificate that has Expired or has been Revoked, or if required to do so under the terms of any applicable Suspension. An Issuing Participant shall transmit the reason for the denial in accordance with the codes provided in Appendix 4-1.

h. An Issuing Participant that transmits a Validity Response shall have no liability to the Relying Customer. Without limiting the generality of the preceding sentence, in the event the Issuing Participant has transmitted a Validity Response confirming that a Utility Certificate is Valid but in fact that Utility Certificate has Expired or has been Revoked, or otherwise is not Valid, the Issuing Participant shall have no liability to the Relying Customer or any other Participant.

Section 16

Utility Key Service

Rights and Responsibilities of a Relying Participant a. A Relying Participant shall receive requests from its Relying Customers for confirmation of the status of a Utility Certificate included in an electronic transmission as a Valid Digital Certificate.

b. Upon receipt from a Relying Customer of a request for confirmation of the status of a Utility Certificate, the Relying Participant shall transmit a Validity Request to the Issuing Participant according to the timeframes and procedures set forth in Appendix 4-1 unless (a) the Relying Customer did not submit its request within the shorter of the time period specified in the Subscribing Customer's electronic message or calendar days from the Relying Customer's receipt of the electronic message from the Subscribing Customer, or (b) the Relying Participant is prohibited under applicable law from transmitting the Validity Request. The transmission of the Relying Participant's failure to transmit the Validity Request pursuant to this Section 16(2) shall be in accordance with the timeframes, procedures and formats set forth in Appendix 4-1.

c. Upon receipt of a Validity Response from an Issuing Participant, the Relying Participant shall transmit to GTO a Participant Status Request with regard to the Issuing Participant according to the timeframes and procedures set forth in Appendix 4-1.

d. The Relying Participant may transmit to the Relying Customer confirmation of the status of a Utility Certificate as a Valid Digital Certificate only if the Relying Participant has received a Validity Response from the Issuing Participant confirming the Validity of the Utility Certificate and a Participant Status Response confirming the Validity of the related Issuer Certificate. The transmission of this confirmation shall be in accordance with the timeframes, procedures and formats set forth in Appendix 4-1.

Section 17

Utility Key Service

Rights and Responsibilities of GTO a. Upon receipt of a Participant Status Request from an Issuing Participant, GTO shall confirm whether the Issuer Certificate of the Relying Participant is Valid. GTO shall transmit to the Issuing Participant and the Relying Participant the Participant Status Response according to the timeframes and procedures set forth in Appendix 4-1.

b. Upon receipt of a Participant Status Request from a Relying Participant, GTO shall confirm whether the Issuer Certificate of the Issuing Participant is Valid. GTO shall transmit to the Relying Participant and the Issuing Participant the Participant Status Response according to the timeframes and procedures set forth in Appendix 4-1.

Section 18

Utility Key Service

Customer Agreement a. General. A Subscribing Customer may use its Private Key, the related Utility Certificate and the GTO Software in connection with an electronic message transmitted to a Relying Customer. A Subscribing Customer may authorize any person or entity to utilize its Private Key, the related Identification Certificate and the GTO Software on behalf of the Subscribing Customer, and all acts or omissions of such persons or entities with respect to such Private Key, related Utility Certificate and the GTO Software shall for all purposes of these Operating Rules be deemed to be acts or omissions of the Subscribing Customer. The Relying Customer may request from its Relying Participant confirmation of the status of the Utility Certificate as a Valid Digital Certificate.

b. Subscribing Customer Agreement. An Issuing Participant shall enter into an agreement for the Utility Key Service with each Subscribing Customer that provides, at a minimum, for the following:

i. the Subscribing Customer's obligation to safekeep its Private Key(s), Smart Card(s) and the GTO Software in accordance with the minimum standards prescribed in Appendix 3-1(a)/I;

ii. the Subscribing Customer's acknowledgment of the Issuing Participant's and/or GTO's ownership of all Utility Certificates, the GTO Software, Smart Card(s) and the Marks;

iii. the Subscribing Customer's acknowledgment of, and agreement to, the policies and procedures established by the Issuing Participant relating to the Issuing Participant's issuance, Expiration and Revocation of Utility Certificates issued to the Subscribing Customer as part of the GTO Services;

iv. the Subscribing Customer's agreement that it will not use its Private Key, Utility Certificate, Smart Card or the Utility Key Service in connection with any of the following types of transactions: (i) any transaction prohibited by applicable law; or (ii) any transaction for which the Subscribing Customer is not acting either as principal or as agent for a principal that has been disclosed to the Issuing Participant;

v. the Subscribing Customer's sole responsibility for any use of the Subscribing Customer's Private Key and the related Utility Certificate, including without limitation for use by persons or entities authorized by the Subscribing Customer to act on behalf of the Subscribing Customer in this regard;

vi. the Subscribing Customer's agreement that its only recourse in connection with the Utility Key Service, the GTO Services or the GTO System is to its Issuing Participant pursuant to the Customer Agreement; and that the Subscribing Customer expressly recognizes and agrees that it has no recourse in this regard to GTO or another Participant (although the Subscribing Customer acknowledges that it may have recourse or liability to the Relying Customer under applicable law);

vii. the Subscribing Customer's acknowledgment and authorization that its Issuing Participant, other Participants, GTO and their employees and agents may within the limits of applicable law transmit and receive any data or information about, regarding or involving the Subscribing Customer among and between themselves and other third parties: (i) to provide the Utility Key Service to the Subscribing Customer; (ii) to resolve any dispute arising from the Utility Key Service; or (iii) pursuant to applicable law, regulation, order, subpoena or other legal requirement of a government authority;

viii. the Subscribing Customer's warranty of the accuracy of any information submitted to its Issuing Participant in connection with a request for a Utility Certificate and/or confirmation of the Utility Certificate as a Valid Digital Certificate;

ix. the Subscribing Customer's obligation to provide timely and accurate notice to the Issuing Participant of information relating to (i) the ongoing Validity and/or accuracy of its Private Key/Public Key Pair(s) and/or Utility Certificate(s), or (ii) any compromise or suspected compromise of the security of its computer systems or Smart Card(s) on which the Subscribing Customer's Private Key is stored;

x. the Subscribing Customer's obligation to use the Utility Key Service, its Private Key/Public Key Pair(s), Smart Cards, and its Utility Certificate(s) in accordance with its Customer Agreement with its Issuing Participant and any instructions, manuals or procedures provided to the Subscribing Customer by its Issuing Participant;

xi. the Subscribing Customer's obligation to obtain written consent from each person or entity authorized to use a Utility Certificate on behalf of the Subscribing Customer or named in such a Utility Certificate that information about their identity and authority may be transferred to other Participants and GTO for the purpose of providing the GTO Services or otherwise carrying out the goals of the GTO System;

xii. the Subscribing Customer's indemnification of the Issuing Participant for any liability incurred by the Issuing Participant resulting from the Subscribing Customer's failure to comply with the terms of the GTO Services, or from the Subscribing Customer's use of its Utility Certificates on any electronic messages or communications sent to persons or entities that are not Relying Customers of a Participant in the GTO System;

xiii. the Issuing Participant's grant to the Subscribing Customer of a sub-license to use the Marks designated on Appendix 5-7 of these Operating Rules solely for the purpose of indicating that the Subscribing Customer transmits electronic messages Authenticated through the GTO System; and xiv. the Subscribing Customer's agreement that all hardware and software (other than hardware and software provided by the Issuing Participant) used by the Subscribing Customer in connection with the GTO System or the GTO Services shall be Year 2000-Compliant.

c. Relying Customer Agreement. A Relying Participant shall enter into an agreement for the Utility Key Service with each Relying Customer that provides, at a minimum, for the following:

i. the Relying Customer's obligation to safekeep any GTO Software it receives from the Relying Participant in accordance with the minimum standards prescribed in Appendix 3-9 of these Operating Rules;

ii. the Relying Customer's acknowledgment of GTO's ownership of the GTO Software and the Marks;

iii. the Relying Customer's agreement that its only recourse in connection with the Utility Key Service is to its Relying Participant to and only to the extent provided for in the Relying Participant's Customer Agreement and that the Relying Customer expressly recognizes and agrees that it has no recourse in connection with the Utility Key Service to GTO or a Participant other than the Relying Participant, and that its recourse to the Relying Participant is limited to that expressly provided for in this Section 18(3)(c) (although the Relying Customer acknowledges that it may have recourse or liability to the Subscribing Customer under applicable law);

iv. the Relying Customer's acknowledgment and authorization that the Relying Participant, other Participants, GTO and their employees and agents may within the limits of applicable law transmit and receive any data or information about, regarding or involving the Relying Customer among and between themselves and other third parties: (i) to provide the Utility Key Service to the Relying Customer; (ii) to resolve any dispute arising from the Utility Key Service; or (iii) pursuant to applicable law, regulation, order, subpoena or other legal requirement of a government authority;

v. the Relying Customer's warranty of the accuracy of any information submitted to its Relying Participant in connection with the Utility Key Service;

vi. the Relying Customer's obligation to use the Utility Key Service in accordance with its agreement with its Relying Participant and any instructions, manuals or procedures provided to the Relying Customer by its Relying Participant;

vii. the Relying Participant's grant to the Relying Customer of a sub-license to use the Marks designated on Appendix 5-7 of these Operating Rules solely for the purpose of indicating that the Relying Customer receives electronic messages Authenticated through the GTO System; and viii. the Relying Customer's agreement that all hardware and software (other than hardware and software provided by the Relying Participant) used by the Relying Customer in connection with the GTO System or the GTO Services shall be Year 2000-compliant.

d. Customer Both Subscribing Customer and Relying Customer. For a Customer that is or may be both a Subscribing Customer and a Relying Customer, the Participant may include the provisions required in Section 18(2) and Section 18(3) in the same agreement.

e. Sample Customer Agreement Provisions. Sample Customer Agreement provisions are attached to these Operating Rules at Appendix 13-5. A Participant may, but is not required to, use these sample provisions. GTO makes no representation that any of these sample provisions satisfies any or all requirements of these Operating Rules or any law applicable to the Participant, or that any of these provisions would be binding on any Customer. Participant should obtain its own legal advice regarding the terms and conditions of its Customer Agreements.

APPENDICES

Appendix 1: GTO Digital Certificate Profiles
1. Issuer Certificate
2. Identification Certificate
3. Utility Certificate
4. Relying Participant/Relying Customer Electronic Transmissions
Appendix 2-1(b)(ii): Minimum "Know Your Customer" Requirements
Appendix 2-1(b)(v)(A): Participant Agreement
1. Sample Level One Participant Agreement
2. Sample Level Two Participant Agreement
Appendix 2-1(b)(v)(B): GTO Software License
Appendix 2-1(b)(v)(C): Collateral Requirements
1. Collateral Standards
2. GTO Security Agreement
Appendix 2-1(b)(v)(D): Eligibility
1. Level One Participant Verification
2. Level Two Participant Verification
Appendix 2-2(b)(v): Form Of Level One Participant/Level Two Participant Agreement
Appendix 3-1(a)/1: Technical Specifications
1. Key Pair Generation
2. Key Management (i.e. HW signing)
3. Digital Certificate Management
4. Key Changeover
5. Key Compromise
6. Certificate Distribution/Smartcard Distribution
7. Record Retention
Appendix 3-1(a)/2: Compliance Specifications
1. Compliance Specifications
2. Hardware Security Module Compliance Specification
3. Smartcard Compliance Specification
Appendix 3-2: Operational and Security Controls
1. Physical, Procedural and Personnel Controls
2. Computer Security Controls
3. Contingency Planning/Disaster Recovery
Appendix 3-6(b): Operating Procedures and Formats
Appendix 3-9: Model Customer/Level Two Participant License
Appendix 3-15: Third Party Processor Agreement
Appendix 3-20: Dispute Resolution Procedures
Appendix 4-1: Information Requirements, Protocols And Formats
1. Validity Request
2. Validity Response
3. Participant Status Request
4. Participant Status Response
5. Certificate Status/Warranty Request
6. Certificate Status/Warranty Response
7. IWA Response
8. Relying Participant Report of Filed IW claims
9. Relying Participant Report of Resolved IW claims
10. Relying Participant/Relying Customer Electronic Transmissions
11. Participating Institution/GTO Response Codes
Appendix 4-2: Standards for GTO Safekeeping and Distribution of Root Key
Appendix 5-7: Marks
Appendix 6-1: Fee Schedule
Appendix 11-8: Relying Customer Claims Procedure
Appendix 12-1(e): GTO Monitoring of Issuing Participant Warranty Cap
Appendix 13-5: Sample Customer Agreements While the invention has been described in conjunction with specific embodiments, it is evident that numerous alternatives, modifications, and variations will be apparent to those skilled in the art in light of the foregoing description.

The invention claimed is:

1. A computer-implemented method comprising:
generating, by a root entity computer associated with a root entity, one or more digital certificate records in a root repository configured to store a plurality of certificate records, each digital certificate record containing a digital certificate and a status associated with the digital certificate;
transmitting, by the root entity computer associated with the root entity, to a plurality of computing devices a set of one or more operating rules associated with one or more automated services, the plurality of computing devices comprising an issuing participant computer and a relying participant computer,
wherein the one or more operating rules define a set of rights and responsibilities associated with each of: the root entity computer, the issuing participant computer, the relying participant computer, and one or more relying customer computers;
issuing, by the root entity computer, one or more digital certificates to the issuing participant computer and the relying participant computer in accordance with the operating rules,
wherein the root entity computer transmits from the root repository the one or more digital certificate records to the issuing participant computer and the relying participant computer;
generating, by the issuing participant computer associated with an issuing participant, from the one or more digital certificate records received from the root entity computer, one or more issuing participant certificate records in an issuing participant repository configured to store a plurality of issuing participant certificate records, each issuing participant certificate record containing the digital certificate and the status associated with the digital certificate from a corresponding digital certificate record of the one or more digital certificate records received from the root entity computer;
issuing, by the issuing participant computer associated with an issuing participant, from the issuing participant certificate records in the issuing participant repository, one or more digital certificates to one or more subscribing customer computers respectively according to the operating rules, wherein a subscribing customer computer is associated with a customer of the issuing participant;

validating, by the issuing participant computer, the digital certificate of the respective subscribing customer computer, in accordance with the status of the digital certificate of the subscribing customer computer in the issuing participant certificate record for the digital certificate, wherein the status indicates a revocation status and a warranty cap status for the digital certificate;

generating, by the relying participant computer associated with an relying participant, from the one or more digital certificate records received from the root entity computer, one or more relying participant certificate records in a relying participant repository configured to store a plurality of relying participant certificate records, each issuing participant certificate record containing the digital certificate and the status associated with the digital certificate from a corresponding digital certificate record of the one or more digital certificate records received from the root entity computer;

issuing, by the relying participant computer associated with the relying participant, from the relying participant certificate records in the relying participant repository, one or more digital certificates to the one or more relying customer computers respectively according to the operating rules, wherein a relying customer computer is associated with a customer of the relying participant;

providing, by the relying participant computer, the one or more automated services to the one or more relying customer computers in accordance with the status of each relying customer computer in the respective relying participant certificate record in the relying participant repository;

receiving, by the relying participant computer, from the relying customer computer issued the respective digital certificate, a request for a warranty of identification validation having a warranty amount associated with the subscribing customer computer, wherein the warranty is an indicator associated with the certificate and indicates the relying participant associated with the relying participant computer warrants the certificate content and validity of the certificate, and wherein the warranty cap in the status of the relying participant digital record of the digital certificate indicates to the issuing participant computer on a maximum limitation of exposure determined by the issuing participant computer in accordance with one or more warranty indicators having a respective warranty amount associated with the digital certificate;

validating, by the root entity computer, the digital certificate of the issuing participant in accordance with the status of the digital certificate of the issuing participant, upon the root entity computer: receiving from the relying participant computer a validity check request for the digital certificate of the issuing participant, determining the digital certificate is unrevoked, and determining that the warranty cap of the digital certificate satisfies the maximum limitation of exposure threshold amount based upon the warranty amount in the request for the warranty of identification validation;

validating, by the issuing participant computer, the digital certificate of the subscribing customer computer in accordance with the status of the digital certificate of the subscribing customer computer in response to the root entity computer determining the status of the digital certificate of the issuing participant computer;

transmitting, by the relying participant computer, the request for the warranty of identification validation associated with the subscribing customer computer to the issuing participant computer, wherein the warranty is associated with at least one of the one or more automated services; and issuing, by the issuing participant computer, the warranty of identification validation associated with the digital certificate of the subscribing customer to the relying customer computer, upon determining that issuing the warranty of identification does not exceed the maximum limitation of exposure value of the one or more digital certificates issued to the issuing participant computer.

2. The method of claim 1, wherein one of the plurality of automated services is an automated dispute resolution service.

3. The system method of claim 1, wherein the root entity computer monitors a warranty cap associated with the issuing participant.

4. The system method of claim 3, wherein the root entity computer monitors the warranty cap on a daily basis.

5. The method of claim 3, wherein the root entity computer monitors the warranty cap in real-time.

* * * * *